(12) United States Patent
Kinamon et al.

(10) Patent No.: US 9,215,622 B1
(45) Date of Patent: Dec. 15, 2015

(54) METHOD AND SYSTEMS FOR ASSOCIATING WIRELESS TRANSMISSION WITH DIRECTIONS-OF-ARRIVAL THEREOF

(71) Applicant: GoNet Systems, LTD, Tel Aviv, IL (US)

(72) Inventors: Roy Kinamon, Tel Aviv, IL (US); Gal Zuckerman, Holon, IL (US); Moshe Salhov, Herzeliya, IL (US); Oz Liv, Tel Aviv, IL (US)

(73) Assignee: GoNet Systems Ltd., Tel Aviv (IL)

( * ) Notice: Subject to any disclaimer, the term of this patent is extended or adjusted under 35 U.S.C. 154(b) by 238 days.

(21) Appl. No.: 13/938,470

(22) Filed: Jul. 10, 2013

Related U.S. Application Data

(60) Provisional application No. 61/677,089, filed on Jul. 30, 2012, provisional application No. 61/739,094, filed on Dec. 19, 2012.

(51) Int. Cl.
*H04W 4/00* (2009.01)
*H04W 28/18* (2009.01)

(52) U.S. Cl.
CPC ........................... *H04W 28/18* (2013.01)

(58) Field of Classification Search
None
See application file for complete search history.

(56) References Cited

U.S. PATENT DOCUMENTS

2009/0232063 A1* 9/2009 Cordeiro et al. .............. 370/329
2011/0175780 A1* 7/2011 Gatti et al. .................... 343/766

\* cited by examiner

*Primary Examiner* — Minh-Trang Nguyen
(74) *Attorney, Agent, or Firm* — Intrinsic Law Corp.; Ibrahim M. Hallaj

(57) ABSTRACT

Various methods and systems for: (i) associating direction-of-arrival of a wireless transmission with an address of an originator of the wireless transmission, (ii) associating directions of incoming transmissions with directions of outgoing transmissions in a wireless communication network, (iii) associating between data from a direction-of-arrival-detector and data from a receiver operating separately, and (iv) associating a relative direction (bearing) of a wireless communication device with its Media-Access-Control (MAC) address.

28 Claims, 42 Drawing Sheets

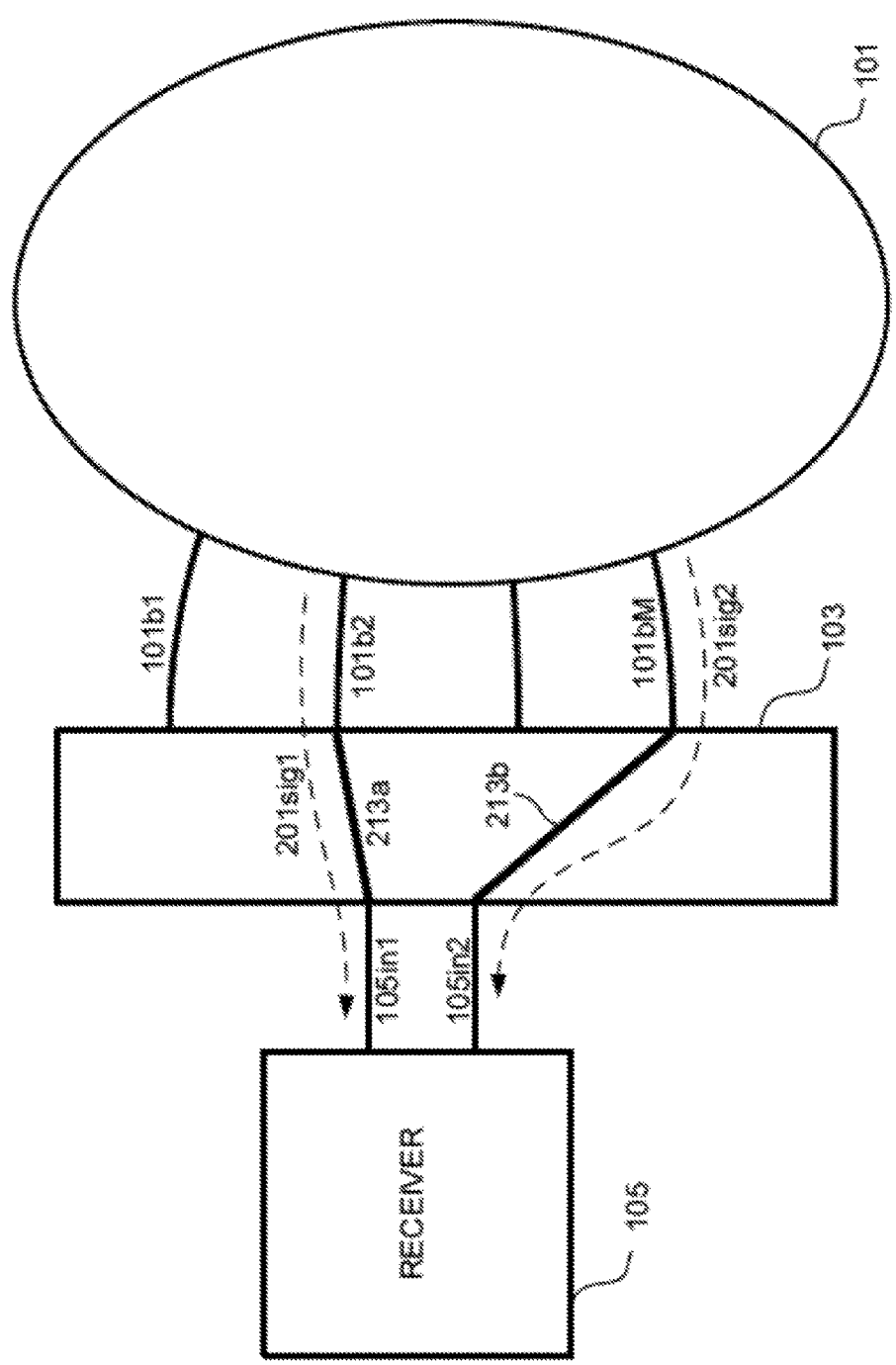

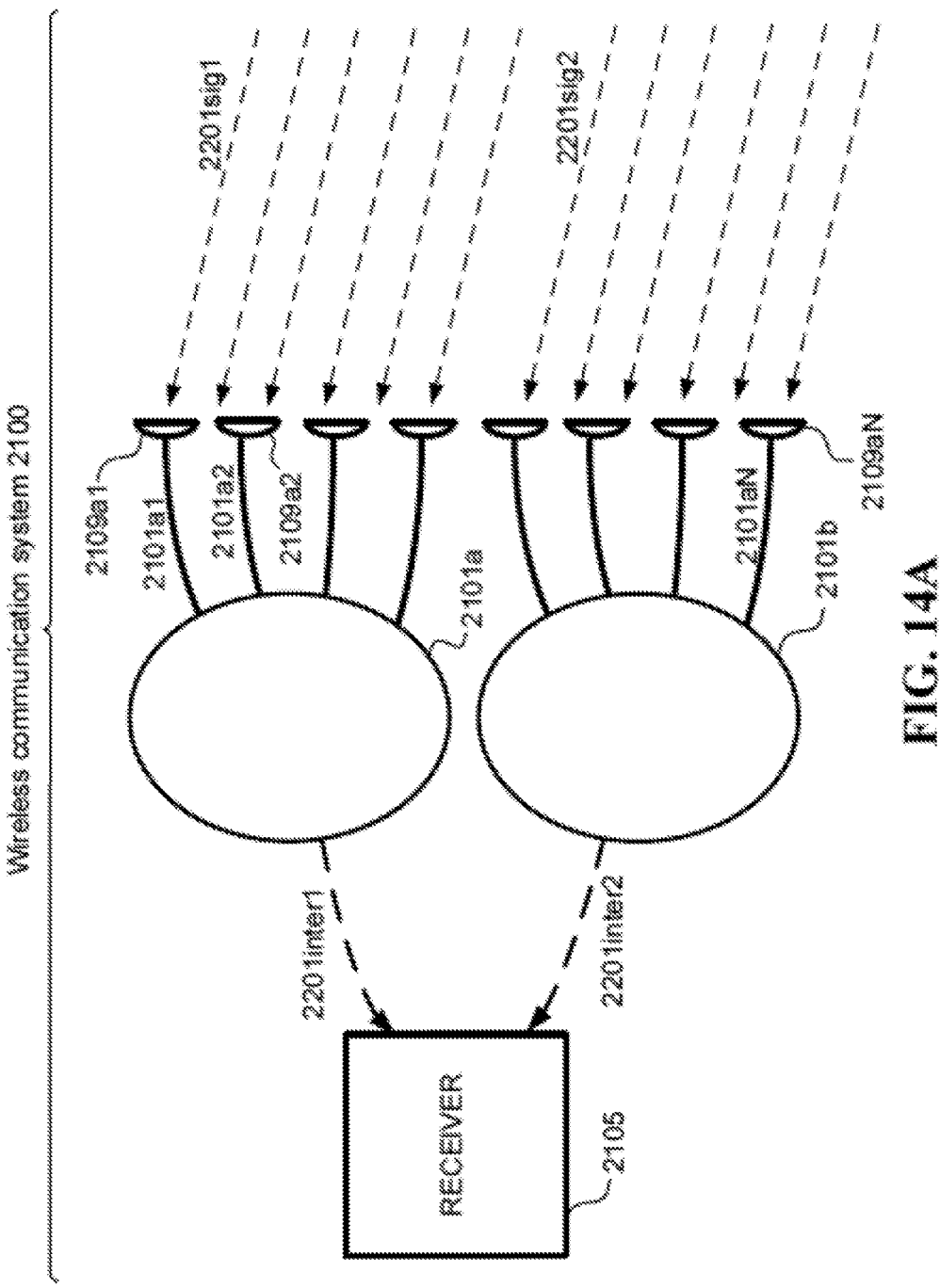

METHOD AND SYSTEMS FOR ASSOCIATING WIRELESS TRANSMISSION WITH DIRECTIONS-OF-ARRIVAL THEREOF

TECHNICAL FIELD

The present application relates to the field of wireless communication. More specifically, it relates to wireless communication systems and methods in a device that discriminates and detects a spatial direction of another device.

RELATED APPLICATIONS

The present application is related to and claims priority under 35 USC §120 to U.S. Provisional Application No. 61/677,089 filed on Jul. 30, 2012, and U.S. Provisional Application No. 61/739,094 filed on Dec. 19, 2012, which are hereby incorporated by reference.

BACKGROUND

In wireless communication, beam-forming communication systems may be used to direct/receive wireless transmissions into/from various selectable directions using a plurality of antennas, thereby achieving substantial antenna gain, improved interference immunity, and enhanced data transmission rates. A wireless access point equipped with beam-forming technology may service a plurality of wireless client devices located at various directions, and would benefit from being able to dynamically determine a client's bearing before directing wireless transmissions.

SUMMARY

One embodiment for associating direction-of-arrival of a wireless transmission with an address of an originator of the wireless transmission includes: (i) determining, in conjunction with a first event, by a first wireless communication system, direction-of-arrival of a first incoming wireless transmission arriving from a second wireless communication system at the first wireless communication system via a plurality of antennas belonging to the first wireless communication system, (ii) decoding, from the first incoming wireless transmission, in conjunction with a second event, by the first wireless communication system, a first source address associated with the second wireless communication system, and (iii) detecting, by the first wireless communication system, time proximity between the first event and the second event, thereby associating the direction-of-arrival of the first incoming wireless transmission with the first source address, thereby associating the direction-of-arrival of the first incoming wireless transmission with the second wireless communication system.

One embodiment for associating directions of incoming transmissions with directions of outgoing transmissions in a wireless communication network includes: (i) determining, by a first wireless communication system, for each of a plurality of incoming wireless transmissions arriving at the first wireless communication system: (1) time of arrival and direction-of-arrival, and (2) time of decoding and source address, (ii) associating, by the first wireless communication system, between each of the source addresses and corresponding directions-of-arrival, by detecting time proximities between the times of arrival and times of decoding, and (iii) transmitting, by the first wireless communication system, at least one outgoing wireless transmission having a destination address same as one of the source addresses, toward a direction same as direction-of-arrival associated previously with one of the source addresses.

One embodiment is a wireless communication system capable of associating between data from a direction-of-arrival-detector and data from a receiver operating separately, including: (i) at least a first and second antennas operative to receive a first incoming wireless transmission arriving at the first and second antennas, (ii) a direction-of-arrival-detector, working in conjunction with the first and second antennas, operative to determine direction-of-arrival of the first incoming wireless transmission in associations with a first event, and (iii) a receiver, operating separately from the direction-of-arrival-detector, operative to decode a first source address from the first incoming wireless transmission in association with a second event. The wireless communication system is operative to detect time proximity between the first event and the second event, thereby associating the direction-of-arrival of the first incoming wireless transmission with the first source address of the first incoming wireless transmission.

One embodiment for associating a relative direction (bearing) of a wireless communication device with its Media-Access-Control (MAC) address, includes: (i) receiving, at a plurality of antennas in a first wireless communication device, a first wireless communication packet sent by a second wireless communication device, (ii) determining, in a direction-of-arrival detector of the first wireless communication device, the bearing of the second wireless communication device with respect to the first wireless communication device, (iii) decoding, in a receiver of the first wireless communication device, a portion of the first wireless communication packet so as to determine a MAC address encoded in the portion of the first wireless communication packet, and (iv) associating the bearing of the second wireless communication device with the MAC address of the second wireless communication device.

IN THE DRAWINGS

The embodiments are herein described, by way of example only, with reference to the accompanying drawings. No attempt is made to show structural details of the embodiments in more detail than is necessary for a fundamental understanding of the embodiments. In the drawings:

FIG. 2 illustrates one embodiment of switching signals by a radio-frequency switching fabric;

FIG. 14A illustrates one embodiment of a wireless communication system capable of combining signals from several beam-forming networks;

DETAILED DESCRIPTION

Figure 1A:
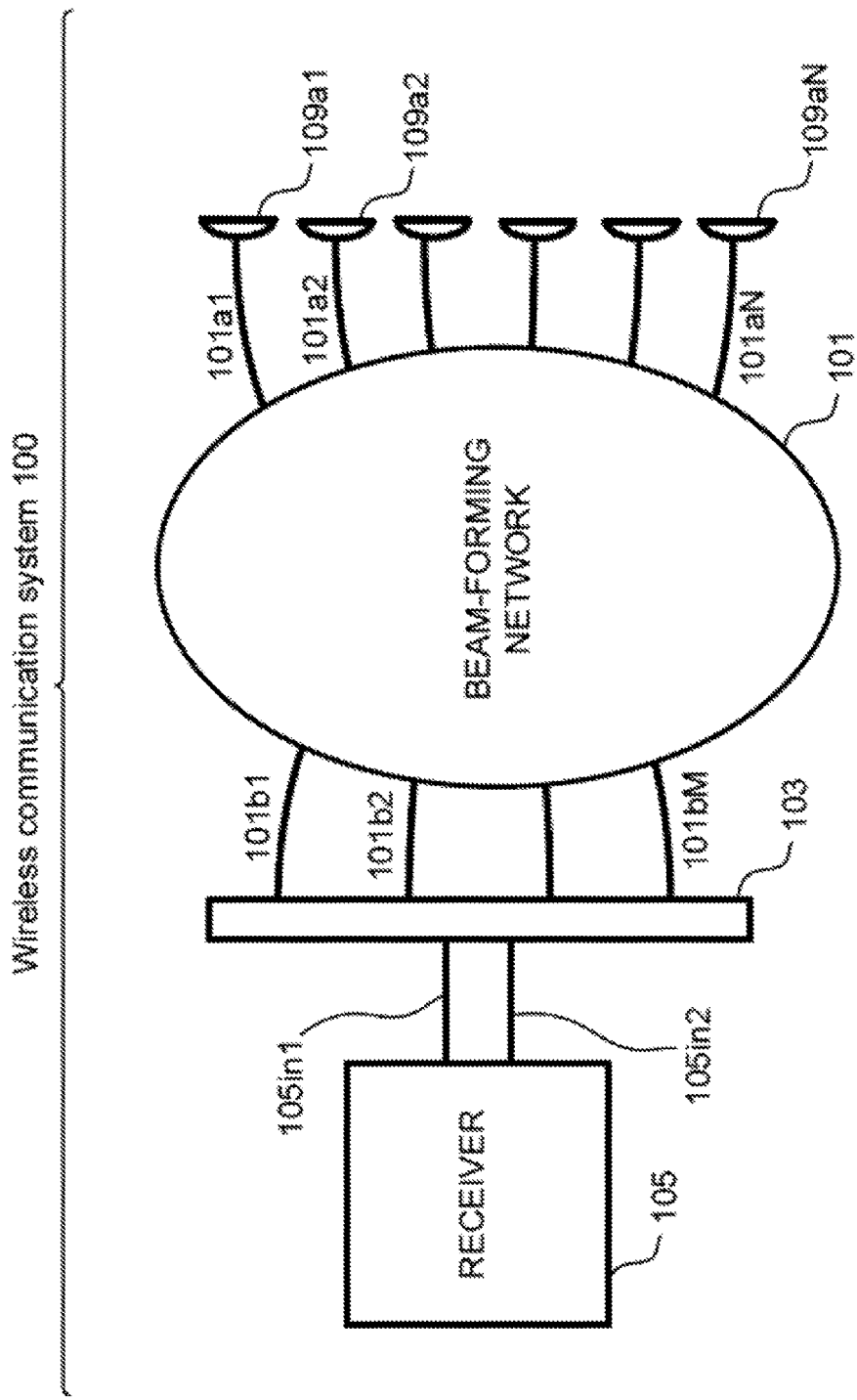
FIG. 1A illustrates one embodiment of a wireless communication system including a receiver and a beam-forming network.
Figure 1B:
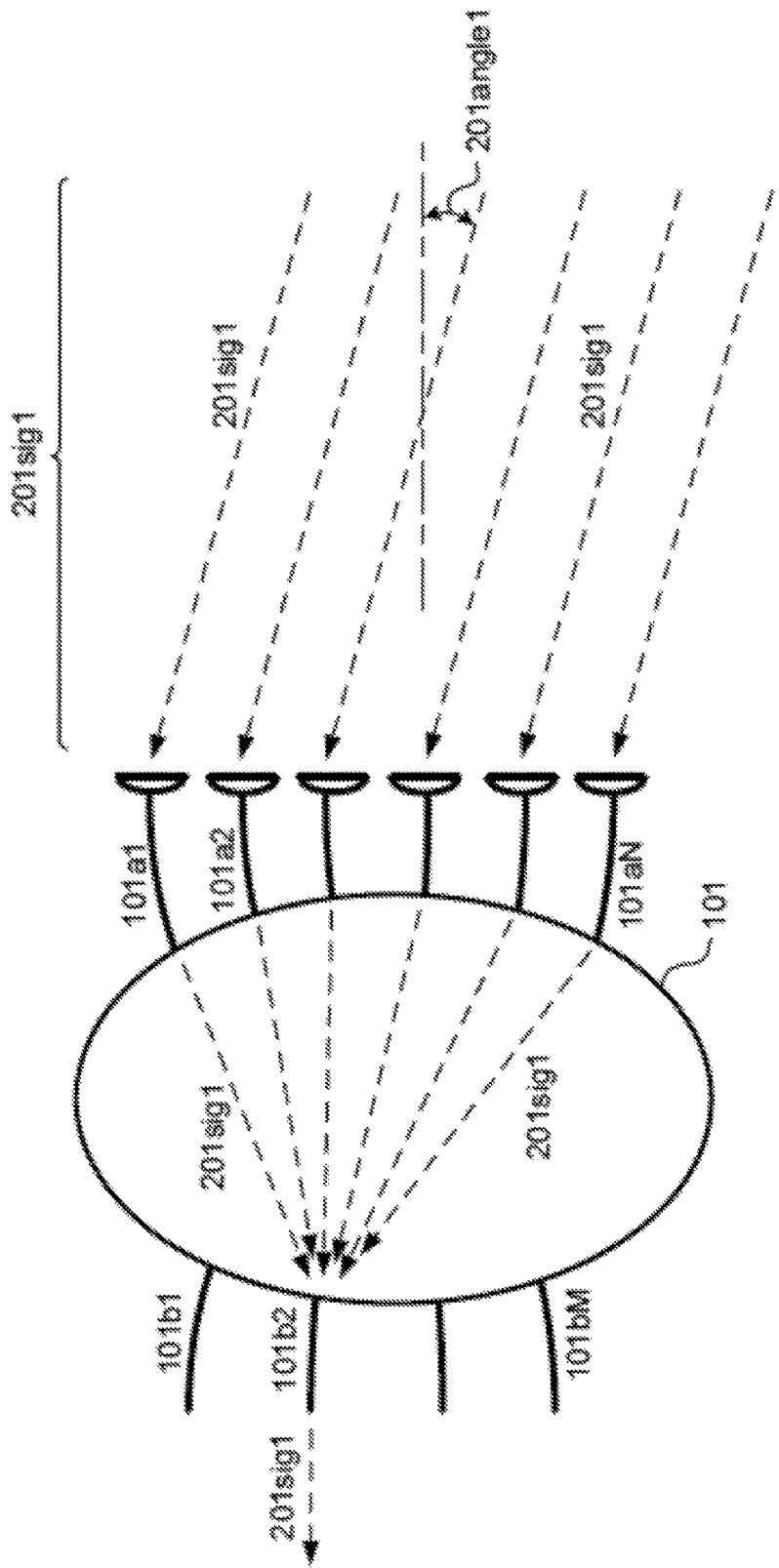
FIG. 1B illustrates one embodiment of a beam-forming network directing a first signal toward one beam-port.
Figure 1C:
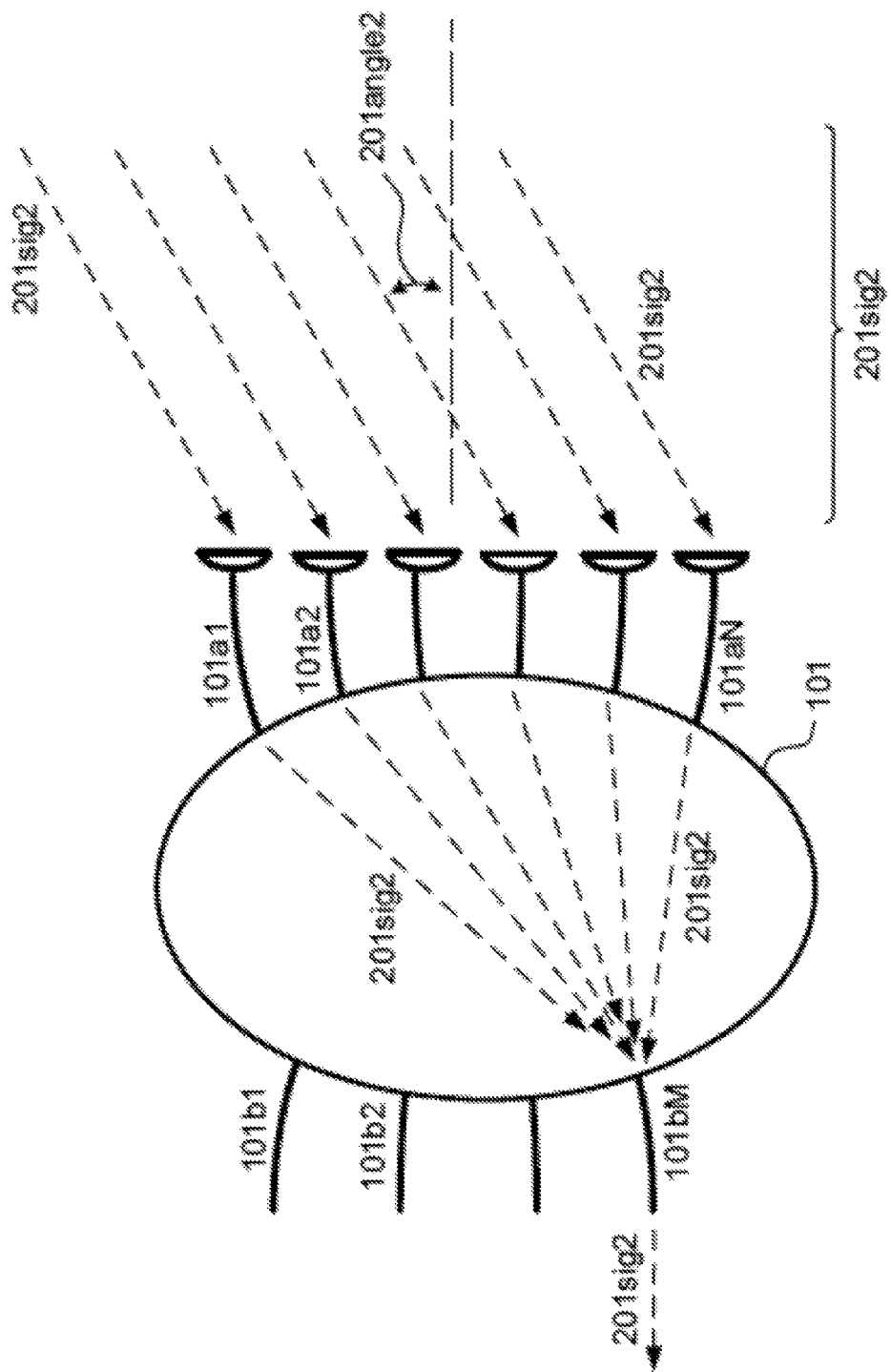
FIG. 1C illustrates one embodiment of a beam-forming network directing a second signal toward another beam-port.
Figure 1D:
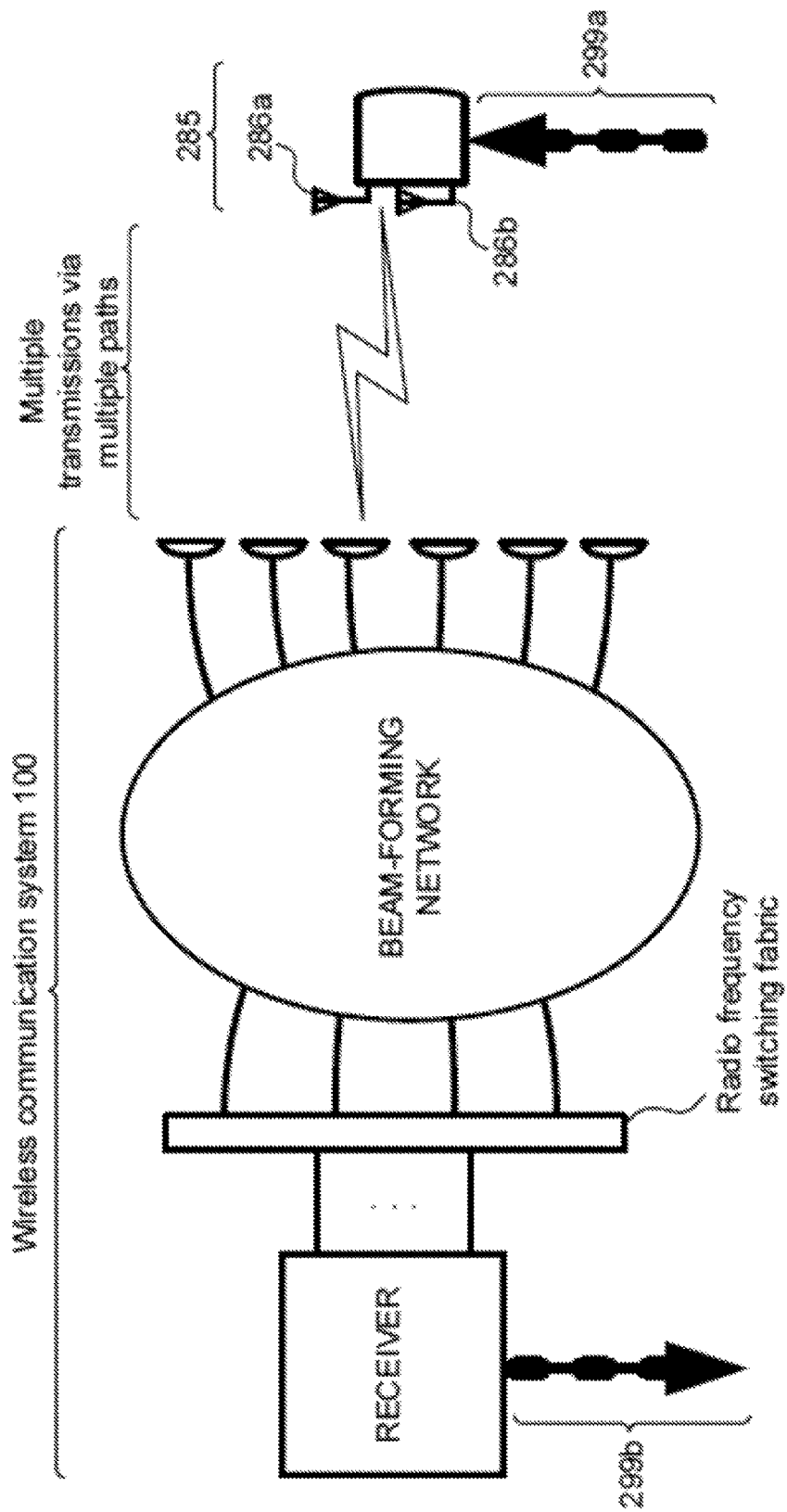
FIG. 1D illustrates one embodiment of a wireless communication system and a remote transceiver.
Figure 1E:
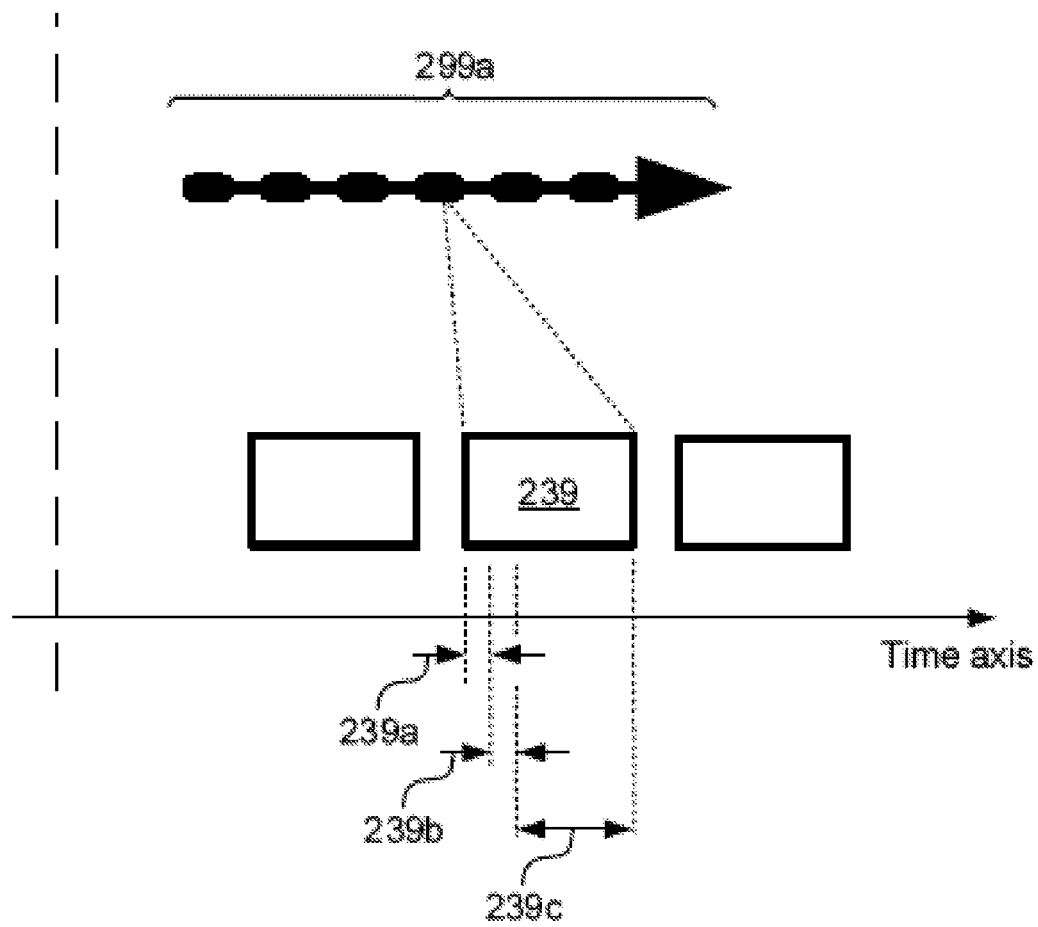
FIG. 1E illustrates one embodiment of a wireless data packet.

FIG. 1A, FIG. 1B, FIG. 1C, FIG. 1D, FIG. 1E, and FIG. 2 illustrate embodiments of receiving spatially multiplexed wireless signals via a beam-forming network. A wireless communication system 100 includes a beam-forming network 101, which includes a plurality of beam-ports 101$b$1, 101$b$2, and 101$b$M. Wireless communication system 100 detects a first 201angle1 and a second 201angle2 directions through which a first wireless signal 201sig1 and a second wireless signal 201sig2 arrive at said wireless communication system 100 respectively, said first and second wireless signals are a mixture of a first and a second spatially multiplexed wireless signals generated by a remote transceiver 285 from a single data stream 299$a$ using a first 286$a$ and a second 286$b$ remote antennas respectively.

Wireless communication system 100 then: (i) connects 213$a$ a first 101$b$2 of said beam-ports, that is associated with first direction 201angle1, to a first input 105in1 of a receiver 105 belonging to wireless communication system 100, and (ii) connects 213$b$ a second 101$b$M of said beam-ports, that is associated with second direction 201angle2, to a second input 105in2 of receiver 105. Receiver 105 then decodes the first and second wireless signals 201sig1, 201sig2, received via said first and second inputs into said single data stream 299$b$.

In one embodiment, said detection is done utilizing at most a first 4 microsecond 239$a$ of a wireless data packet 239 belonging to said data stream, arriving at wireless communication system 100. In one embodiment, said connection is done at most 2 microseconds 239$b$ after said detection. In one embodiment, said detection and said connection are done fast enough, thereby allowing receiver 105 enough time 239$c$ to decode wireless data packet 239. In one embodiment, said first 4 microseconds of wireless data packet 239 contains preamble information, thereby said connection may occur within said 4 microseconds without losing any data belonging to said single data stream.

In one embodiment, wireless data packet 239 and said spatially multiplexed wireless signals at least partially conform to IEEE-802.11n. In one embodiment, said first and second spatially multiplexed wireless signals are used by the IEEE-802.11n standard to boost transmission rates of single data stream 299$a$. In one embodiment, said spatially multiplexed wireless signals are transported using a frequency range of between 2.4 Ghz and 2.5 Ghz, and beam-forming network 101 operates directly in said frequency range. In one embodiment, said spatially multiplexed wireless signals are transported using a frequency range of between 4.8 Ghz and 5.8 Ghz, and beam-forming network 101 operates directly in said frequency range. In one embodiment, wireless data packet 239 and said spatially multiplexed wireless signals at least partially conform to IEEE-802.11ac. In one embodiment, wireless data packet 239 and said spatially multiplexed wireless signals at least partially conform to IEEE-802.11. In one embodiment, said at most first 4 microseconds of wireless data packet 239 contains preamble information, thereby said connection may occur after said detection without losing any data belonging to single data stream 299a.

In one embodiment, beam-forming network 101 is a rotman-lense. In one embodiment, beam-forming network 101 is a butler-matrix. In one embodiment, beam-forming network 101 is a blass-matrix. In one embodiment, beam-forming network 101 is a fixed or passive beam-forming network. In one embodiment, beam-forming network 101 includes a plurality of array-ports 101a1, 101a2, 101aN. In one embodiment, said rotman-lens or butler-matrix concentrates radio-frequency energy arriving at said plurality of array ports into substantially one of said plurality of beam-ports which is determined substantially by an angle of arrival of said radio-frequency energy into said plurality of array ports, thereby said rotman-lens or butler-matrix facilitates detection of said first and second directions through which said first and second wireless signals arrive at wireless communication system 100.

Figure 3:
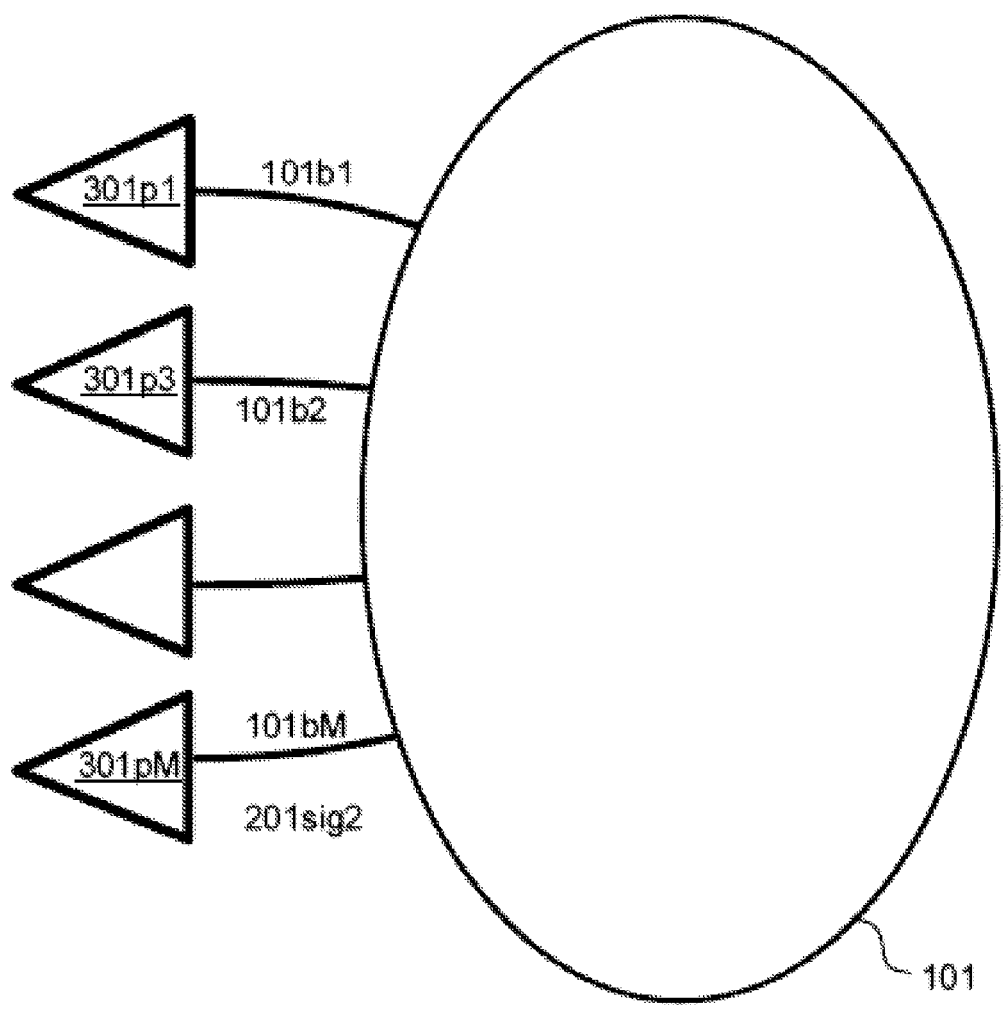
FIG. 3 illustrates one embodiment of power detectors.
Figure 4:
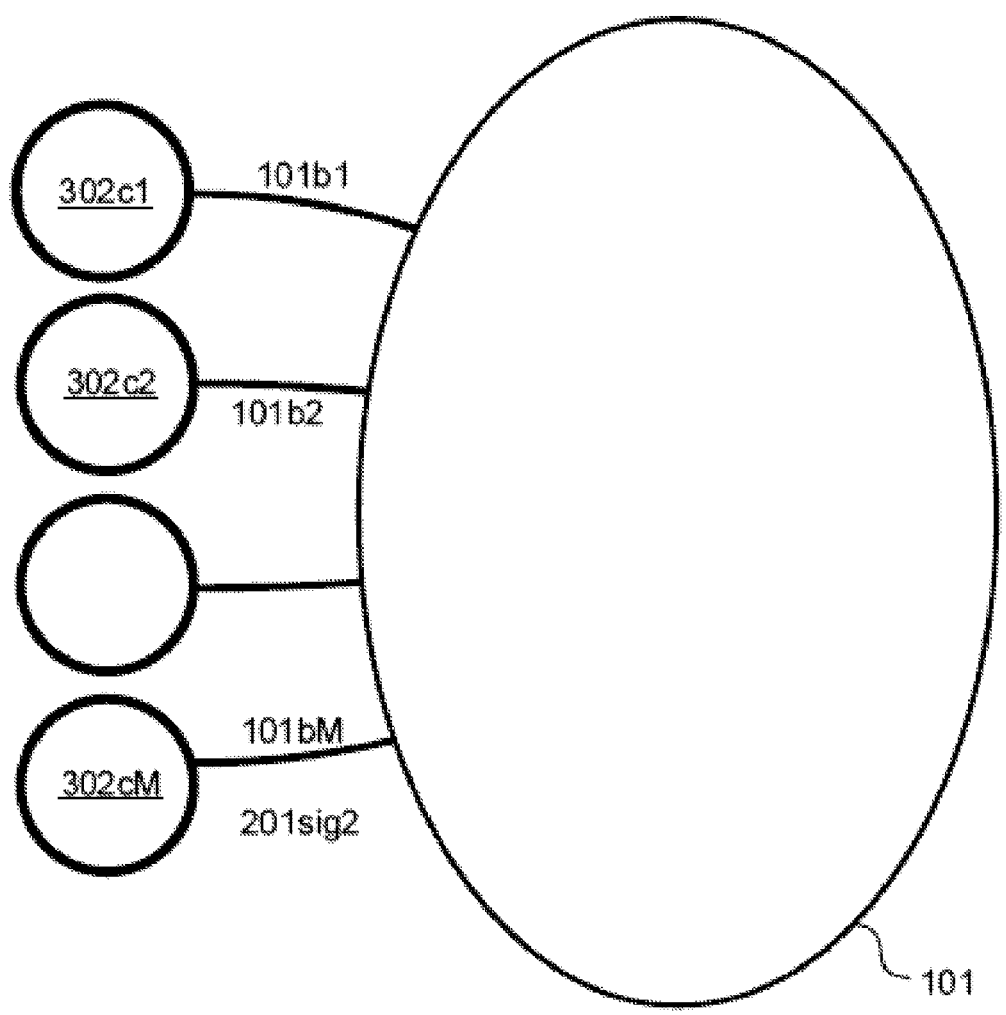
FIG. 4 illustrates one embodiment of correlates.

FIG. 3 and FIG. 4 illustrate embodiments of power detectors and correlators. In one embodiment, said detection of first direction 201angle1 and second direction 201angle2 is done as follows: a plurality of power detectors 301p1, 301p2, 301pM measure a plurality of output power levels of at least some of said plurality of beam-ports respectively. Power detectors 301p1, 301p2, 301pM are connected to beam-ports 101b1, 101b2, 101bM respectively. Wireless communication system 100 then identifies said first 101b2 and second 101bM beam-ports having strongest of said plurality of output power levels, thereby detecting said first and second directions 201angle1, 201angle2, associated with said first and a second wireless signals 201sig1, 201sig2 respectively. In one embodiment, said identification of said first 101b2 and second 101bM beam-ports may include: (i) sensing 302c2 by wireless communication system 100 a first signature belonging to said first spatially multiplexed wireless signal, said first signature present at said first beam-port 101b1, thereby associating said first beam-port with said first spatially multiplexed wireless signal, and (ii) sensing 302cM, by wireless communication system 100, a second signature belonging to said second spatially multiplexed wireless signal, said second signature present at second beam-port 101bM, thereby associating said second beam-port with said second spatially multiplexed wireless signal.

In one embodiment, said detection of first and second directions 201angle1, 201angle2, in done as follows: wireless communication system 100 measures a plurality of output power levels of at least some of said plurality of beam-ports using power detectors 301p1, 301p2, 301pM connected to beam-ports 101b1, 101b2, 101bM respectively. Then, wireless communication system 100 identifies, according to said measurements, a set of beam-ports having strongest of said plurality of output power levels. Wireless communication system 100 then searches 302c1, 302c2, and 302cM among said set of beam-ports for a first and a second signatures belonging to said first and second spatially multiplexed wireless signal respectively. Wireless communication system 100 then identifies at least said first signature as being present at said first beam-port 101b2, and at least said second signature as being present at said second beam-port 101bM, thereby associating said first and second spatially multiplexed wireless signals with said first and second beam-ports, thereby achieving said detection.

In one embodiment, said detection of first and second directions 201angle1, 201angle2, in done as follows: wireless communication system 100 searches 302c1, 302c2, 302cM among said plurality of beam-ports for a first and a second signatures belonging to said first and second spatially multiplexed wireless signals respectively. wireless communication system 100 then identifies at least said first signature as being present at said first beam-port 101b2, and at least said second signature as being present at said second beam-port 101bM, thereby associating said first and second spatially multiplexed wireless signals with said first and second beam-ports, thereby associating said first and second spatially multiplexed wireless signals with said first and second directions 201angle1, 201angle2, thereby achieving said detection.

In one embodiment, said detection, connection, and decoding, involves a third wireless signal which is a mixture of said first spatially multiplexed wireless signal, said second spatially multiplexed wireless signal, and a third spatially multiplexed wireless signal. In one embodiment, said detection, connection, and decoding, involves a third and a fourth wireless signals which are a mixture of said first spatially multiplexed wireless signal, said second spatially multiplexed wireless signal, a third spatially multiplexed wireless signal, and a fourth spatially multiplexed wireless signal.

Figure 5A:
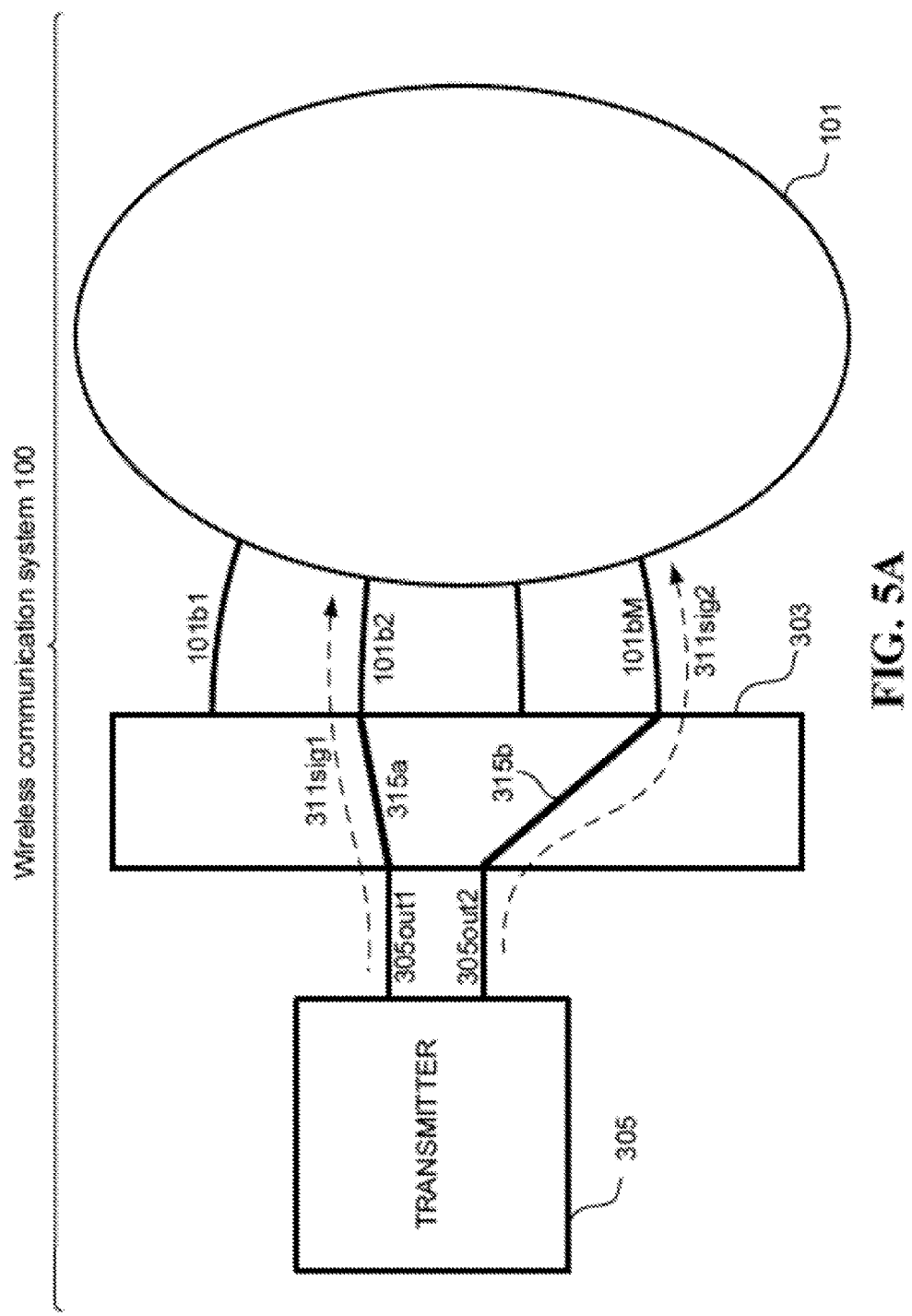
FIG. 5A illustrates one embodiment of a transmitter transmitting via a beam-forming network.
Figure 5B:
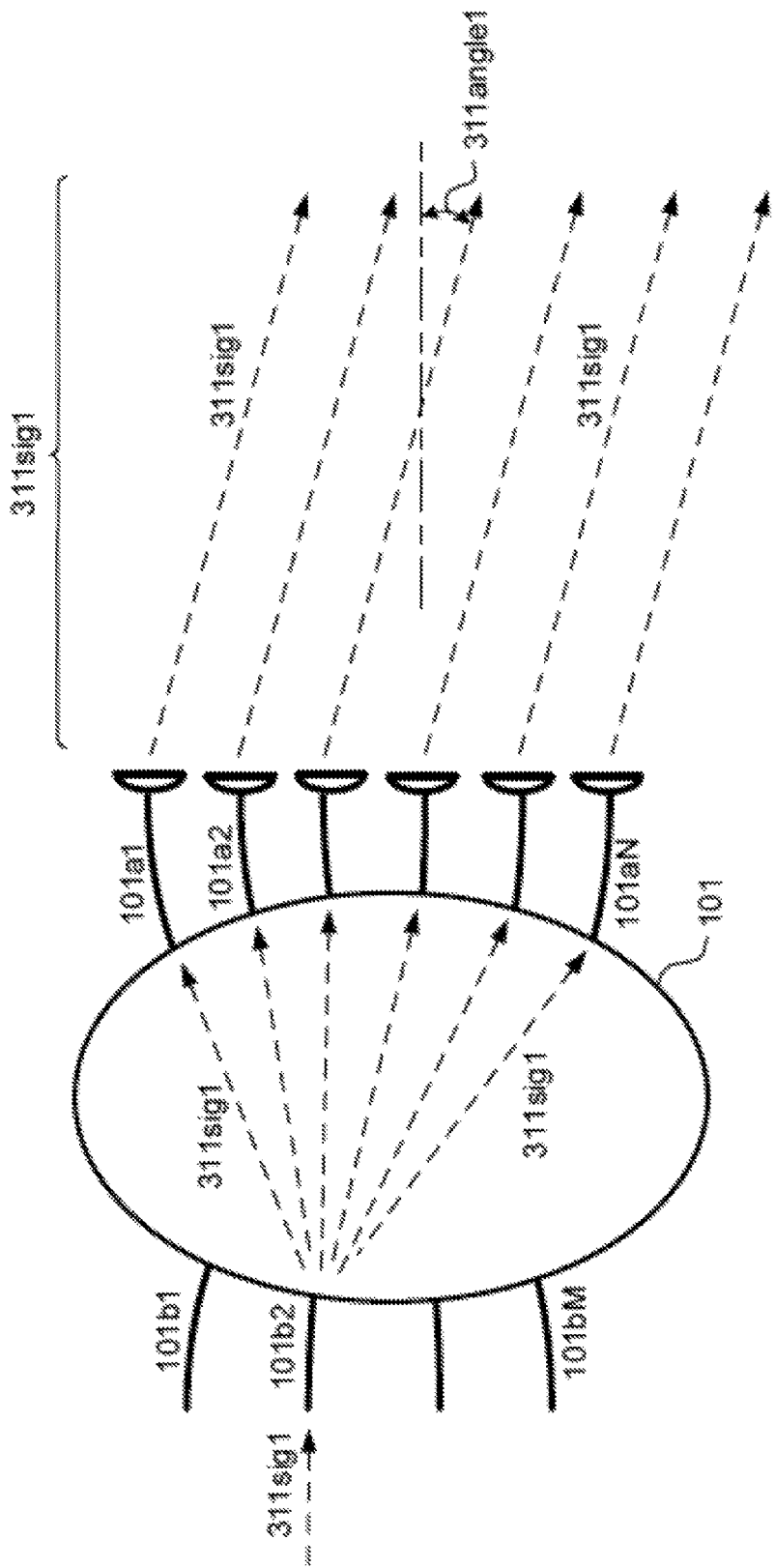
FIG. 5B illustrates one embodiment of directing a first signal via a beam-forming network.
Figure 5C:
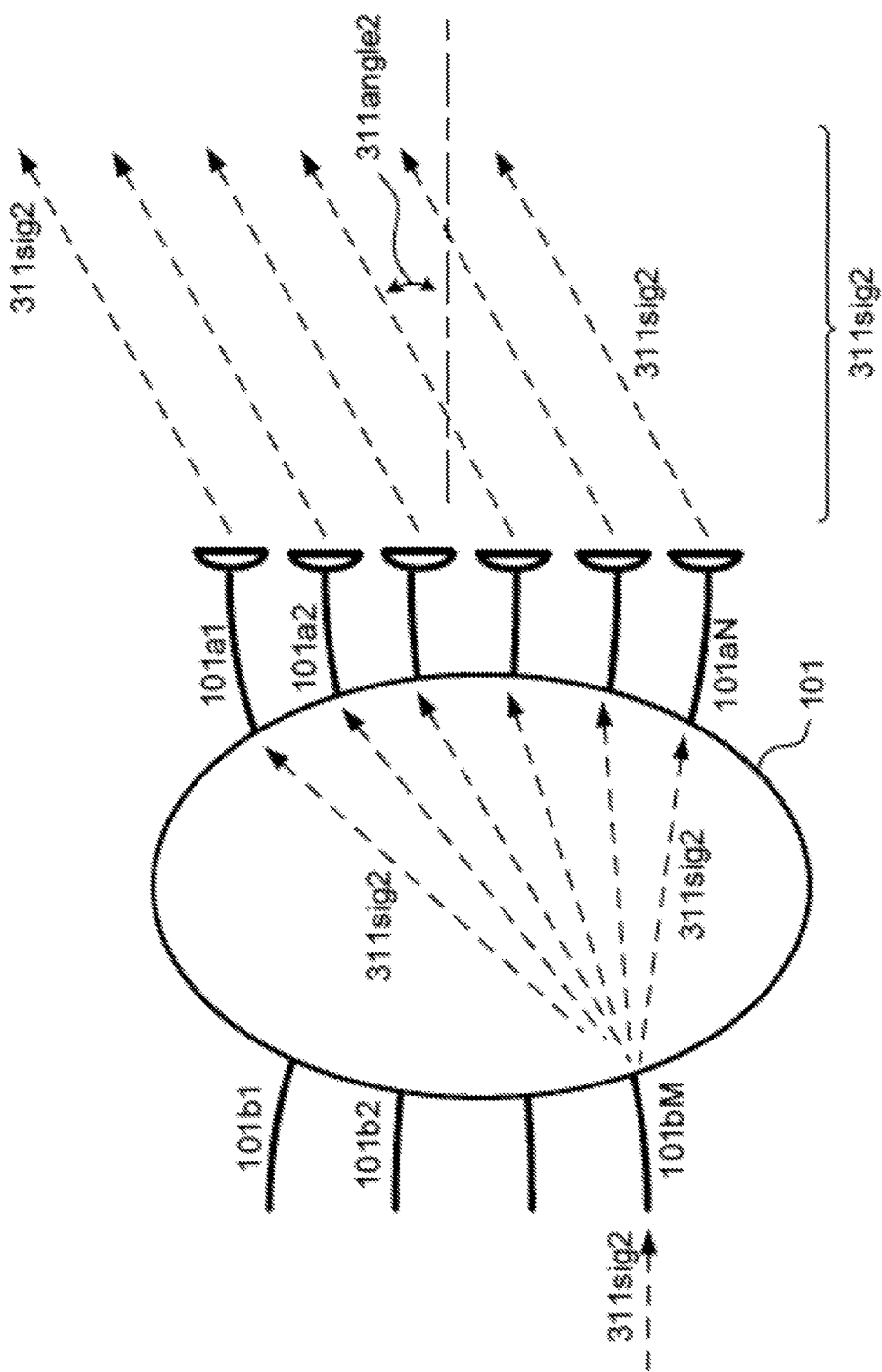
FIG. 5C illustrates one embodiment of directing a second signal via a beam-forming network.

FIG. 5A, FIG. 5B, and FIG. 5C illustrate embodiments of transmitting via a beam-forming network. In one embodiment, wireless communication system 100 uses a radio frequency switching fabric 303 to: (i) connect 315a a first output 305out1 of a transmitter 305 to said first beam port 101b2, and (ii) connect 315b a second output 305out2 of said transmitter to said second beam port 101bM. Wireless communication system 100 then transmits using said transmitter: (i) a first wireless transmit signal 311sig1 via said first output, and (ii) a second wireless transmit signal 311sig2 via said second output, thereby: (i) directing 311angle1 said first wireless transmit signal 311sig1 toward remote transceiver 285, and (ii) directing 311angle2 said second wireless transmit signal 311sig2 toward remote transceiver 285. In one embodiment, said first and second wireless transmit signals are two spatially multiplexed signals intended for decoding by said remote transceiver into a single data stream. In one embodiment, said first and second wireless transmit signals are two cyclic-delay-diversity signals intended for decoding by said remote transceiver.

In one embodiment, wireless communication system 100 together with remote transceiver 285 constitutes a multiple-input-multiple-output communication system.

In one embodiment, a reception range of spatially multiplexed wireless signals is boosted using a rotman-lense or butler-matrix. A rotman-lense or butler-matrix 101, comprising a plurality of beam-ports 101b1, 101b2, 101bM, concentrates a first wireless signal 201sig1 arriving at a plurality of array ports 101a1, 101a2, 101aN belonging to said rotman-lense or butler-matrix, substantially into one 101b2 of said plurality of beam-ports, said one of beam-ports is determined substantially by an angle of arrival 201angle1 of said first wireless signal into said plurality of array ports. Rotman-lense or butler-matrix 101 concentrates a second wireless signal 201sig2 arriving at said plurality of array ports, substantially into another 101bM of said plurality of beam-ports, said another beam-ports is determined substantially by an angle of arrival 201angle2 of said second wireless signal into said plurality of array ports. The first 201sig1 and second 201sig2 wireless signals are a mixture of a first and a second spatially multiplexed wireless signals generated by a remote transceiver 285 from a single data stream 299a using a first 286a and a second 286b remote antennas respectively. Wireless communication system 100 detects presence of said first and second wireless signals 201sig1, 201sig2 at said one and another 101b2, 101bM of beam-ports respectively, out of a possibility of presence at other beam-ports of said plurality of beam-ports. Wireless communication system 100 connects 213a, 213b: (i) said one beam-port 101b2 to a first input 105in1 of a receiver 105 belonging to said wireless communication system, and (ii) said another beam-port 101bM to a second input 105in2 of said receiver. Receiver 105 then decodes said first wireless signal 201sig1 arriving via said first input 105in1, together with said second wireless signal 201sig2 arriving via said second input 105in2, into said single data stream 299b.

In one embodiment, said detection is done as follows: (i) measuring a plurality of output power levels of at least some of said plurality of beam-ports 101b1, 101b2, 101bM respectively, by using a plurality of power detectors 301p1, 301p2, 301pM connected to said plurality of beam-ports respectively, said plurality of power detectors belonging to wireless communication system 100, and (ii) identifying, by wireless communication system 100, said one beam-port 101b2 and said another beam-port 101bM as having strongest of said plurality of output power levels.

In one embodiment, said detection is done as follows: (i) searching 302c1, 302c2, 302cM, by wireless communication system 100, among said plurality of beam-ports 101b1, 101b2, 101bM, for a first and a second signatures belonging to said first and second spatially multiplexed wireless signal respectively, (ii) identifying at least said first signature as being present at said one beam-port 101b2, and at least said second signature as being present at said another beam-port 101bM, thereby detecting said one and another of beam-ports 101b2, 101bM out of said plurality of beam-ports.

In one embodiment, wireless communication system 100 receives from a remote transceiver 285, via a plurality of antennas 109a1, 109a2, 109aN connected to said plurality of array-ports 101a1, 101a2, 101aN respectively, said first and second wireless signals 201sig1, 201sig2, thereby facilitating a substantial array gain associated with said plurality of antennas.

In one embodiment, a wireless communication system 100 boosts reception range of wireless signals using a rotman-lense or butler-matrix. A rotman-lense or butler-matrix 101, comprising a plurality of beam-ports 101b1, 101b2, 101bM, is operative to: (i) focus a first wireless signal 201sig1 arriving at a plurality of array ports 101a1, 101a2, 101aN belonging to said rotman-lense or butler-matrix, substantially into one of said plurality of beam-ports 101b2, said one of beam-ports is determined substantially by an angle of arrival 201angle1 of said first wireless signal into said plurality of array ports, and (ii) focus a second wireless signal 201sig2 arriving at said plurality of array ports, substantially into another of said plurality of beam-ports 101bM, said another beam-ports is determined substantially by an angle of arrival 201angle2 of said second wireless signal into said plurality of array ports. A wireless communication system 100, to which said rotman-lens or butler-matrix 101 belongs, detects presence of said first 201sig1 and second 201sig2 wireless signals at said one 101b2 and another 101bM of beam-ports respectively. A radio-frequency switching fabric 103: (i) connects 213a said one beam-port 101b2 to a first input 105in1 of a receiver 105 belonging to wireless communication system 100, and (ii) connects 213b said another beam-port 101bM to a second input 105in2 of said receiver.

In one embodiment, said first and second wireless signals 201sig1, 201sig2 are a mixture of a first and a second spatially multiplexed wireless signals generated by a remote transceiver 285 from a single data stream 299a using a first 286a and a second 286b remote antennas respectively, and said receiver 105 is operative to decode said first wireless signal 201sig1 arriving via said first input 105in1, together with said second wireless signal 201sig2 arriving via said second input 105in2, into said single data stream 299b.

In one embodiment, a plurality of power detectors 301p1, 301p2, and 301pM is connected to said plurality of beam-ports 101b1, 101b2, 101bM respectively. Said power detectors measure a plurality of output power levels of at least some of said plurality of beam-ports respectively. Wireless communication system 100 identifies said one beam-port 101b2 and said another beam-port 101bM as having strongest of said plurality of output power levels.

In one embodiment, at least one correlator 302c1, 302c2, 302cM, belonging to said wireless communication system 100, is operative to: (i) search, among said plurality of beam-ports 101b1, 101b2, 101bM, for a first and a second signatures belonging to said first and second spatially multiplexed wireless signal respectively, and (ii) identify at least said first signature as being present at said one beam-port 101b2, and at least said second signature as being present at said another beam-port 101bM, thereby detecting said one and another of beam-ports, out of said plurality of beam-ports.

In one embodiment, a plurality of antennas 109a1, 109a2, 109aN connects to said plurality of array-ports 101a1, 101a2, 101aN respectively. Antennas 109a1, 109a2, 109aN receive from a remote transceiver said first and second wireless signals 201sig1, 201sig2, thereby facilitating a substantial array gain associated with said plurality of antennas. In one embodiment said plurality of antennas produce a gain in excess of 10 dBi. In one embodiment, said plurality of antennas produce a gain in excess of 14 dBi. In one embodiment, said pluralities of antennas produce a gain in excess of 18 dBi. In one embodiment, there are 4 of said plurality of antennas present. In one embodiment, there are 4 of said plurality of array-ports, and 8 of said plurality of beam-ports present. In one embodiment, there are 6 of said plurality of antennas present. In one embodiment, there are 6 of said plurality of array-ports, and 8 of said plurality of beam-ports present. In one embodiment, there are 6 of said plurality of array-ports, and 16 of said plurality of beam-ports present. In one embodiment, there are 8 of said plurality of antennas present. In one embodiment, said rotman-lense or butler-matrix 101 and radio-frequency switching fabric 103 operate at a frequency range of between 2.4 Ghz and 2.5 Ghz. In one embodiment, said rotman-lense or butler-matrix 101 and radio-frequency switching fabric 103 operate at a frequency range of between 4.8 Ghz and 5.8 Ghz.

Figure 6:
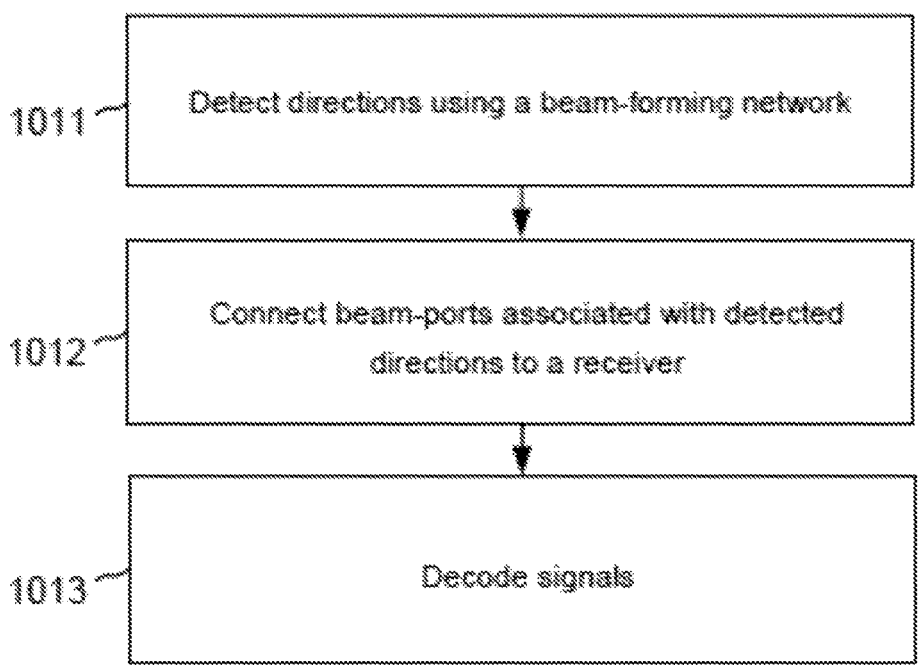
FIG. 6 is one embodiment of a flow diagram for receiving signals.

FIG. 6 is a flow diagram illustrating one embodiment of receiving spatially multiplexed wireless signals via a beam-forming network. In step 1011: detecting, using a beam-forming network 101 comprising a plurality of beam-ports 101b1, 101b2, 101bM and belonging to a wireless communication system 100, a first 201angle1 and a second 201angle2 directions through which a first 201sig1 and a second 201sig2 wireless signals arrive at said wireless communication system respectively, said first and second wireless signals are a mixture of a first and a second spatially multiplexed wireless signals generated by a remote transceiver 285 from a single data stream 299a using a first 286a and a second 286b remote antennas respectively. In step 1012: connecting 213a, 213b, by said wireless communication system 100: (i) a first 101b2 of said beam-ports, that is associated with said first direction, to a first input 105in1 of a receiver 105 belonging to wireless communication system 100, and (ii) a second 101bM of said beam-ports, that is associated with said second direction, to a second input 105in2 of said receiver. In step 1013: decoding, by said receiver, the first and second wireless signals 201sig1, 201sig2 received via said first and second inputs 105in1, 105in2, into said single data stream 299b.

Figure 7:
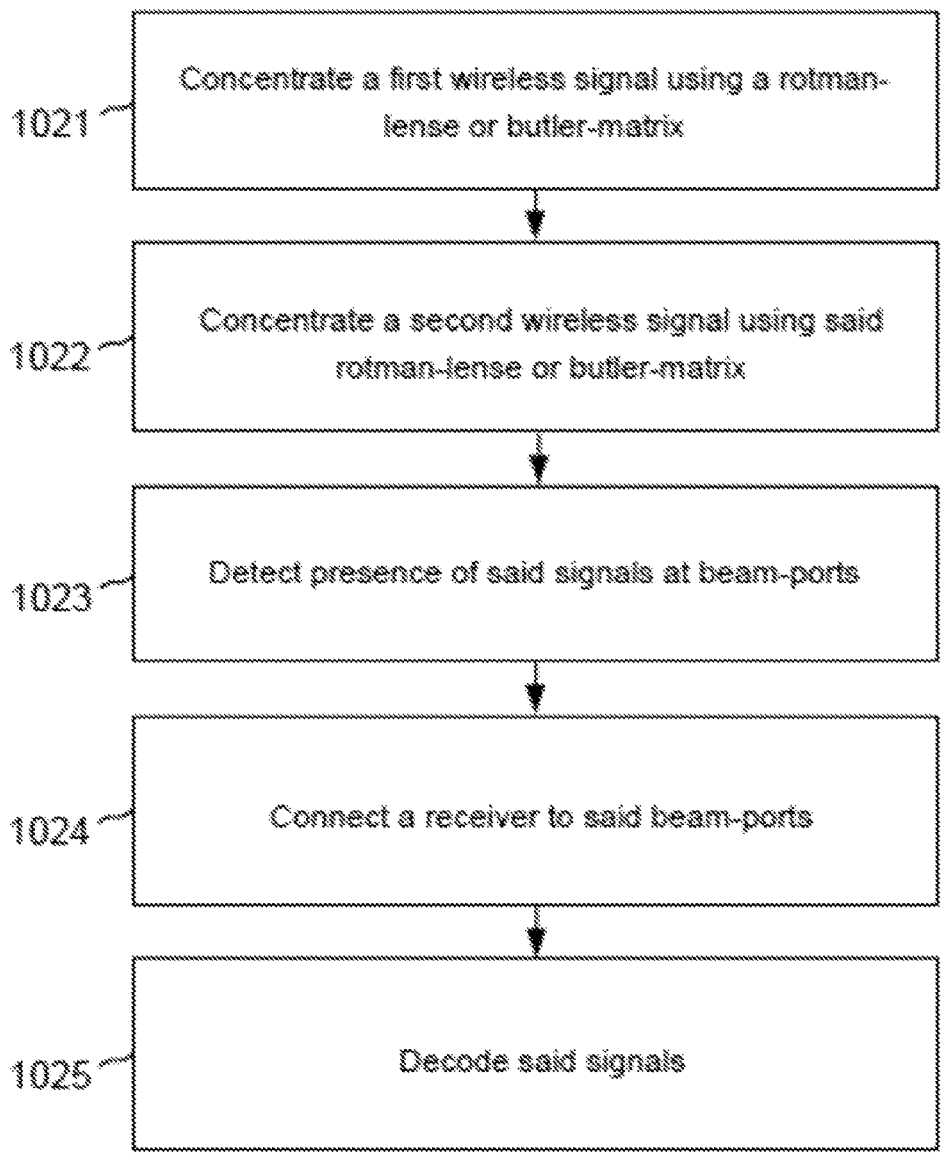
FIG. 7 is one embodiment of a flow diagram for receiving signals.

FIG. 7 is a flow diagram illustrating one embodiment of boosting reception range of spatially multiplexed wireless signals using a rotman-lense or butler-matrix. In step 1021: concentrating, by a rotman-lense or butler-matrix 101 comprising a plurality of beam-ports 101b1, 101b2, 101bM a first wireless signal 201sig1 arriving at a plurality of array ports 101a1, 101a2, 101aN belonging to said rotman-lense or butler-matrix, substantially into one 101b2 of said plurality of beam-ports, said one of beam-ports is determined substantially by an angle of arrival 201angle1 of said first wireless signal into said plurality of array ports. In step 1022: concentrating, by said rotman-lense or butler-matrix, a second wireless signal 201sig2 arriving at said plurality of array ports, substantially into another 101bM of said plurality of beam-ports, said another beam-ports is determined substantially by an angle of arrival 201angle2 of said second wireless signal into said plurality of array ports, wherein said first and second wireless signals are a mixture of a first and a second spatially multiplexed wireless signals generated by a remote transceiver 285 from a single data stream 299a using a first 286a and a second 286b remote antennas respectively. In step 1023: detecting, by a wireless communication system 100 to which said rotman-lense or butler-matrix belongs, presence of said first and second wireless signals 201sig1, 201sig2 at said one and another of beam-ports 101b2, 101bM respectively, out of a possibility of presence at other beam-ports of said plurality of beam-ports. In step 1024: connecting 213a, 213b by wireless communication system 100: (i) said one beam-port 101b2 to a first input 105in1 of a receiver 105 belonging to said wireless communication system, and (ii) said another beam-port 101bM to a second input 105in2 of said receiver. In step 1025: decoding, by said receiver 105, said first wireless signal 201sig1 arriving via said first input 105in1, together with said second wireless signal 201sig2 arriving via said second input 105in2, into said single data stream 299b.

Figure 8A:
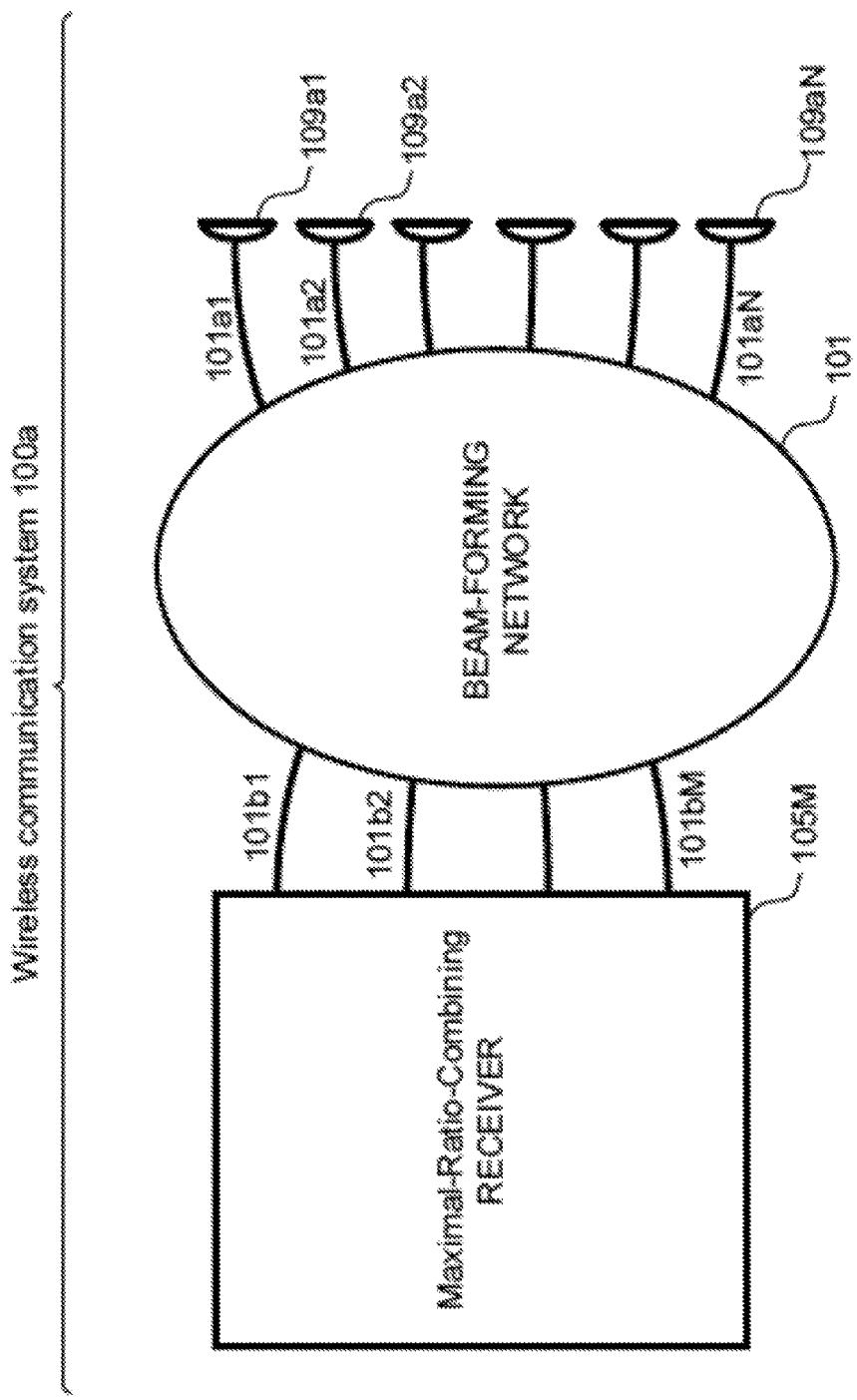
FIG. 8A illustrates one embodiment of a wireless communication system including a receiver and a beam-forming network.
Figure 8B:
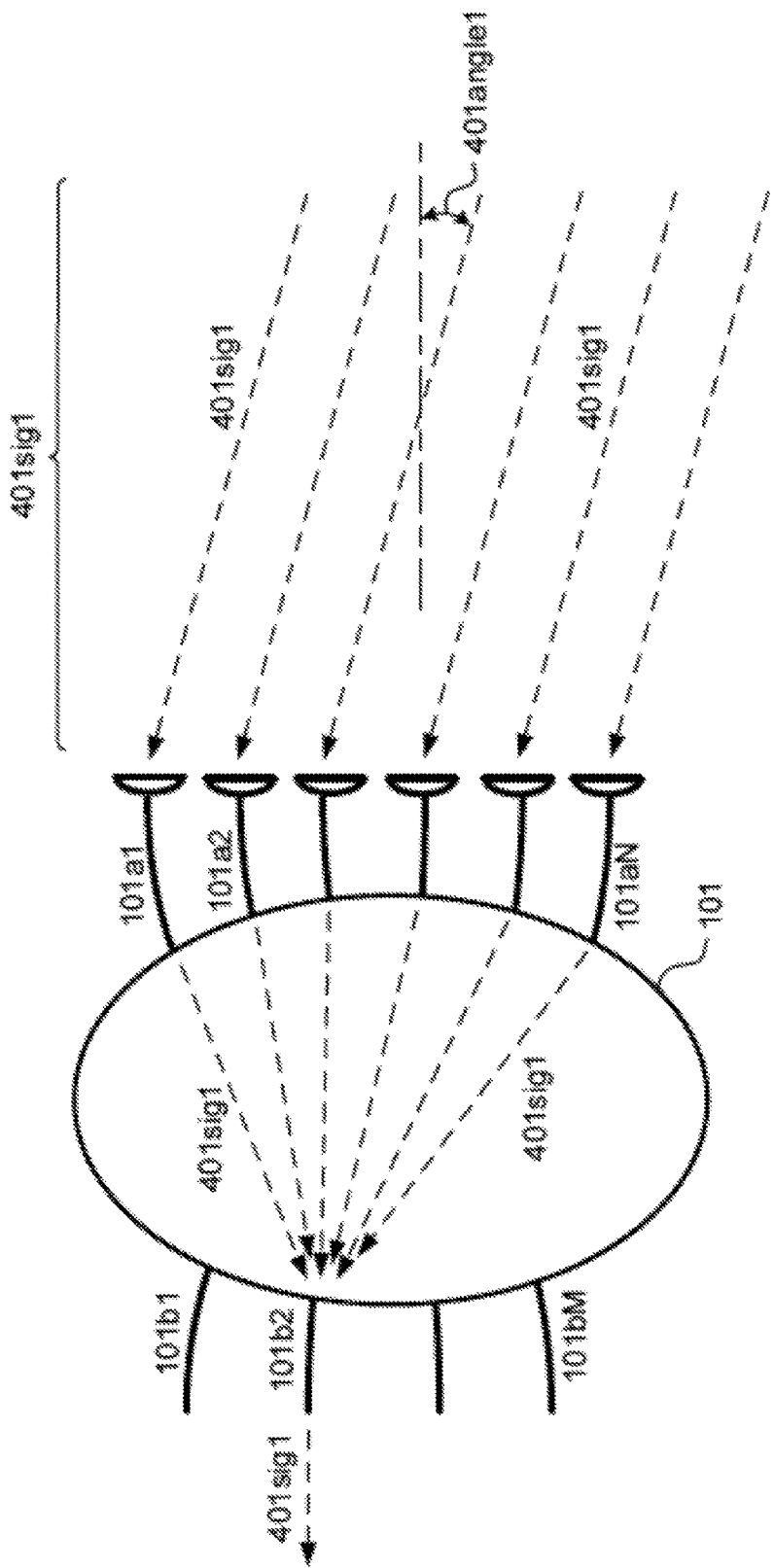
FIG. 8B illustrates one embodiment of a beam-forming network directing a first signal toward one beam-port.
Figure 8C:
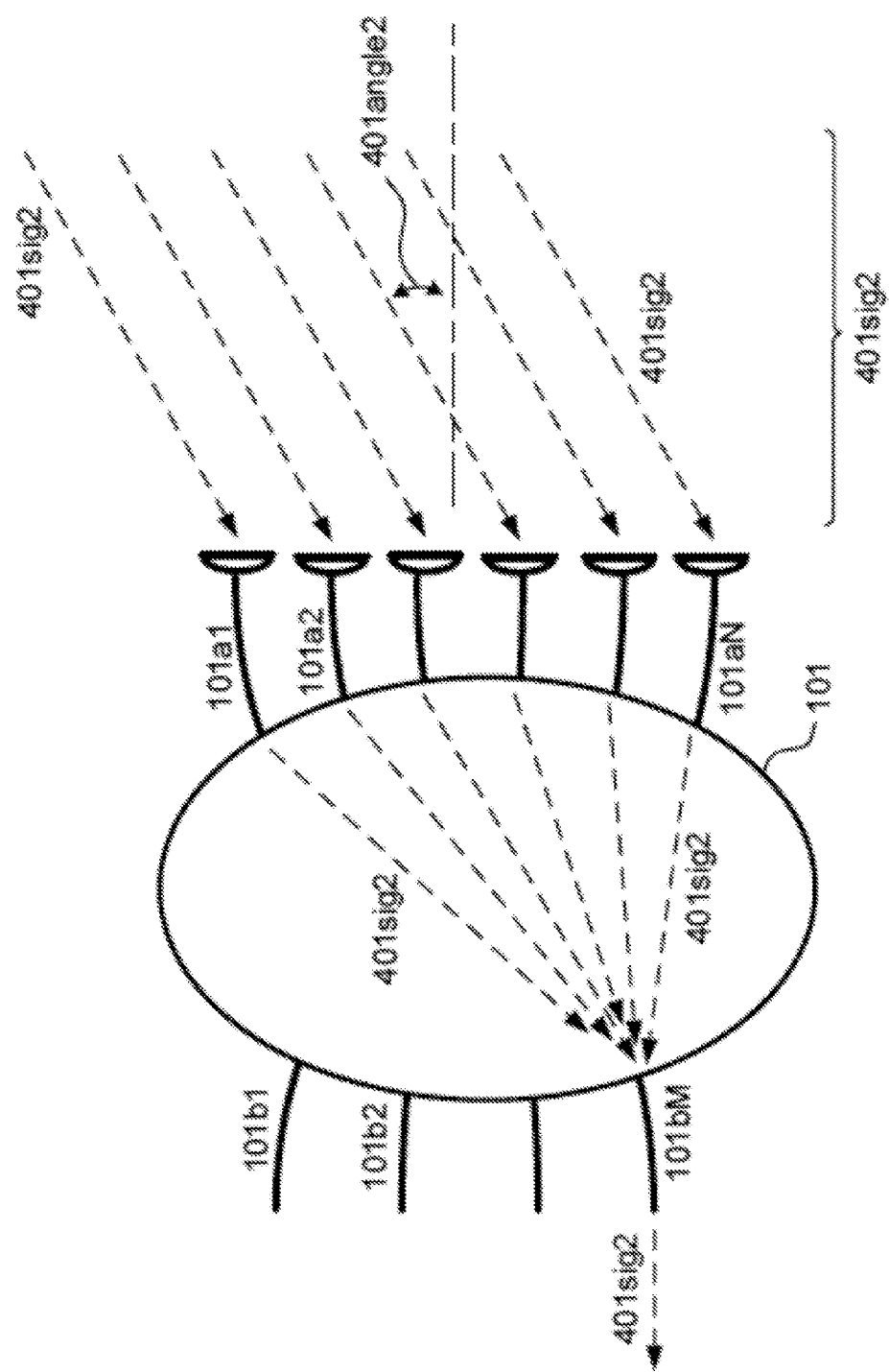
FIG. 8C illustrates one embodiment of a beam-forming network directing a second signal toward another beam-port.

FIG. 8A, FIG. 8B, FIG. 8C illustrate one embodiment for receiving multiple signals using maximal-ratio-combining and a beam-forming network. A beam-forming network 101 comprising a plurality of beam-ports 101b1, 101b2, 101bM concentrates: (i) a first wireless signal 401sig1 arriving at a plurality of array ports 101a1, 101a2, 101aN belonging to said beam-forming network, substantially into one 101b2 of said plurality of beam-ports, and (ii) a second wireless signal 401sig2 arriving at said plurality of array ports, substantially into another 101bM of said plurality of beam-ports, said second wireless signal is a multi-path version of said first wireless signal. A receiver 105M combines said first and second wireless signals, which arrive at said receiver via said one and another of beam-ports respectively, into a third resulting signal, using maximal-ratio-combining, thereby optimizing quality of said third resulting signal. In one embodiment, said one of beam-ports 101b2 is determined substantially by an angle of arrival 401angle1 of said first wireless signal 401sig1 into said plurality of array ports, and said another beam-ports 101bM is determined substantially by an angle of arrival 401angle2 of said second wireless signal 401sig2 into said plurality of array ports.

In one embodiment, said beam-forming network 101 is selected from a group consisting of: (i) a rotman-lense, (ii) a butler-matrix, (iii) a blass-matrix, and (iv) a fixed or passive beam-forming network.

In one embodiment, said first wireless signals 401sig1 is an orthogonal-frequency-division-multiplexing signal or an orthogonal-frequency-division-multiple-access signal, having a plurality of sub-carriers. In one embodiment, said maximal-ratio-combining is done at a level of said plurality of sub-carriers. In one embodiment, said first wireless signals 401sig1 is a direct-sequence-spread-spectrum signal or cck modulated signal.

In one embodiment, wireless communication system 100a to which said beam-forming network 101 and receiver 105M belong, uses information from said maximal-ratio-combining to generate a first and a second transmit signals which are coherent, and transmits said first and a second transmit signals via said one 101b2 and another 101bM of said beam-ports respectively.

In one embodiment, a wireless communication system 100a boosts reception range of wireless signals using a rotman-lense or butler-matrix as follows: a rotman-lense or butler-matrix 101 comprising a plurality of beam-ports 101b1, 101b2, 101bM is operative to: (i) focus a first wireless signal 401sig1 arriving at a plurality of array ports 101a1, 101a2, 101aN belonging to said rotman-lense or butler-matrix, substantially into one 101b2 of said plurality of beam-ports, said one of beam-ports is determined substantially by an angle of arrival 401angle1 of said first wireless signal into said plurality of array ports, and (ii) focus a second wireless signal 401sig2 that is a multi-path version of said first wireless signal, arriving at said plurality of array ports, substantially into another 101bM of said plurality of beam-ports, said another beam-port is determined substantially by an angle of arrival 401angle2 of said second wireless signal into said plurality of array ports; and a receiver 105M, is operative to combine said first and second wireless signals 401sig1, 401sig2, which arrive at said receiver via said one and another of beam-ports respectively, into a third resulting signal, using maximal-ratio-combining, thereby optimizing quality of said third resulting signal.

In one embodiment, said first wireless signal 401sig1 is an orthogonal-frequency-division-multiplexing signal or an orthogonal-frequency-division-multiple-access signal, having a plurality of sub-carriers. In one embodiment, said maximal-ratio-combining is done at a level of said plurality of sub-carriers. In one embodiment, said first wireless signals are a direct-sequence-spread-spectrum signal or CCK modulated signal. In one embodiment, said first and second wireless signals 401sig1, 401sig2 conform at least partially to IEEE-802.11n or IEEE-802.11 ac. In one embodiment, said wireless signals 401sig1, 401sig2 are transported using a frequency range of between 2.4 Ghz and 2.5 Ghz, and said rotman-lense or butler-matrix 101 is configured to operate directly in said frequency range. In one embodiment, said wireless signals 401sig1, 401sig2 are transported using a frequency range of between 4.8 Ghz and 5.8 Ghz, and said rotman-lense or butler-matrix is configured to operate directly in said frequency range.

In one embodiment, a plurality of antennas 109a1, 109a2, 109aN connected to said plurality of array-ports 101a1, 101a2, 101aN respectively, receive from a remote transceiver said first and second wireless signals 401sig1, 401sig2, thereby facilitating a substantial array gain associated with said plurality of antennas. In one embodiment said plurality of antennas produce a gain in excess of 10 dBi. In one embodiment, said plurality of antennas produce a gain in excess of 14 dBi. In one embodiment, said pluralities of antennas produce a gain in excess of 18 dBi. In one embodiment, there are 4 of said plurality of antennas present. In one embodiment, there are 4 of said plurality of array-ports, and 8 of said plurality of beam-ports present. In one embodiment, there are 6 of said plurality of antennas present. In one embodiment, there are 6 of said plurality of array-ports, and 8 of said plurality of beam-ports present. In one embodiment, there are 6 of said plurality of array-ports, and 16 of said plurality of beam-ports present. In one embodiment, there are 8 of said plurality of antennas present.

Figure 9:
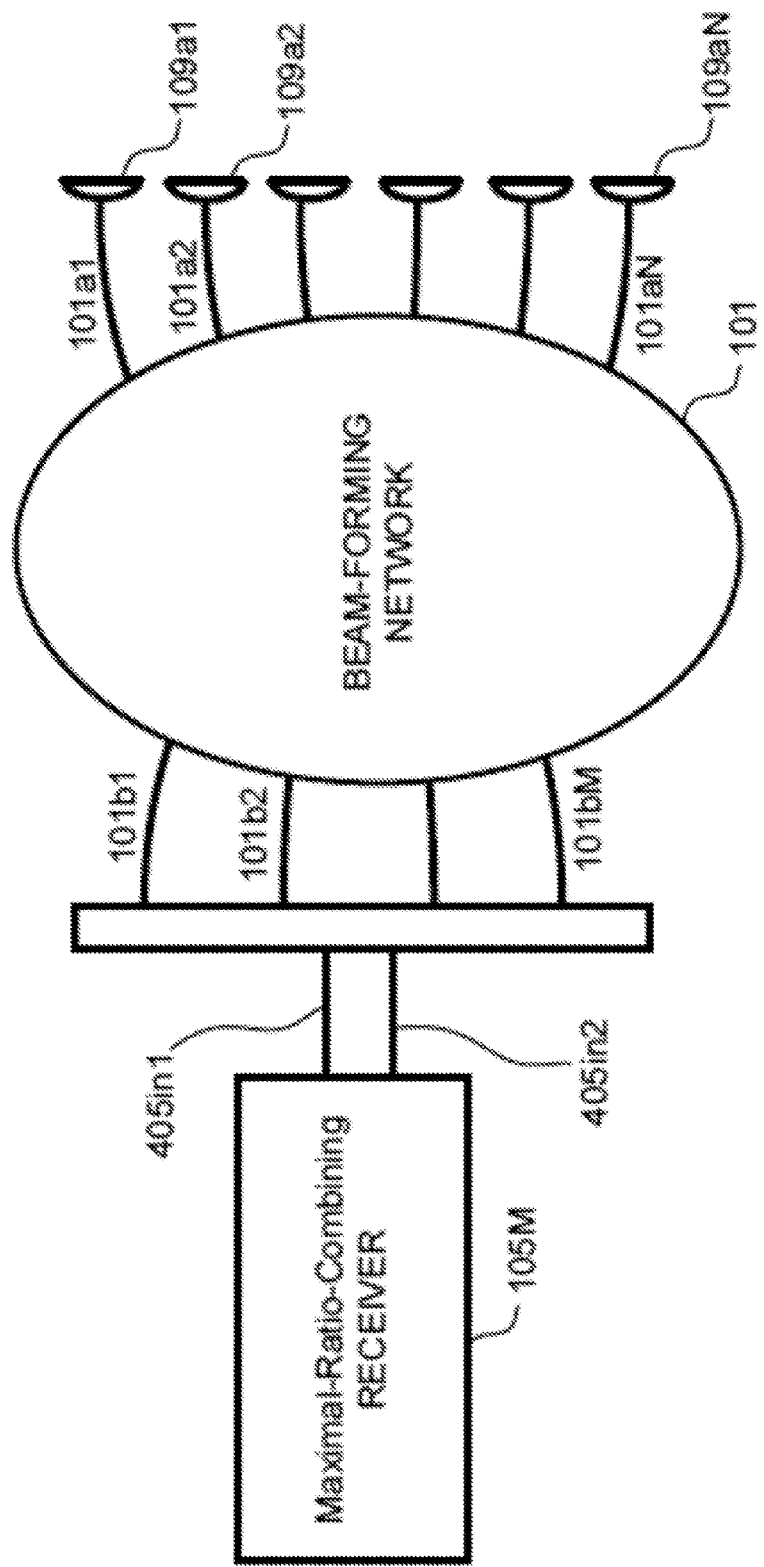
FIG. 9 illustrates one embodiment of a wireless communication system including a receiver and a beam-forming network.

FIG. 9 illustrates one embodiment for receiving multi-path wireless signals via a beam-forming network. A beam-forming network 101 comprising a plurality of beam-ports 101b1, 101b2, 101bM and belonging to a wireless communication system, detects a first and a second directions 401angle1, 401angle2 through which a first and a second wireless signals 401sig1, 401sig2 arrive at said wireless communication system respectively, said second wireless signal 401sig2 is a multi-path version of said first wireless signal 401sig1. Said wireless communication connects: (i) a first of said beam-port 101b2, that is associated with said first direction 401angle1, to a first input 405in1 of a receiver 105M belonging to said wireless communication system, and (ii) a second 101bM of said beam-port, that is associated with said second direction 401angle2, to a second input 405in1 of said receiver. Receiver 105M decodes, using maximal-ratio-combining, the first and second wireless signals 401sig1, 401sig2 received via said first and second inputs.

In one embodiment, said detection of said first and second directions 401angle1, 401angle2 is done as follows: measuring a plurality of output power levels of at least some of said plurality of beam-ports respectively, by using a plurality of power detectors connected to said plurality of beam-ports respectively, said plurality of power detectors belonging to said wireless communication system; and identifying, by said wireless communication system, said first and second beam-ports having strongest of said plurality of output power levels, thereby detecting said first and second directions associated with said first and a second wireless signals respectively. In one embodiment, said detection of said first and second directions may include: searching, by said wireless communication system, among said plurality of beam-ports, for a signature belonging to said first wireless signal; and identifying said first signature as being present at said first and second beam-ports, thereby associating said first and second wireless signals with said first and second beam-ports, thereby associating said first and second wireless signals with said first and second directions, thereby achieving said detection.

Figure 10:
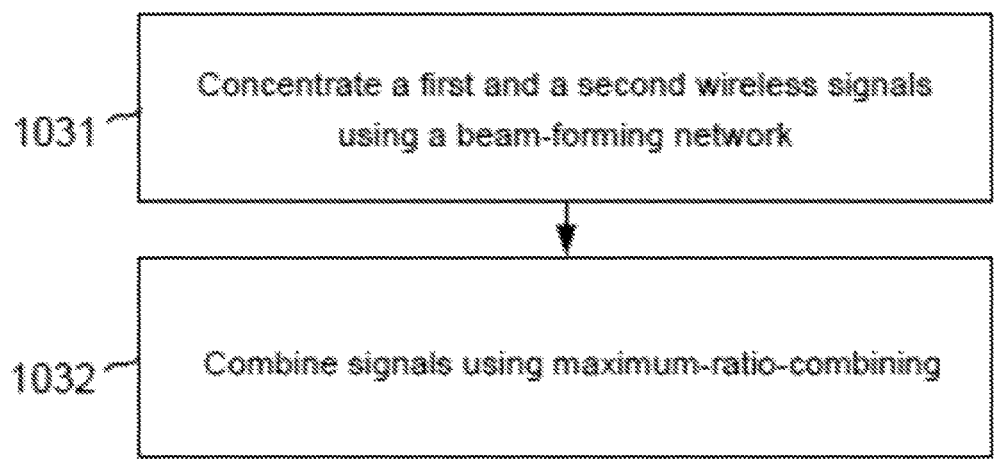
FIG. 10 is one embodiment of a flow diagram for receiving signals.

FIG. 10 is a flow diagram illustrating one embodiment of receiving multiple signals using maximal-ratio-combining and a beam-forming network. In step 1031: concentrating by a beam-forming network 101 comprising a plurality of beam-ports 101b1, 101b2, 101bM: (i) a first wireless signal 401sig1 arriving at a plurality of array ports 101a1, 101a2, 101aN belonging to said beam-forming network, substantially into one 101b2, of said plurality of beam-ports, and (ii) a second wireless signal 401sig2 arriving at said plurality of array ports, substantially into another 101bM of said plurality of beam-ports, said second wireless signal is a multi-path version of said first wireless signal. In step 1032: combining, by a receiver 105M, said first and second wireless signals, which arrive at said receiver via said one and another of beam-ports respectively, into a third resulting signal, using maximal-ratio-combining, thereby optimizing quality of said third resulting signal.

Figure 11:
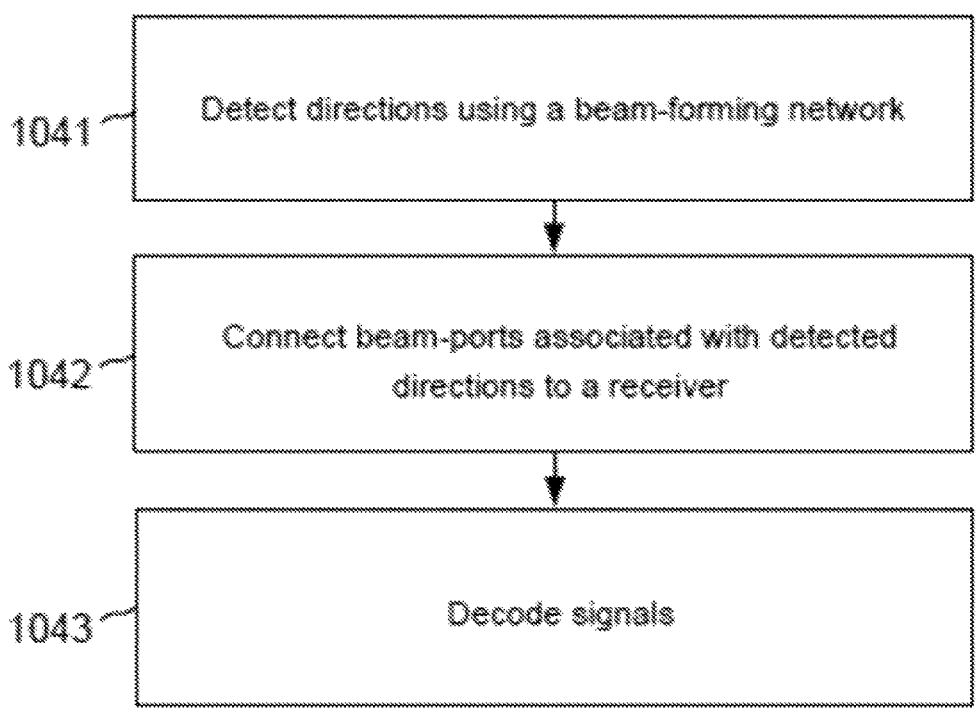
FIG. 11 is one embodiment of a flow diagram for receiving signals.

FIG. 11 is a flow diagram illustrating one embodiment of receiving multi-path wireless signals via a beam-forming network. In step 1041: detecting, using a beam-forming network 101 comprising a plurality of beam-ports 101b1, 101b2, 101bM and belonging to a wireless communication system, a first and a second directions 401angle1, 401angle2 through which a first and a second wireless signals 401sig1, 401sig2 arrive at said wireless communication system respectively, said second wireless signal is a multi-path version of said first wireless signal. In step 1042: connecting, by said wireless communication system: (i) a first of said beam-port 101b2 that is associated with said first direction, to a first input 405in1 of a receiver 101M belonging to said wireless communication system, and (ii) a second 101bM of said beam-port, that is associated with said second direction, to a second input 405in1 of said receiver. In step 1043: decoding using maximal-ratio-combining, by said receiver, the first and second wireless signals received via said first and second inputs.

In one embodiment, a method for selecting receiving directions for wireless data packets, in which each direction is selected separately and dynamically for each wireless data packet, comprises: detecting, using a beam-forming network 101 comprising a plurality of beam-ports 101b1, 101b2, 101bM and belonging to a wireless communication system 100, a direction 201angle1 through which a beginning 239a of a wireless data packet 239 arrives at said wireless communication system; connecting, by said wireless communication system, one of said beam-port 101b2 that is associated with said direction 201angle1, to a receiver 105 belonging to said wireless communication system; and receiving, by said receiver, at least a majority 239c of said wireless data packet via said beam-port.

In one embodiment, said detection is done during a first 4 microsecond 239a of said wireless data packet 239, arriving at wireless communication system 100. In one embodiment, said connection is done at most 2 microseconds 239b after said detection. In one embodiment, said detection and said connection are done fast enough, thereby allowing receiver 105 enough time 239c to decode wireless data packet 239. In one embodiment, said first 4 microseconds of wireless data packet 239 contains preamble information, thereby said connection may occur within said 4 microseconds without losing any data belonging to said single data stream. In one embodiment, said beam-forming network 101 is selected from a group consisting of: (i) a rotman-lense, (ii) a butler-matrix, (iii) a blass-matrix, and (iv) a fixed or passive beam-forming network.

Figure 12A:
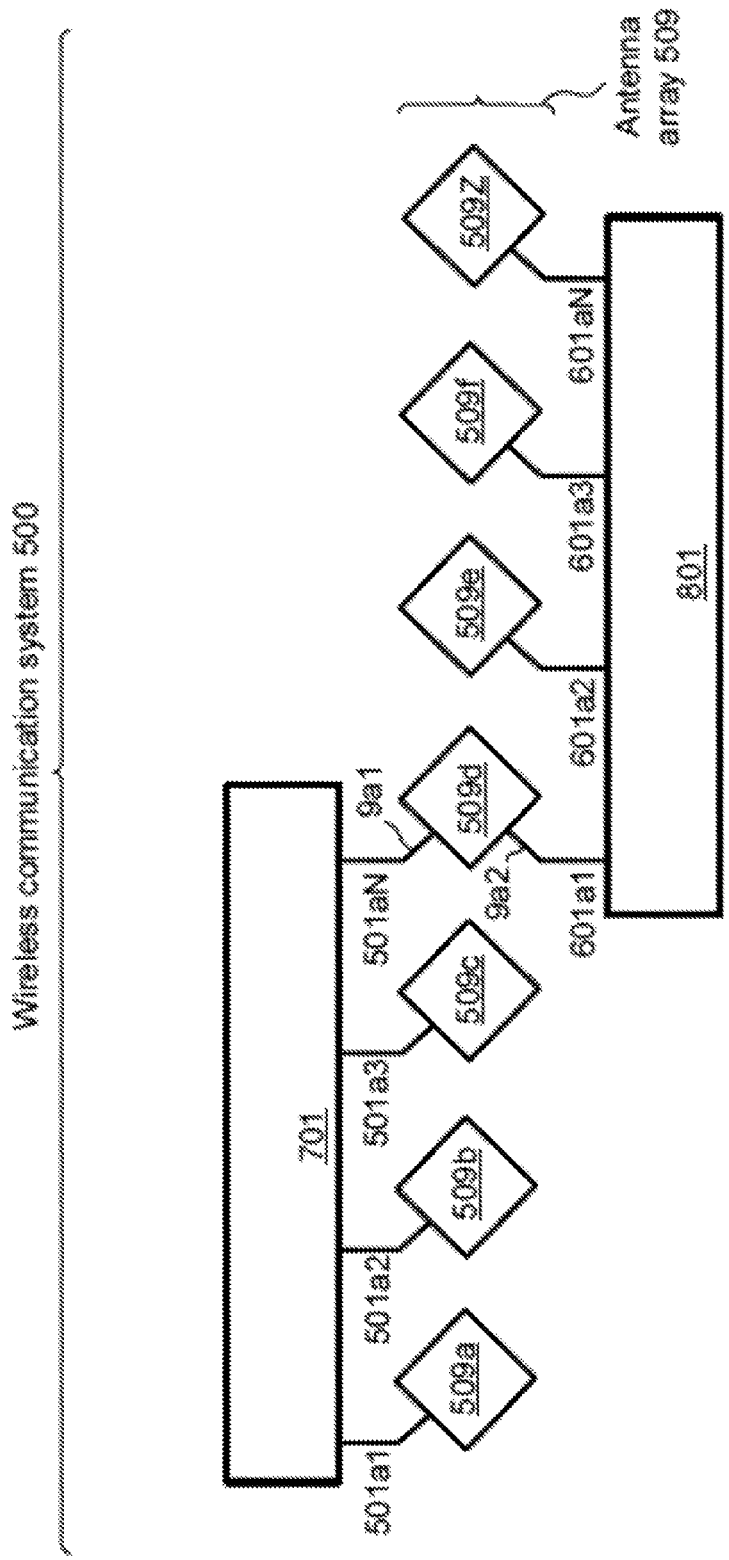
FIG. 12A illustrates one embodiment of a wireless communication system capable of generating a plurality of beams via an antenna array using combined capabilities of at least two beam-forming networks.

FIG. 12A illustrates one embodiment of a wireless communication system 500 capable of generating a plurality of beams via an antenna array 509 using combined capabilities of at least two beam-forming networks. Wireless communication system 500 includes: (i) an antenna array 509 having at least two antennas 509a, 509b, 509c, 509d, 509e, 509f, and 509Z, out of which at least one antenna is a cross-polarized antenna 509d having a first-polarity 9a1 and a second-polarity 9a2 inputs; 7 antennas are illustrated as a non-limited example, and (ii) at least a first 701 and a second 801 beam-forming networks, each having at least two array ports: array ports 501a1, 501a2, 501a3, 501aN belonging to the first beam-forming network 701, and array ports 601a1, 601a2, 601a3, 601aN belonging to the second beam-forming network 801, each of said at least two array ports connected to one of said at least two antennas: array port 501a1 connected to antenna 509a, array port 501a2 connected to antenna 509b, array port 501a3 connected to antenna 509c, array port 501aN connected to antenna 509d, array port 601a1 connected to antenna 509d, array port 601a2 connected to antenna 509e, array port 601a3 connected to antenna 509f, and array port 601aN connected to antenna 509Z; four array ports per each beam-forming network are illustrated as a non-limiting example. At least one of said array ports 501aN belonging to the first beam-forming network 701 is connected to the at least one cross-polarized antenna 509d via the first-polarity input 9a1, and at least one of said array ports 601a1 belonging to the second beam-forming network 801 is connected to the at least one cross-polarized antenna 509d via the second-polarity input 9a2. One cross-polarized antenna 509d is depicted in a non-limiting fashion, but more than one cross-polarized antenna are possible, thereby allowing more than one antenna to connect with both the first and the second beam-forming networks via first and second polarity inputs respectively.

Figure 12B:
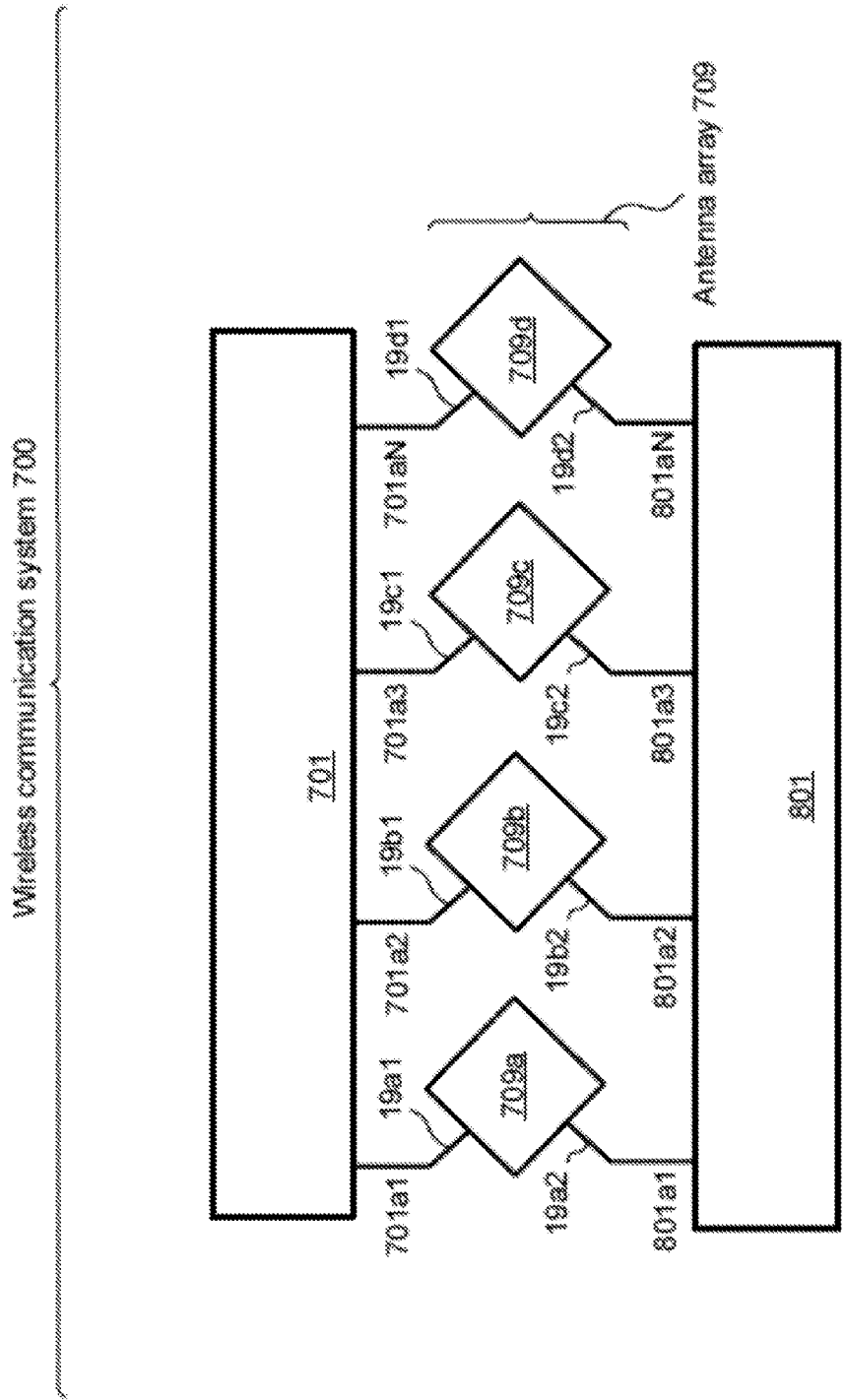
FIG. 12B illustrates one embodiment of a wireless communication system capable of generating a plurality of beams via an antenna array using combined capabilities of at least two beam-forming networks.

FIG. 12B illustrates one embodiment of a wireless communication system 700 capable of generating a plurality of beams via an antenna array 709 using combined capabilities of at least two beam-forming networks. Wireless communication system 700 includes: (i) an antenna array 709 having at least two antennas 709a, 709b, 709c, 509d, wherein each of the antennas are cross-polarized, and each having a first-polarity and a second-polarity inputs: antenna 709a having a first-polarity input 19a1 and a second-polarity input 19a2, antenna 709b having a first-polarity input 19b1 and a second-polarity input 19b2, antenna 709c having a first-polarity input 19c1 and a second-polarity input 19c2, and antenna 709d having a first-polarity input 19d1 and a second-polarity input 19d2; 4 antennas are illustrated as a non-limited example, and (ii) at least a first 701 and a second 801 beam-forming networks, each having at least two array ports: array ports 701a1, 701a2, 701a3, 701aN belonging to the first beam-forming network 701, and array ports 801a1, 801a2, 801a3, 801aN belonging to the second beam-forming network 801. The at least two array ports 701a1, 701a2, 701a3, 701aN belonging to said first beam-forming network 701 are connected to the at least two cross-polarized antennas 709a, 709b, 709c, 709d, respectively, via the first-polarity input 19a1, 19b1, 19c1, 19d1 of each of the at least two cross-polarized antennas, respectively. The at least two array ports 801a1, 801a2, 801a3, 801aN belonging to the second beam-forming network 801 are connected to the at least two cross-polarized antennas 709a, 709b, 709c, 709d, respectively, via the second-polarity input 19a2, 19b2, 19c2, 19d2 of each of the at least two cross-polarized antennas, respectively, such that each of the at least two antennas 709a, 709b, 709c, 709d is connected to both the first 701 and the second 801 beam-forming networks.

Figure 12C:
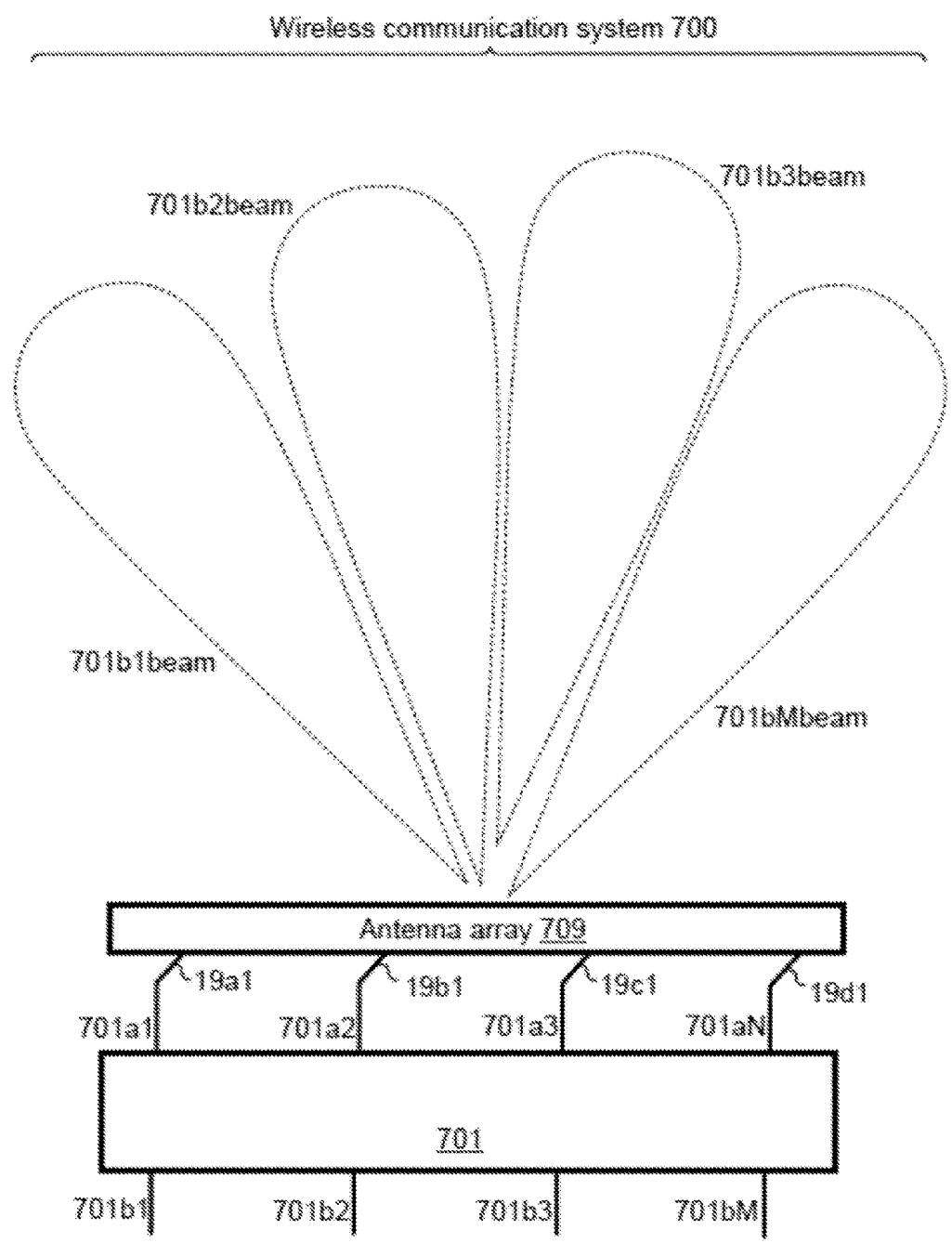
FIG. 12C and FIG. 12D illustrate one embodiment of a plurality of beams generated by injecting radio-frequency signals to beam ports of a plurality of beam-forming networks.
Figure 12D:
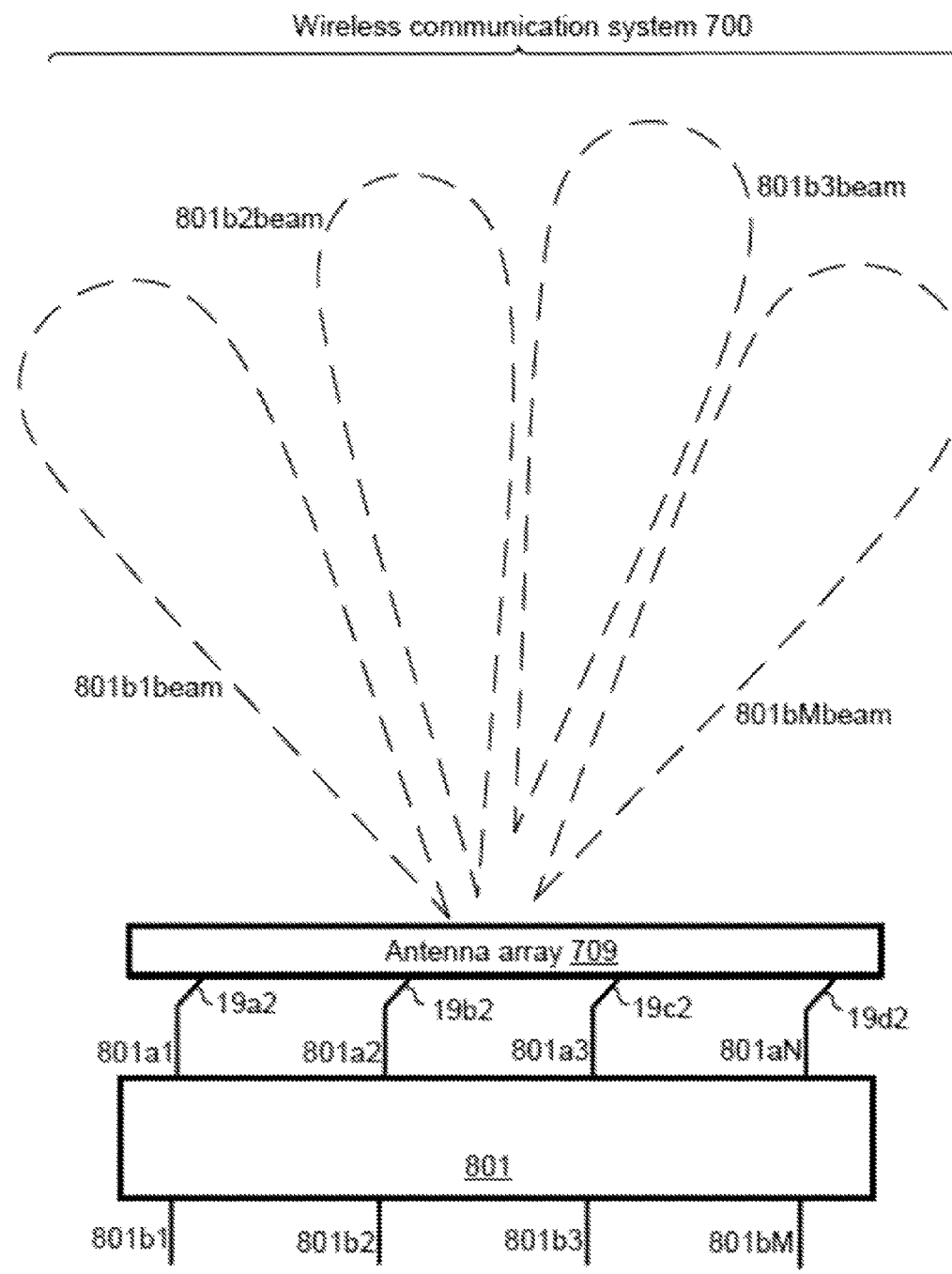

FIG. 12C and FIG. 12D illustrate one embodiment of a plurality of beams generated by injecting radio-frequency signals to beam ports of a plurality of beam-forming networks. wireless communication system 700 further includes: (i) at least a first 701b1 and a second 701bM beam-ports belonging to the first beam-forming network 701; four beam ports 701b1, 701b2, 701b3, 701bM are illustrated as a non-limiting example, and (ii) at least a first 801b1 and a second 801bM beam-ports belonging to the second beam-forming network 801; four beam ports 801b1, 801b2, 801b3, 801bM are illustrated as a non-limiting example. Wireless communication system 700: (i) generates a first 701b1 beam and a second 701bMbeam first-polarity-beams having a first and a second directions, respectively, by injection a first and a second radio-frequency signals, respectively, into the first 701b1 and the second 701bM beam-ports belonging to the first beam-forming network 701, respectively, and (ii) generates a first 801b1beam and a second 801bMbeam second-polarity-beams having a first and a second directions, respectively, by injection a first and a second radio-frequency signals, respectively, into the first 801b1 and the second 801bM beam-ports belonging to the second beam-forming network 801, respectively. It is noted that a single antenna array 709 may be used to generate all of the different beams 701b1beam, 701bMbeam, 801b1beam, 801bMbeam, despite the fact that two different beam-forming networks 701, 801 are in use, each responsible to only some of the beams.

In one embodiment, at least one of the first 701 and second 801 beam-forming networks is a rotman-lens. In one embodiment, at least one of the first 701 and second 801 beam-forming networks is a butler-matrix. In one embodiment, at least one of the first 701 and second 801 beam-forming networks is a blass-matrix. In one embodiment, at least one of the first 701 and second 801 beam-forming networks is a passive beam-forming network.

Figure 12E:
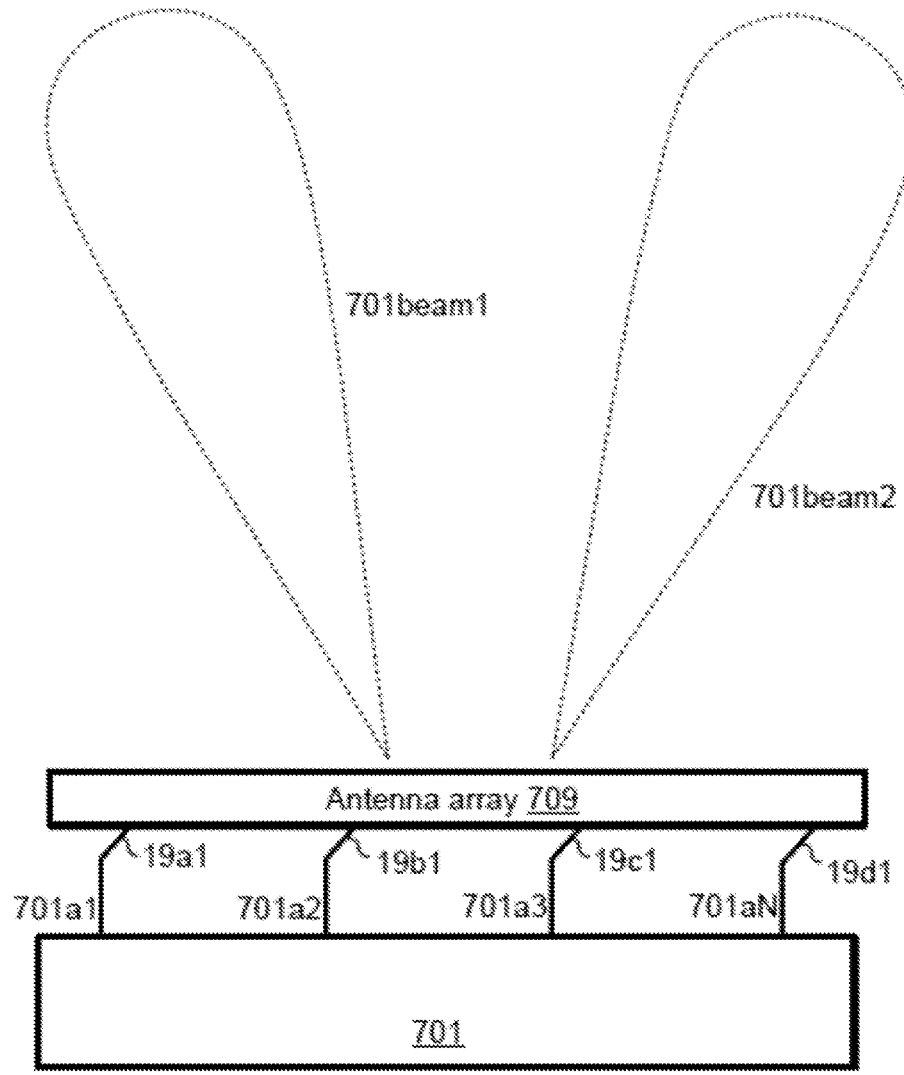
FIG. 12E and FIG. 12F illustrate one embodiment of a plurality of beams generated by a plurality of beam-forming networks.
Figure 12F:
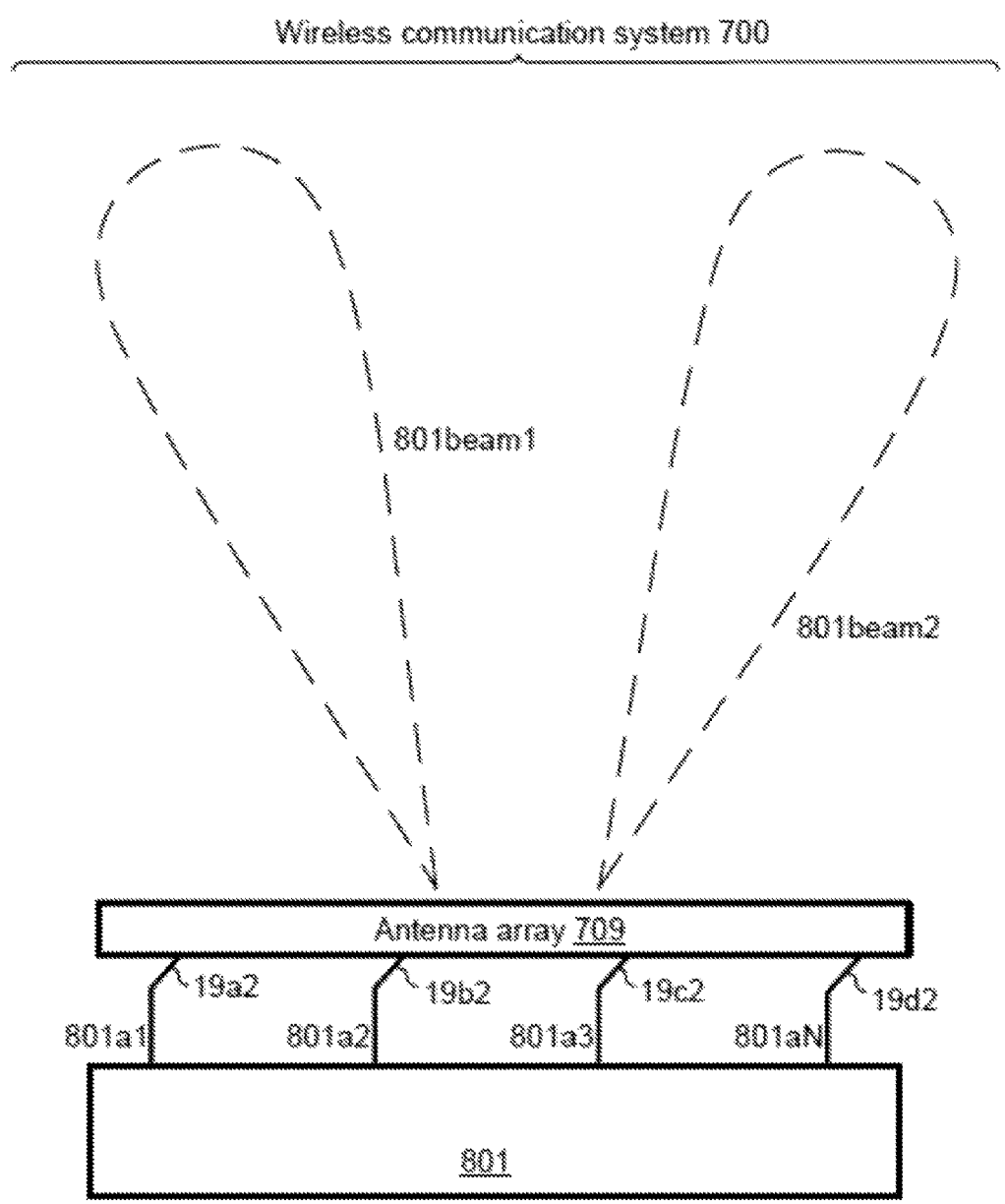
Figure 12G:
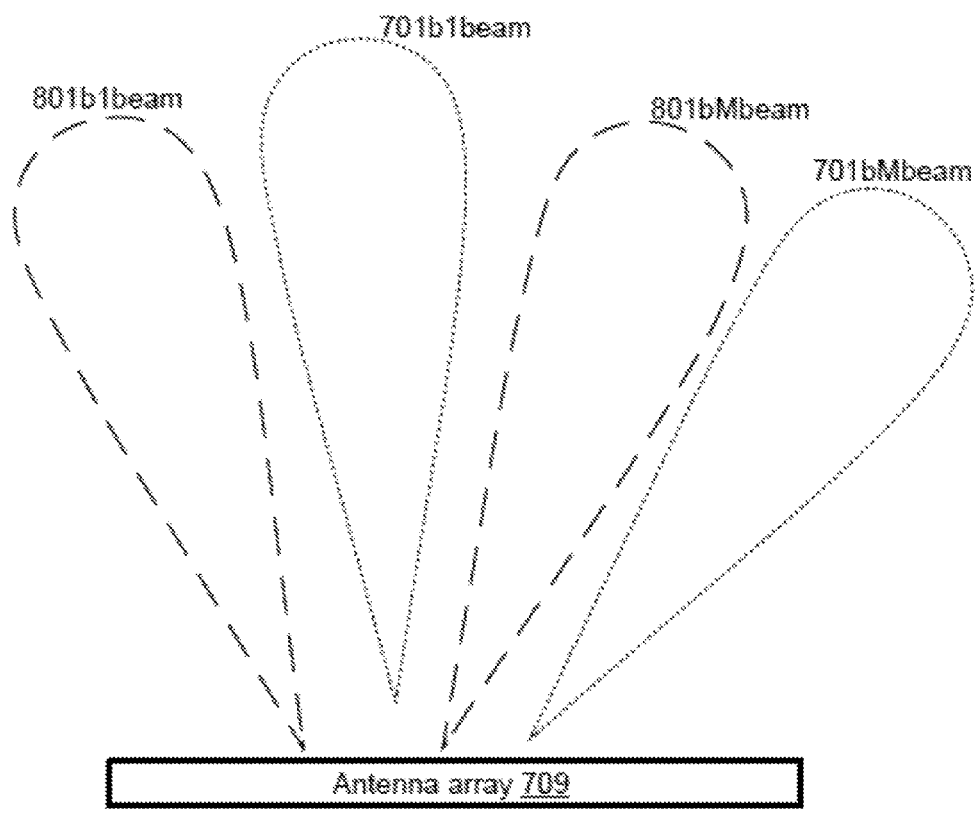
FIG. 12G illustrates one embodiment beam directions.

FIG. 12G illustrates one embodiment beam directions. The first and second directions of the first 701b1beam and second 701bMbeam first-polarity-beams are different than the first and second directions of the first 801b1beam and a second 801bMbeam second-polarity-beams. It is noted that all directions of all beams may be different and unique. It is noted that the first polarity beams 701b1beam, 701bMbeam may be interleaved with the second polarity beams 801b1beam, 801bMbeam, thereby creating a dense beam coverage of a certain sector.

In one embodiment, the first 701 and second 801 beam-forming networks are a first and second butler-matrixes respectively. In one embodiment, the directions of beams 701b1beam and 701bMbeam associated with the first butler-matrix are made different than the directions of beams 801b1beam and 801bMbeam associated with the second butler-matrix, by intentionally introducing radio-frequency phase shifts between (i) the at least two array ports 701a1, 701a2, 701a3, 701aN belonging to the first butler-matrix and (ii) the at least two antennas 709a, 709b, 709c, 709d, respectively. According to one non-limiting example, the first and second butler-matrices are of the same order. According to one non-limiting example, the first and second butler-matrices are identical. In one embodiment, the radio-frequency phase shifts are progressively linear with array port number: as a non-limiting example, the phase shift between array port 701aN and antenna 709d is made higher by X degrees than the phase shift between array port 701a3 and antenna 709c, which is made higher by additional X degrees than the phase shift between array port 701a2 and antenna 709b, which is made higher by additional X degrees than the phase shift between array port 701a1 and antenna 709a, which may be zero. In one embodiment, the radio-frequency phase shifts are static. According to one non-limiting example, the phase shifts are made by using micro-strip delay lines.

In one embodiment, the first and second radio-frequency signals at least partially conform to IEEE-802.11. In one embodiment, the first and second radio-frequency signals at least partially conform to IEEE-802.11n. In one embodiment the first and second radio frequency signals at least partially conform to IEEE-802.11 ac. In one embodiment the first and second radio-frequency signals are within a frequency range of between 2.4 Ghz and 2.5 Ghz, and the first and second beam-forming networks 701, 801 operate directly in said frequency range. In one embodiment the first and second radio-frequency signals are within a frequency range of between 4.8 Ghz and 5.8 Ghz, and the first and second beam-forming networks 701, 801 operate directly in said frequency range.

Figure 13:
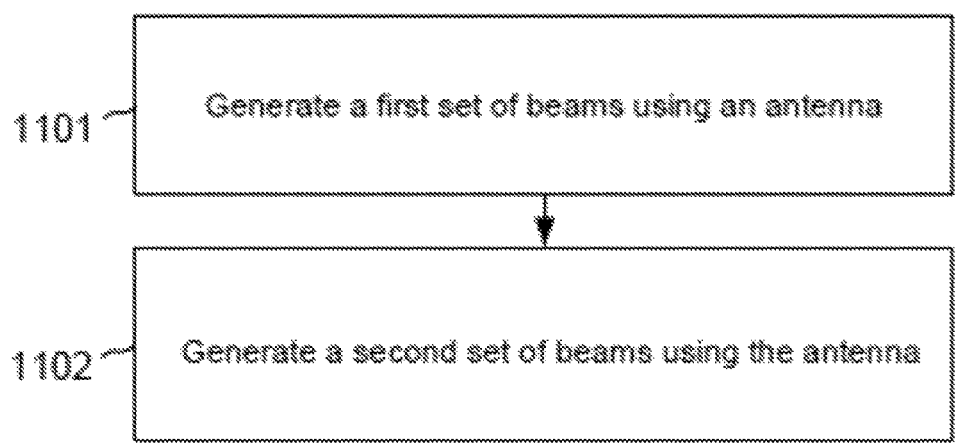
FIG. 13 illustrates one embodiment of a method for increasing beam count by combining two beam-forming networks.

FIG. 12E and FIG. 12F illustrate one embodiment of a plurality of beams generated by a plurality of beam-forming networks. Wireless communication system 700 generates a first 701beam1 FIG. 12E and a second 701beam2 first-polarity-beams having a first and a second directions, respectively, by applying appropriate radio-frequency signals by the first beam-forming network 701 via the first-polarity input 19a1 to 19d1 of each of the at least two cross-polarized antennas of antenna array 709. Wireless communication system 700 further generates a first 801beam1 and a second 801beam2 second-polarity-beams having a first and a second directions, respectively, by applying appropriate radio-frequency signals by the second beam-forming network 801 via the second-polarity input 19a2 to 19d2 of each of said at least two cross-polarized antennas of antenna array 709. In one embodiment at least one of the first 701 and second 801 beam-forming networks is a digital-signal-processing based beam-forming network. In one embodiment at least one of the first 701 and second 801 beam-forming networks is an active-antenna-switching based beam-forming network. In one embodiment at least one of the first 701 and second 801 beam-forming networks is a maximal-ratio-combining network. FIG. 13 illustrates one embodiment of a method for increasing beam count by combining two beam-forming networks. In step 1101, generating a first set of beams 701b1beam, 701bMbeam having a first beam polarity using a first beam-forming network 701 connected to a cross-polarized phased-array antenna 709 via a set of first-polarity inputs 19a1, 19b1, 19c1, 19d1. In step 1102, generating a second set of beams 801b1beam, 801bMbeam having a second beam polarity using a second beam-forming network 801 connected to the cross-polarized phased-array antenna 709 via a set of second-polarity inputs 19a2, 19b2, 19c2, 19d2. In one embodiment, each one of the first 701 and second 801 beam-forming networks may be: (i) a rotman-lense, (ii) a butler-matrix, (iii) a blass-matrix, or (iv) a fixed or passive beam-forming network.

In one embodiment, the first 701 and second 801 beam-forming networks are first and second butler-matrixes respectively. In one embodiment, the cross-polarized phased-array antenna 709 includes N cross-polarized antennas 709a, 709b, 709c, 709d each having a first polarity and a second polarity inputs, such that the set of first-polarity inputs includes N 19a1, 19b1, 19c1, 19d1 inputs and said set of second-polarity inputs comprises N inputs 19a2, 19b2, 19c2, 19d2 as well. The first butler-matrix 701 is of order N, comprising N array ports 701a1, 701a2, 701a3, 701aN connected to said first-polarity inputs 19a1, 19b1, 19c1, 19d1 respectively. The second butler-matrix 801 is of order N, comprising N array ports 801a1, 801a2, 801a3, 801aN connected to said second-polarity inputs 19a2, 19b2, 19c2, 19d2 respectively, and therefore: (i) the first set of beams 701b1beam, 701b2beam, 701b3beam, 701bMbeam comprises N beams directed into N different directions respectively, (ii) the second set of beams 801b1beam, 801b2beam, 801b3beam, 801bMbeam comprises N beams directed into N different directions respectively, thereby generating a total of 2 times N beams 701b1beam, 701b2beam, 701b3beam, 701bMbeam, 801b1beam, 801b2beam, 801b3beam, 801bMbeam, that may be directed into as many as 2 times N directions. It is noted that FIG. 12C and FIG. 12D illustrate a non-limiting example of N=4. In one embodiment, radio-frequency phase shifts are introduced, each progressively linear with array port number, between (i) said N array ports 701a1, 701a2, 701a3, 701aN belonging to the first butler-matrix 701 and (ii) said N cross-polarized antennas 709a, 709b, 709c, 709d, respectively, thereby generating the 2 times N beams into unique 2 times N directions.

Figure 14B:
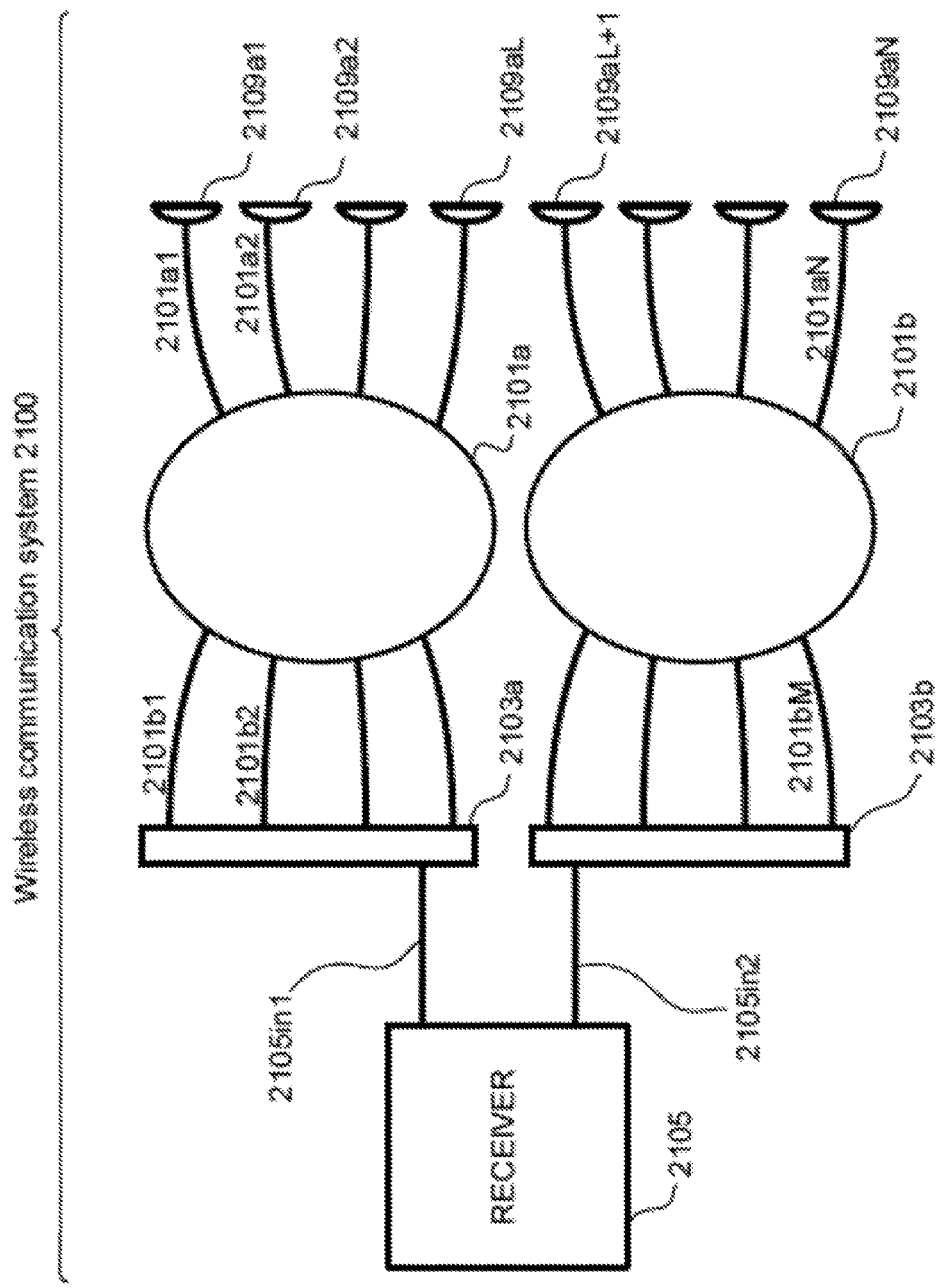
FIG. 14B illustrates one embodiment of a wireless communication system capable of combining signals from several beam-forming networks using radio-frequency switching fabrics.

FIG. 14A and FIG. 14B illustrate some embodiments of a wireless communication system 2100 capable of combining signals from several beam-forming networks. In one embodiment, wireless communication system 2100 includes: (i) a plurality of antennas 2109a1, 2109a2 to 2109aN; 8 antennas are illustrated in a non-limiting fashion, and (ii) at least a first 2101a and a second 2101b beam-forming networks connected via array ports 2101a1, 2101a2 to 2101aN to said plurality of antennas 2109a1, 2109a2 to 2109aN respectively. Two beam-forming networks are illustrated in a no-limiting fashion, but three, four, or even more beam-forming networks are possible. The first beam-forming network 2101a is illustrated as having four array ports connected to four corresponding antennas in a non-limiting fashion. The second beam-forming network 2101b is illustrated as having four array ports connected to four corresponding antennas in a non-limiting fashion. The first 2101a and second 2101b beam-forming networks combine coherently, respectively, a first 2201sig1 and a second 2201sig2 wireless signals arriving at the antennas, into a first 2201inter1 and a second 2201inter2 intermediate signals respectively as follows: The first wireless signal 2201sig1: (i) arrives at the antennas connected to the first beam-forming network 2101a, then (ii) reaches the first beam-forming network 2101a through the array ports connecting the first beam-forming network 2101a to the antennas, and then (iii) concentrated into intermediate signal 2201inter1 by the first beam-forming network 2101a. Similarly, the second wireless signal 2201sig2: (i) arrives at the antennas connected to the second beam-forming network 2101b, then (ii) reaches the second beam-forming network 2101b through the array ports connecting the second beam-forming network 2101b to the antennas, and then (iii) concentrated into intermediate signal 2201inter2 by the second beam-forming network 2101b. Wireless communication system 2100 further includes a receiver 2105 connected to the first 2101a and second 2101b beam-forming networks. The receiver 2105 processes the first 2201inter1 and second 2201inter2 intermediate signals into a single data stream. In one embodiment, the antennas 2109a1, 2109a2 to 2109aN are arranged as at least a first 2109a1, 2109a2 to 2109aL and a second 2109aL+1 to 2109aN antenna arrays. The first 2101a and second 2101b beam-forming networks are connected via the plurality of array ports to the first and second antenna arrays respectively. The first 2101a and second 2101b beam-forming networks combine coherently the first and second wireless signals arriving at said first and second antenna arrays respectively, into the first and second intermediate signals respectively.

In one embodiment, the receiver 2105 is connected to the first 2101a and the second 2101b beam-forming networks via a plurality of beam-ports 2101b1, 2101b2 to 2101bM belonging to said first and second beam-forming networks. In one embodiment, wireless communication system 2100 further includes: (i) a first radio-frequency switching fabric 2103a, capable of routing one of the beam-ports belonging to the first beam-forming network 2101a to a first input 2105in1 of the receiver 2105 according to a detection criterion in accordance with some embodiments. The first input 2105in1 admits the first intermediate signal 2201inter1 into the receiver 2105, and a second radio-frequency switching fabric 2103b, capable of routing one of the beam-ports belonging to the second beam-forming network 2101b to a second input 2105in2 of the receiver 2105 according to a detection criterion in accordance with some embodiments. The second input 2105in2 admits the second intermediate signal 2201inter2 into the receiver 2105.

In one embodiment, the processing of the first 2201inter1 and second 2201inter2 intermediate signals includes combining of the first and the second intermediate signals using maximal-ratio-combining techniques, thereby achieving a reception gain which is a combination of gains achieved by (i) said first and second beam-forming networks and (ii) said maximal-ratio-combining techniques. In one embodiment, the first 2201sig1 and the second 2201sig2 wireless signals are a mixture of a first and a second spatially multiplexed wireless signals generated by a remote transceiver from a single data stream, and the processing of the first 2201inter1 and the second 2201inter2 intermediate signals includes decoding the first and the second wireless signals into the single data stream, thereby achieving said decoding together with a reception gain including gains of the first 2101a and the second 2101b beam-forming networks. In one embodiment, the first and second spatially multiplexed wireless signals are used by the IEEE-802.11n standard to boost transmission rates of said single data stream.

In one embodiment, the first 2201sig1 and the second 2201sig2 wireless signals at least partially conform to IEEE-802.11. In one embodiment, the first 2201sig1 and the second 2201sig2 wireless signals at least partially conform to IEEE-802.11n. In one embodiment, the first 2201sig1 and the second 2201sig2 wireless signals at least partially conform to IEEE-802.11 ac. In one embodiment, the first 2201sig1 and the second 2201sig2 wireless signals are transported using a frequency range of between 2.4 Ghz and 2.5 Ghz, and the first 2101a and the second 2101b beam-forming networks operate directly in said frequency range. In one embodiment, the first 2201sig1 and the second 2201sig2 wireless signals are transported using a frequency range of between 4.8 Ghz and 5.8 Ghz, and the first 2101a and the second 2101b beam-forming networks operate directly in said frequency range. In one embodiment, at least one of the first 2101a and the second 2101b beam-forming networks is a: (i) a rotman-lense, (ii) a butler-matrix, (iii) a blass-matrix, or (iv) a fixed or passive beam-forming network.

Figure 15:
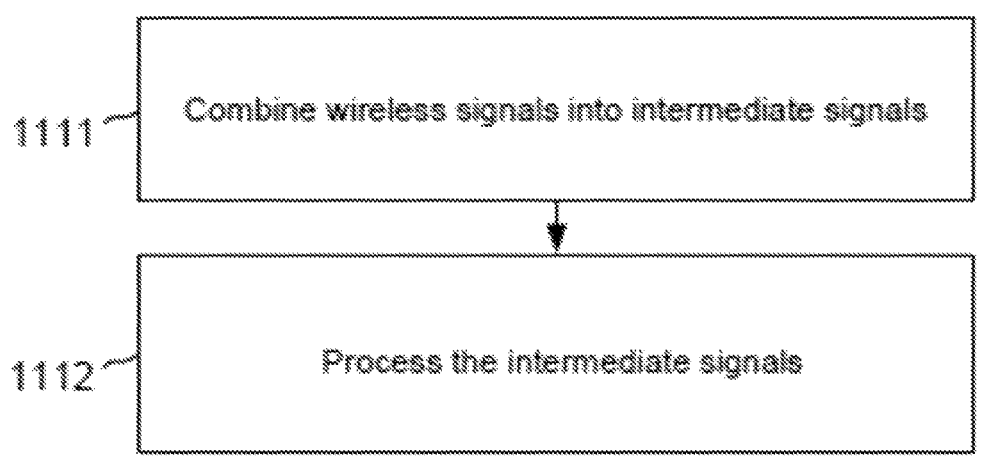
FIG. 15 illustrates one embodiment of a method for combining signals from a plurality of beam-forming networks.

FIG. 15 illustrates one embodiment of a method for combining signals from a plurality of beam-forming networks. In step 1111, combining coherently, by a first and a second beam-forming networks, respectively, a first 2201sig1 and a second 2201sig2 wireless signals arriving at a plurality of antennas connected to said first and second beam-forming networks, into a first 2201inter1 and a second 2201inter2 intermediate signals respectively. In step 1112, processing, by a receiver 2105 connected to the first and second beam-forming networks, said first and second intermediate signals into a single data stream.

Figure 16:
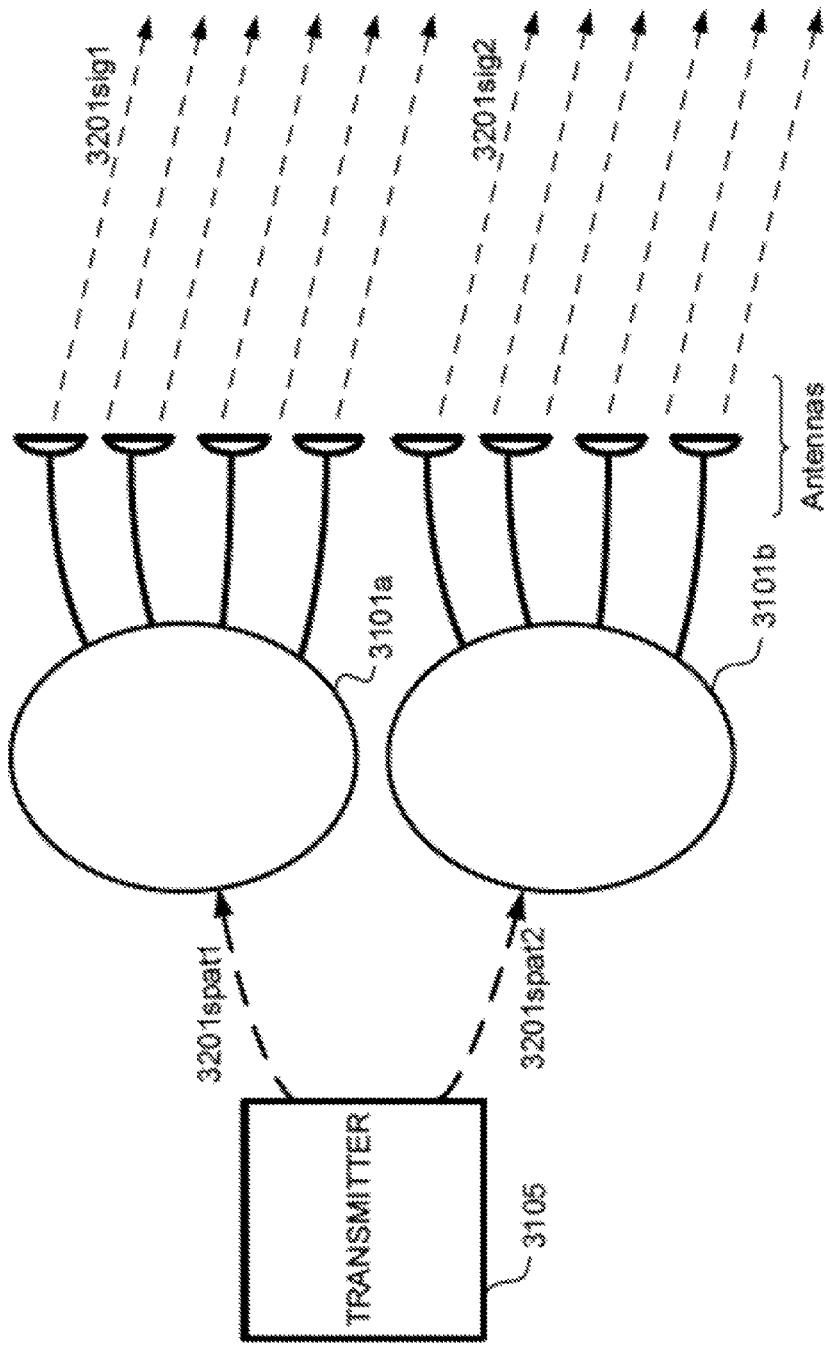
FIG. 16 illustrates one embodiment of a system capable of transmitting spatially multiplexed wireless signals using a plurality of beam-forming networks.

FIG. 16 illustrates one embodiment of a system for transmitting spatially multiplexed wireless signals using a plurality of beam-forming networks. A transmitter 3105 generates a first 3201spat1 and a second 3201spat2 spatially multiplexed signals using a single data stream. Said transmitter 3105 injects said first 3201spat1 and a second 3201spat2 spatially multiplexed signals into beam-ports of a first 3101a and a second 3101b beam-forming networks, respectively. Said first 3101a and second 3101b beam-forming networks transmit a first 3201sig1 and a second 3201sig2 spatially multiplexed wireless signals, respectively, using said first 3201spat1 and a second 3201spat2 spatially multiplexed signals, respectively.

Figure 17:
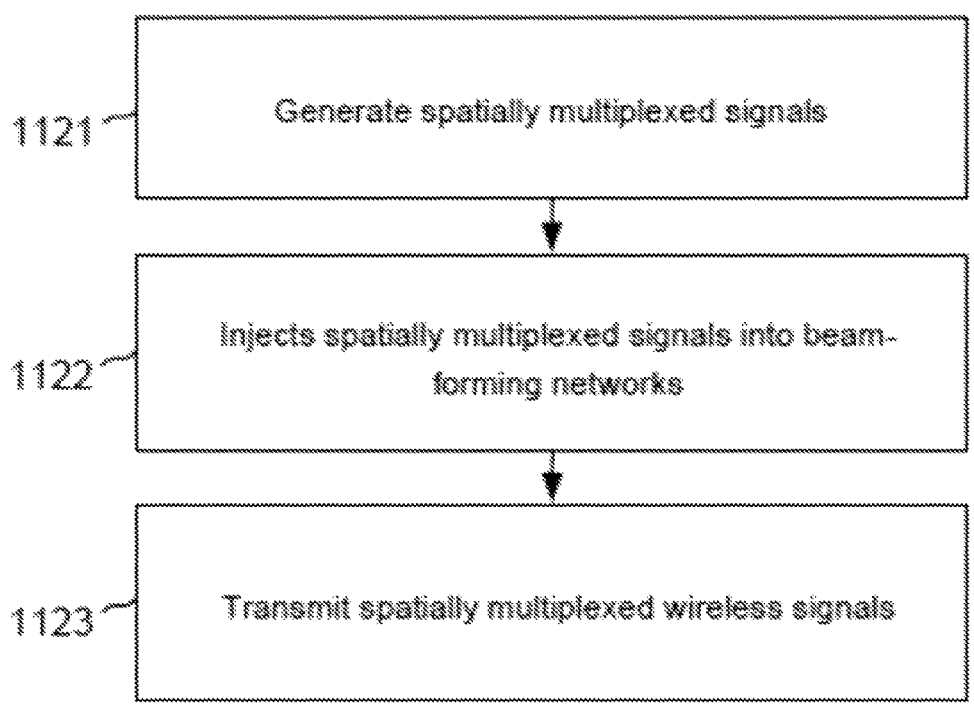
FIG. 17 illustrates one embodiment of a method for transmitting spatially multiplexed wireless signals using a plurality of beam-forming networks.

FIG. 17 illustrates one embodiment of a method for transmitting spatially multiplexed wireless signals using a plurality of beam-forming networks. In step 1121, generating, by a transmitter 3105, a first 3201spat1 and a second 3201spat2 spatially multiplexed signals using a single data stream. In step 1122, injecting, by said transmitter 3105, said first 3201spat1 and a second 3201spat2 spatially multiplexed signals into beam-ports of a first 3101a and a second 3101b beamforming networks, respectively. In step 1123, transmitting, by said first 3101a and second 3101b beam-forming networks, a first 3201sig1 and a second 3201sig2 spatially multiplexed wireless signals, respectively, using said first 3201spat1 and a second 3201spat2 spatially multiplexed signals, respectively.

Figure 18:
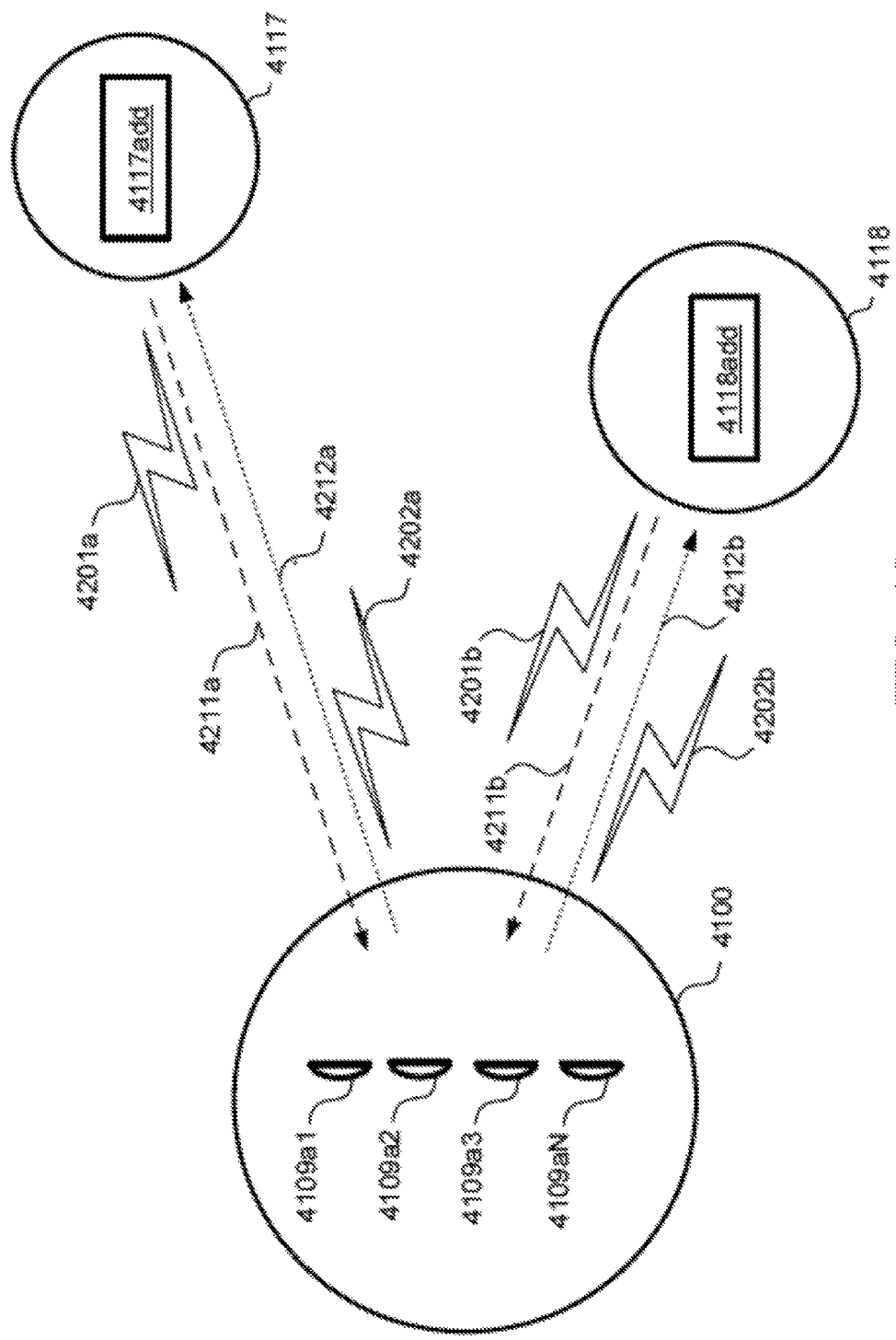
FIG. 18 illustrates one embodiment of a first, second, and third wireless communication systems.

FIG. 18 illustrates one embodiment of a first wireless communication system 4100, a second wireless communication system 4117, and a third wireless communication system 4118. Second wireless communication system 4117 may send wireless transmissions to first wireless communication system 4100, such as wireless transmission 4201a. Depending on position of second wireless communication system 4117 relative to first wireless communication system 4100, wireless transmission 4201a arrives at first wireless communication system 4100 from direction 4211a, also referred to as Direction-Of-Arrival (DOA) 4211a. First wireless communication system 4100 may send wireless transmissions to second wireless communication system 4117, such as wireless transmission 4202a, which may be directed 4212a toward second wireless communication system 4117. If (i) both first and second wireless communication systems 4100, 4117 are stationary, or (ii) either one or both of wireless communication systems 4100, 4117 are almost stationary over a short time interval extending form reception of wireless transmission 4201a to transmission of wireless transmission 4202a, then direction 4212a may be assumed to be same as DOA 4211a for all practical purposes. First wireless communication system 4100 includes a plurality of antennas 4109a1, 4109a2, 4109a3, 4109aN, illustrated as four antennas in a non-limiting fashion, but other multiple antenna configurations are possible, provided however that at least two antennas are involved. Antennas 4109a1, 4109a2, 4109a3, 4109aN, or at least a subset of two antennas thereof, may be used by first wireless communication system 4100 to determine DOA 4211a; this can be done by any of known methods associated with phased array antennas, including inter-antenna phase difference detection, Spatial Fast-Fourier-Transforms on inputs of said antennas, and power or correlation detection on a beam-forming network connected to said antennas. In addition, antennas 4109a1, 4109a2, 4109a3, 4109aN may be arranged in a non-phased array configuration, such as a beam-switching/antenna-switching configuration, in which each of said antennas is directed to a different direction. Antennas 4109a1, 4109a2, 4109a3, 4109aN, or at least a subset of two antennas thereof, may also be used by first wireless communication system 4100 to generate wireless transmission 4202a toward direction 4212a, using any of said phased array, beam-switching/antenna-switching, or other techniques.

Similarly to the abovementioned, third wireless communication system 4118 may send wireless transmissions to first wireless communication system 4100, such as wireless transmission 4201b. Depending on position of third wireless communication system 4118 relative to first wireless communication system 4100, wireless transmission 4201b arrives at first wireless communication system 4100 from direction 4211b, also referred to as DOA 4211b. First wireless communication system 4100 may send wireless transmissions to third wireless communication system 4118, such as a wireless transmission 4202b, which may be directed 4212b toward second wireless communication system 4118. Again, antennas 4109a1, 4109a2, 4109a3, 4109aN, or at least a subset of two antennas thereof, may be used by first wireless communication system 4100 to determine DOA 4211b, and generate wireless transmission 4202b toward direction 4212b, which is assumed to be same as DOA 4211b. It is noted that although only two wireless communication systems 4117, 4118 are illustrated as interacting/communicating with first wireless communication system 4100, any number of wireless communication systems may interact/communicate with first wireless communication system 4100, via any direction covered by antennas 4109a1, 4109a2, 4109a3, 4109aN. Changing transmission directions by first wireless communication system 4100 may be done very fast and dynamically using electrically controlled beam-steering/beam-switching/phased-array configurations associated with antennas 4109a1, 4109a2, 4109a3, 4109aN, thereby serving even dozens of wireless communication systems similar to wireless communication systems 4117, 4118.

Among advantages of directing 4212a wireless transmission 4202a toward wireless communication system 4117 and directing 4212b wireless transmission 4202b toward wireless communication system 4118 are: (i) increasing antenna gain associated with antennas 4109a1, 4109a2, 4109a3, 4109aN, (ii) improving interference immunity, and (iii) boosting data transmission rates.

Identifiers 4117add and 4118add identify wireless communication systems 4117 and 4118 respectively, and may be an embedded property of wireless communication systems 4117, 4118, such as serial numbers, addresses such as IP or Media-Access-Control (MAC) addresses, or alternatively any identifier given or associated with wireless communication systems 4117, 4118, either dynamically or a-priori. Identifiers 4117add and 4118add are referred to simply as addresses 4117add and 4118add respectively. Information associated with address 4117add may be present in wireless transmission 4201a and information associated with address 4118add may be present in wireless transmission 4201b, thereby allowing wireless communication system 4100 to associated wireless transmission 4201a with wireless communication system 4117 and DOA 4211a, and wireless transmission 4201b with wireless communication system 4118 and DOA 4211b.

Figure 19A:
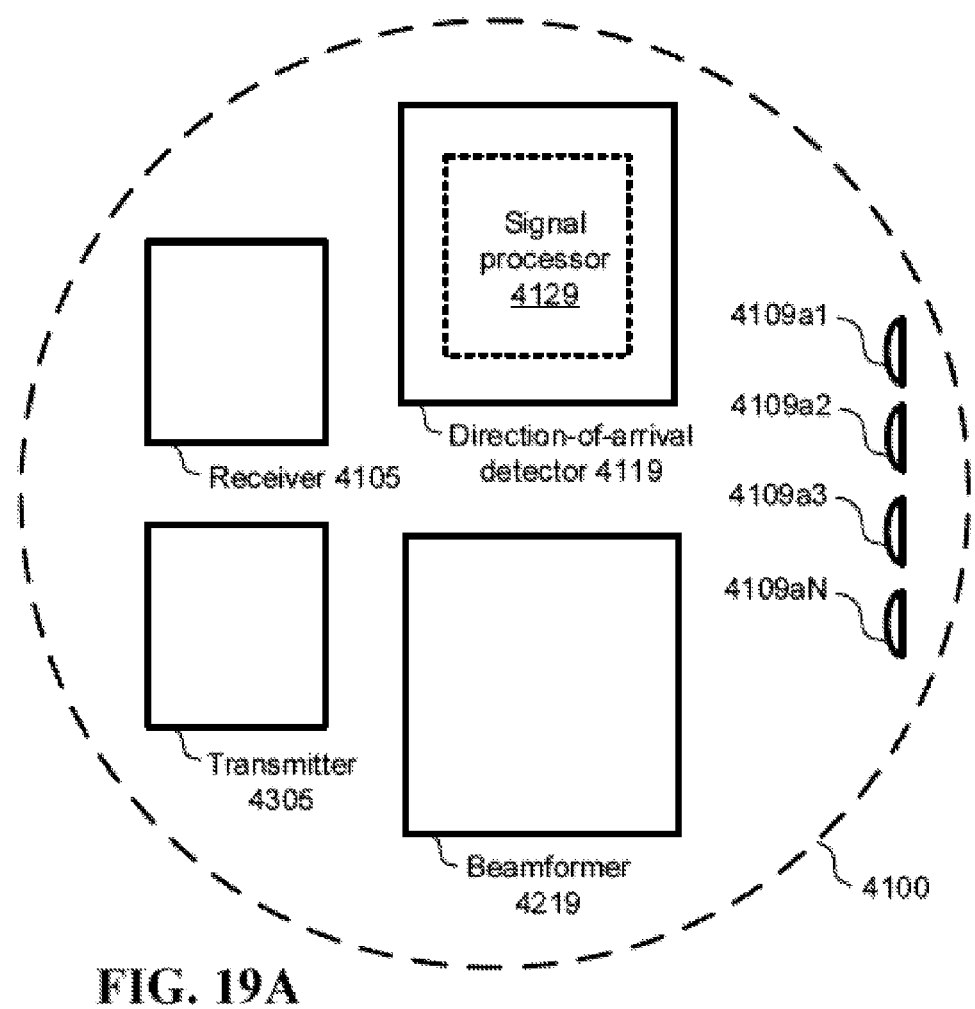
FIG. 19A illustrates one embodiment of various components of a first wireless communication system.

FIG. 19A illustrates one embodiment of wireless communication system 4100. Direction-of-arrival-detector 4119 may detect directions of arrival, such as DOA 4211a and DOA 4211b, in conjunction with antennas 4109a1, 4109a2, 4109a3, 4109aN, and may include a signal processor 4129 operative to aid in such detections. Beamformer 4219 may direct wireless transmissions, and/or receive wireless transmissions, to/from various directions, such as directions 4211a, 4212a, 4211b, and 4212b, in conjunction with antennas 4109a1, 4109a2, 4109a3, and 4109aN. It is noted that although direction-of-arrival-detector 4119 and beamformer 4219 are illustrated as separate component, they may be a single component operative to perform both direction-of-arrival detections and beamforming operations, or alternatively direction-of-arrival-detector 4119 and beamformer 4219 may share common components, such as signal processor 4129. Receiver 4105 may decode wireless transmissions such as wireless transmissions 4201a and 4201b, and may work in conjunction with beamformer 4219 in doing so. Transmitter 4305 may transmit wireless transmissions such as wireless transmissions 4202a and 4202b, and may work in conjunction with beamformer 4219 in doing so.

Figure 19B:
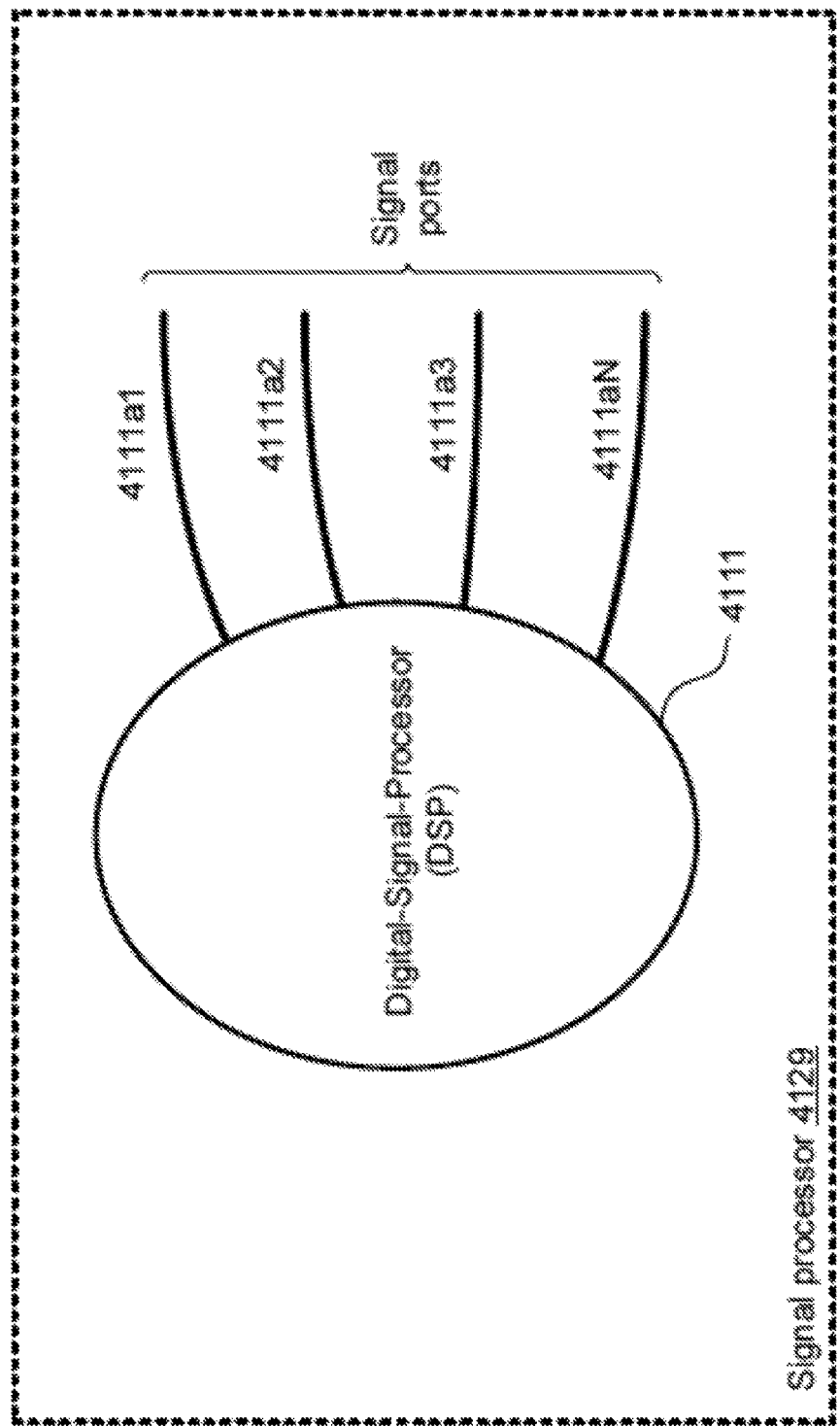
FIG. 19B illustrates one embodiment of a digital-signal-processor belonging to a first wireless communication system.

FIG. 19B illustrates one embodiment of signal processor 4129, in which signal processor 4129 is/or includes a digital-signal-processor (DSP) 4111. DSP 4111 may include signal ports 4111a1, 4111a2, 4111a3, and 4111aN, associated with antennas 4109a1, 4109a2, 4109a3, and 4109aN respectively.

Figure 19C:
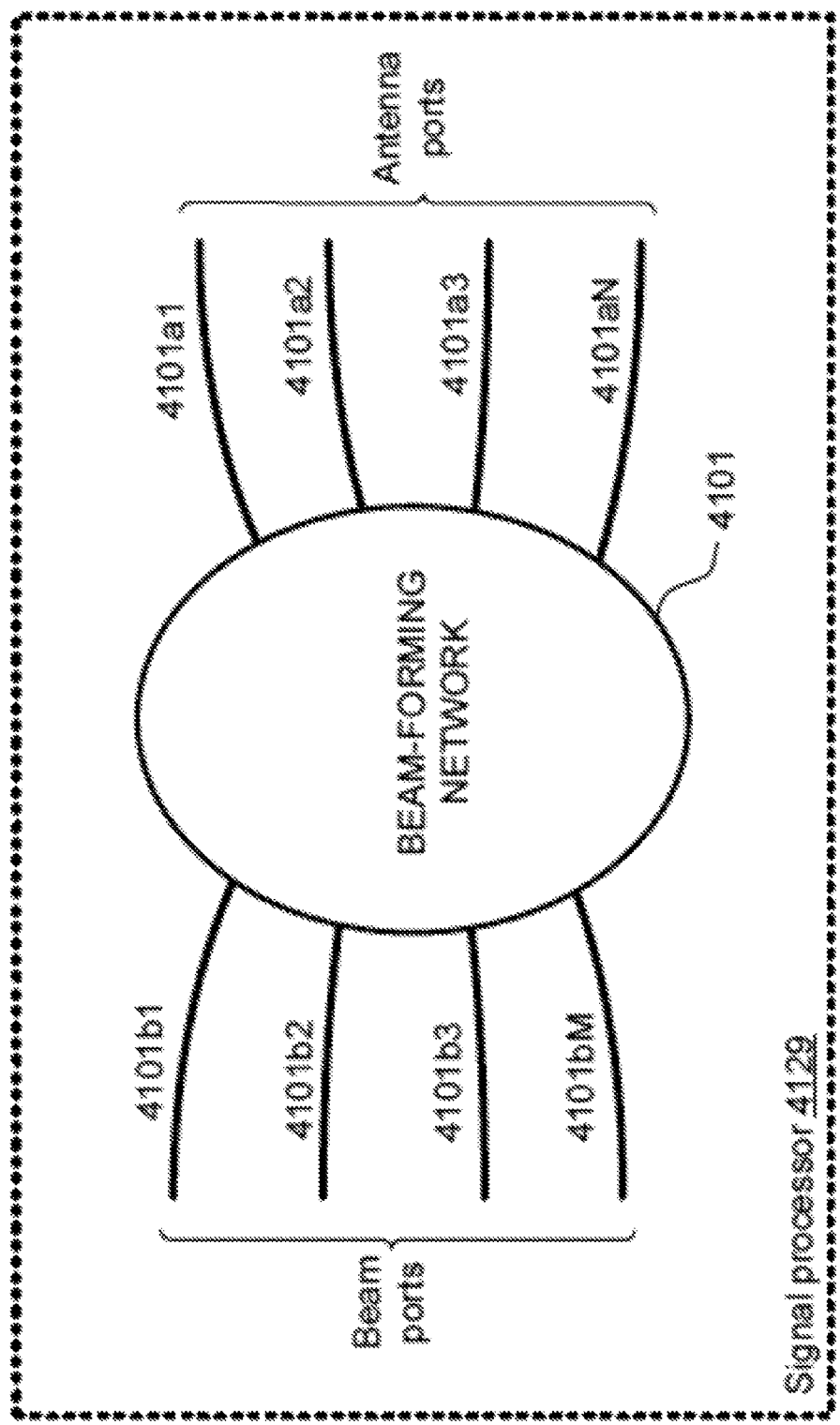
FIG. 19C illustrates one embodiment of a beam-forming network belonging to a first wireless communication system.

FIG. 19C illustrates one embodiment of signal processor 4129, in which signal processor 4129 is/or includes a beam-forming-network 4101. Beam-forming-network 4101 may include (i) antenna ports 4101a1, 4101a2, 4101a3, 4101aN, associated with antennas 4109a1, 4109a2, 4109a3, 4109aN respectively, and (ii) beam ports 4101b1, 4101b2, 4101b3, 4101bM, each associated with a specific DOA.

Figure 20A:
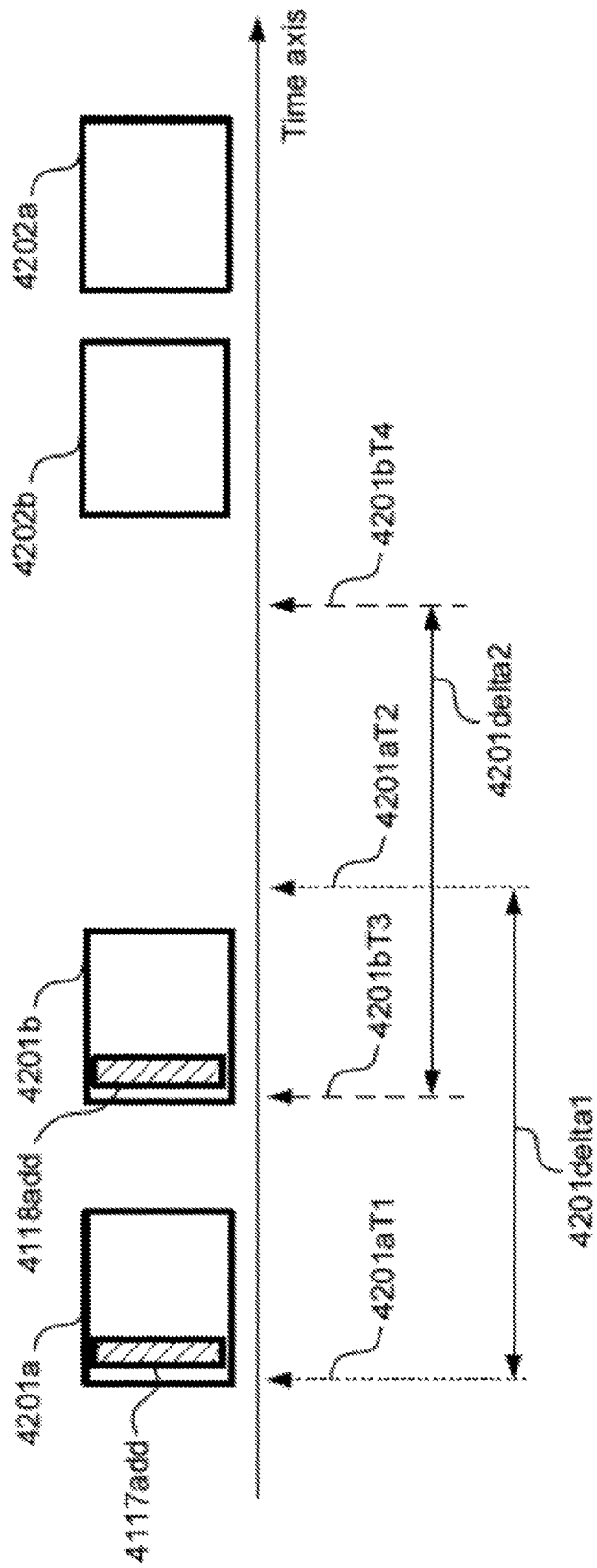
FIG. 20A illustrates one embodiment of a first, second, third, and fourth events associated with wireless transmissions.

FIG. 20A illustrates one embodiment of wireless transmissions 4201a, 4201b, 4202a, 4202b, which may be in a form of wireless packets, together with four events 4201aT1, 4201aT2, 4201bT3, 4201bT4 associated with various phases of processing said wireless transmissions. Address 4117add is embedded in wireless transmission 4201a and address 4118add is embedded in wireless transmission 4201b. By way of example and not limitation, first event 4201aT1 may be the determining of DOA 4211a by direction-or-arrival-detector 4119, and second event 4201aT2 may be the decoding of address 4117add by receiver 4105. Similarly, third event 4201bT3 may be the determining of DOA 4211b, and fourth event 4201bT4 may be the decoding of address 4118add. Wireless transmission 4202a may be, but not necessarily, a response to wireless transmission 4201a, and wireless transmission 4202b may be a response to wireless transmission 4201b.

Figure 20B:
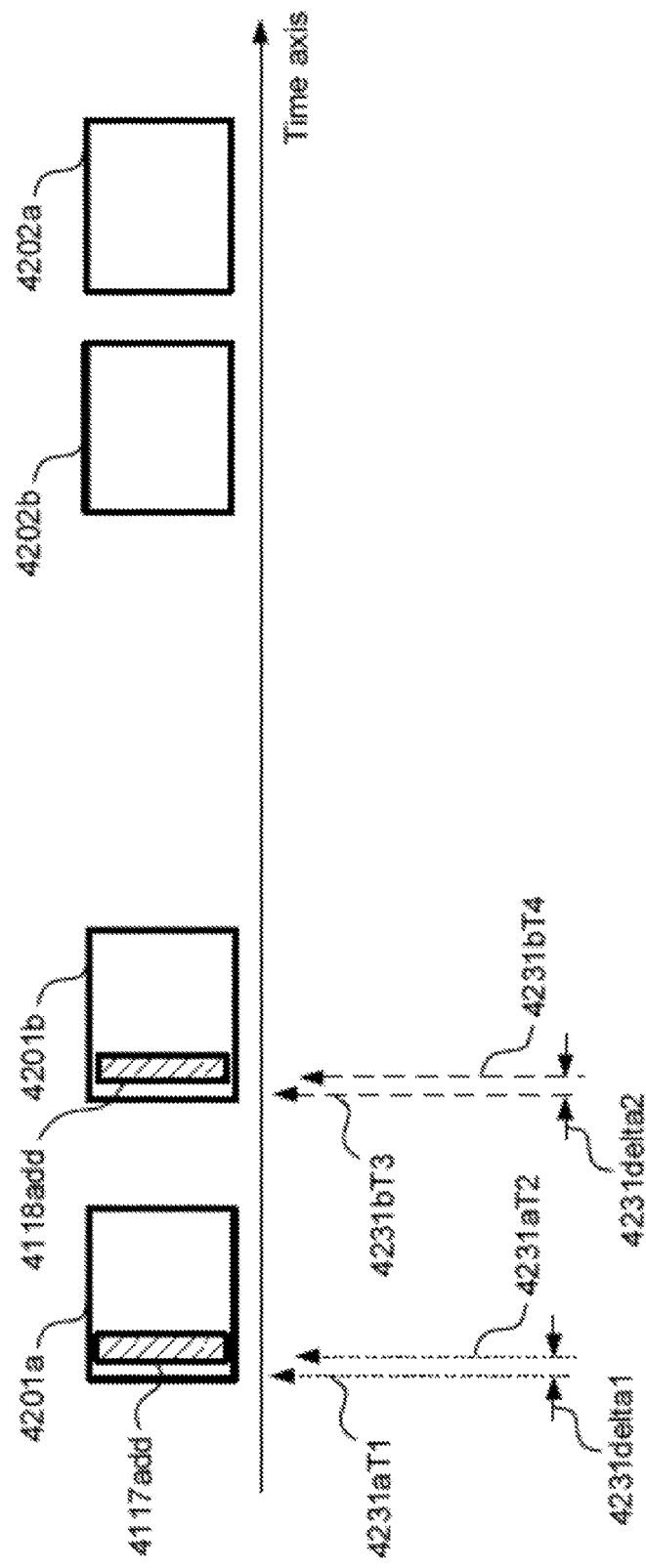
FIG. 20B illustrates one embodiment of a first, second, third, and fourth events associated with wireless transmissions.

FIG. 20B illustrates one embodiment of wireless transmissions 4201a, 4201b, 4202a, 4202b, which may be in a form of wireless packets, together with four events 4231aT1, 4231aT2, 4231bT3, 4231bT4 associated with various phases of detecting said wireless transmissions. By way of example and not limitation, first event 4231aT1 may be the detecting of the beginning of wireless transmission 4201a by direction-or-arrival-detector 4119, and second event 4231aT2 may be the detecting of the beginning of wireless transmission 4201a by receiver 4105. Similarly, third event 4231bT3 may be the detecting of the beginning of wireless transmission 4201b by direction-or-arrival-detector 4119, and fourth event 4231bT4 may be the detecting of the beginning of wireless transmission 4201b by receiver 4105.

Figure 21:
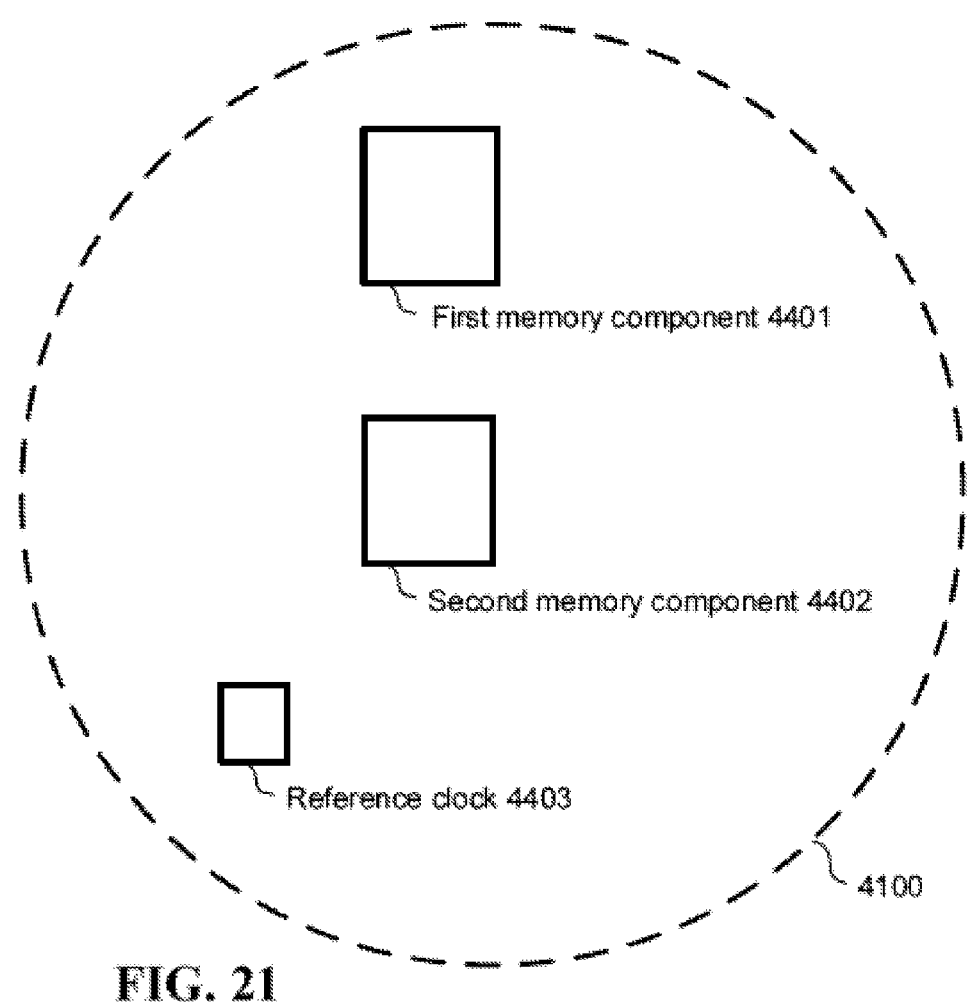
FIG. 21 illustrates one embodiment of various components of a first wireless communication system.

FIG. 21 illustrates one embodiment of additional components associated with wireless communication system 4100. First memory component 4401, second memory component 4402, and reference clock 4403 may be utilized by wireless communication system 4100 in time-stamping and registering various events, such as events 4201aT1, 4201aT2, 4201bT3, 4201bT4 and 4231aT1, 4231aT2, 4231bT3, 4231bT4.

One embodiment for associating direction-of-arrival of a wireless transmission with an address of an originator of the wireless transmission includes: (i) determining, in conjunction with a first event 4201aT1 or 4231aT1, by a first wireless communication system 4100, direction-of-arrival 4211a of a first incoming wireless transmission 4201a arriving from a second wireless communication system 4117 at first wireless communication system 4100 via a plurality of antennas 4109a1, 4109a2, 4109a3, 4109aN belonging to first wireless communication system 4100, (ii) decoding, from said first incoming wireless transmission 4201a, in conjunction with a second event 4201aT2 or 4231aT2, by first wireless communication system 4100, a first source address 4117add associated with second wireless communication system 4117, and (iii) detecting, by said first wireless communication system 4100, time proximity 4201delta1 between first event 4201aT1 and second event 4201aT2, or time proximity 4231delta1 between first event 4231aT1 and second event 4231aT2, thereby associating direction-of-arrival 4211a of first incoming wireless transmission 4201a with first source address 4117add, thereby associating direction-of-arrival 4211a of first incoming wireless transmission 4201a with second wireless communication system 4117. It is noted that two separate scenarios are described above: a first scenario, in which only events 4201aT1 and 4201aT2 are involved in conjunction with time proximity 4201delta1, and a second scenario, in which only events 4231aT1 and 4231aT2 are involved in conjunction with time proximity 4231delta1; the first and second scenarios may be two separate embodiments, describing different types of events.

In one embodiment, first wireless communication system 4100 decides to transmit a first outgoing wireless transmission 4202a to a first destination address, then determines that the first destination address is same as first source address 4117add, thereby associating outgoing wireless transmission 4202a with direction-of-arrival 4211a associated with first source address 4117add, and then transmits wirelessly, via plurality of antennas 4109a1, 4109a2, 4109a3, 4109aN, the first outgoing wireless transmission 4202a toward a direction 4212a same as direction-of-arrival 4211a associated with first source address 4117add, thereby assuring arrival of first outgoing wireless transmission 4202a at second wireless communication system 4117.

In one embodiment, the determination of direction-of-arrival 4211a is done out of at least two possible directions-of-arrival 4211a, 4211b.

In one embayment, the determination of direction-of-arrival 4211a is done by a direction-of-arrival-detector 4119. In one embodiment, direction-of-arrival-detector 4119 includes a signal processor 4129 that derives direction-of-arrival 4211a from first incoming wireless transmission 4201a arriving from plurality of antennas 4109a1, 4109a2, 4109a3, 4109aN. In one embodiment, signal processor 4129 is a digital signal processor 4111. In one embodiment, signal processor 4129 includes a beam-forming network 4101. In one embodiment, beam-forming network 4101 is: (i) a rotman lens, (ii) a butler matrix, or (iii) a blass matrix. In one embodiment, beam-forming network 4101 includes at least a first 4101b1 and a second 4101b2 beam-ports, but more beam-ports 4101b1, 4101b2, 4101b3, 4101bM are possible, such that first beam-port 4101b1 produces a first beam-port signal as a response to first incoming wireless transmission 4201a arriving from a first direction 4211a, and second beam-port 4101b2 produces a second beam-port signal as a response to first incoming wireless transmission 4201a arriving from a different direction.

In one embodiment, first wireless communication system 4100 determines, in conjunction with a third event 4201bT3 or 4231bT3, direction-of-arrival 4211b of a second incoming wireless transmission 4201b arriving from a third wireless communication system 4118 at first wireless communication system 4100 via plurality of antennas 4109a1, 4109a2, 4109a3, 4109aN. First wireless communication system 4100 then decodes, from second incoming wireless transmission 4201b, in conjunction with a fourth event 4201bT4 or 4231bT4, a second source address 4118add associated with third wireless communication system 4118, and then detects time proximity 4201delta2 between third event 4201bT3 and fourth event 4201bT4, or time proximity 4231 delta2 between third event 4231bT3 and fourth event 4231bT4, thereby associating direction-of-arrival 4211b of second incoming wireless transmission 4201b with second source address 4118add, thereby associating direction-of-arrival 4211b of said second incoming wireless transmission 4201b with third wireless communication system 4118. It is noted that two separate scenarios are described above: a third scenario, in which only events 4201bT3 and 4201bT4 are involved in conjunction with time proximity 4201delta2, and a fourth scenario, in which only events 4231bT3 and 4231bT4 are involved in conjunction with time proximity 4231delta2; the third and fourth scenarios may be two separate embodiments, describing different types of events.

In one embodiment, first wireless communication system 4100 decides to transmit a second outgoing wireless transmission 4202b to a second destination address, then determined that the second destination address is same as second source address 4118add, thereby associating second outgoing wireless transmission 4202b with direction-of-arrival 4211b associated with second source address 4118add, and then transmitting wirelessly, via plurality of antennas 4109a1, 4109a2, 4109a3, 4109aN, second outgoing wireless transmission 4202b, toward a direction 4212b same as direction-of-arrival 4211b associated with second source address 4118add, thereby: (i) assuring arrival of second outgoing wireless transmission 4202b at third wireless communication system 4118, and (ii) assuring that second outgoing wireless transmission 4202b is not transmitted toward a direction 4212a same as direction-of-arrival 4211a associated with second wireless communication system 4117.

In one embodiment, the determination of direction-of-arrival of first incoming wireless transmission 4201a and second incoming wireless transmission 4201b is done by a direction-of-arrival-detector 4119, and decoding of first source address 4117add and second source address 4118add is done by a receiver 4105. In one embodiment, direction-of-arrival-detector 4119 records into a first memory component 4401: (i) direction-of-arrival 4211a of first incoming wireless transmission 4201a, together with (ii) a first time-stamp associated with first event 4201aT1 or 4231aT1, and direction-of-arrival-detector 4119 records into first memory component 4401: (i) direction-of-arrival 4211b of second incoming wireless transmission 4201b, together with (ii) a third time-stamp associated with third event 4201bT3 or 4231bT3. Receiver 4105 records into a second memory component 4402: (i) first source address 4117add, together with (ii) a second time-stamp associated with second event 4201aT2 or 4231aT2, and receiver 4105 records into second memory component 4402: (i) second source address 4118add, together with (ii) a fourth time-stamp associated with fourth event 4201bT4 or 4231bT4.

In one embodiment, first wireless communication system 4100 reads from first and second memory components 4401, 4402: first, second, third, and fourth time stamps, and then associates between time stamps having close time proximity, such that: (i) the first time-stamp is associated with the second time-stamp, and (ii) the third time-stamp is associated with the fourth time stamp. First wireless communication system 4100 reads from first and second memory components 4401, 4402: (i) direction-of-arrival 4211a of first incoming wireless transmission 4201a associated with the first time-stamp, and (ii) the first source address 4117add associated with the second time-stamp, thereby achieving association between direction-of-arrival 4211a of first incoming wireless transmission 4201a and first source address 4117add. First wireless communication system 4100 reads from first and second memory components 4401, 4402: (i) direction-of-arrival of second incoming wireless transmission 4201b associated with the third time-stamp, and (ii) second source address 4118add associated with the fourth time-stamp, thereby achieving association between direction-of-arrival 4211b of second incoming wireless transmission 4201b and second source address 4118add.

In one embodiment, first memory component 4401 is different from second memory component 4402. In one embodiment, first memory component 4401 is same as second memory component 4402. In one embodiment: (i) the first time-stamp is obtained by reading time from a reference clock 4403 by direction-of-arrival-detector 4119 in proximity to first event 4201aT1 or 4231aT1, (ii) the second time-stamp is obtained by reading time from reference clock 4403 by receiver 4105 in proximity to second event 4201aT2 or 4231aT2, (iii) the third time-stamp is obtained by reading time from reference clock 4403 by direction-of-arrival detector 4119 in proximity to third event 4201bT3 or 4231bT3, and (iv) the fourth time-stamp is obtained by reading time from reference clock 4403 by receiver 4105 in proximity to fourth event 4201bT4 or 4231bT4.

In one embodiment: (i) first wireless communication system 4100 is a wireless-local-area-network access-point, (ii) second wireless communication system 4117 is a wireless client device associated with the wireless-local-area-network access-point, and (iii) first incoming wireless transmission 4201a is in a form of a wireless packet. In one embodiment, the wireless-local-area-network access-point, the wireless client device, and the wireless packet conform to IEEE 802.11 standards. In one embodiment, the wireless-local-area-network access-point, the wireless client device, and the wireless packet conform to Wi-Fi. In one embodiment, the first source address 4117ad is a source Media-Access-Control (MAC) address associated with second wireless communication system 4117.

In one embodiment, the determination of direction-of-arrival 4211a of first incoming wireless transmission 4201a is done by a direction-of-arrival-detector 4119 and the decoding of first source address 4117add is done by a receiver 4105. In one embodiment, first event 4231aT1 is a detection of a beginning of first incoming wireless transmission 4201a by first wireless communication system 4100. In one embodiment, first event 4231aT1 is a detection of a beginning of first incoming wireless transmission 4201a by direction-of-arrival-detector 4119. In one embodiment, first event 4231aT1 triggers the determination of direction-of-arrival 4211a of first incoming wireless transmission 4201a. In one embodiment, second event 4231aT2 is a detection of a beginning of first incoming wireless transmission 4201a by first wireless communication system 4100. In one embodiment, second event 4231aT2 is a detection of a beginning of first incoming wireless transmission 4201a by receiver 4105. In one embodiment, second event 4231aT2 triggers the decoding of first source address 4117add.

In one embodiment, first event 4201aT1 is any point in processing of incoming wireless transmission 4201a by first wireless communication system 4100. In one embodiment, first event 4201aT1 is any point in processing of first incoming wireless transmission 4201a by direction-of-arrival-detector 4119. In one embodiment, second event 4201aT2 is any point in processing of first incoming wireless transmission 4201a by first wireless communication system 4100. In one embodiment, second event 4201aT2 is any point in processing of first incoming wireless transmission 4201a by receiver 4105.

One embodiment for associating directions of incoming transmissions with directions of outgoing transmissions in a wireless communication network includes: (i) determining, by a first wireless communication system 4100, for each of a plurality of incoming wireless transmissions 4201a, 4201b arriving at first wireless communication system 4100: (1) time of arrival 4201aT1, 4201bT3 respectively and direction-of-arrival 4211a, 4211b respectively, and (2) time of decoding 4201aT2, 4201bT4 respectively and source address 4117add, 4118add respectively, (ii) associating, by first wireless communication system 4100, between each of source addresses 4117add, 4118add and corresponding direction-of-arrival 4211a, 4211b respectively, by detecting time proximities between the times of arrival and times of decoding, such as time proximity 4201delta1 detected between time of arrival 4201aT1 and time of decoding 4201aT2, and time proximity 4201delta2 detected between time of arrival 4201bT3 and time of decoding 4201bT4, and (iii) transmitting, by first wireless communication system 4100, at least one outgoing wireless transmission 4202a having a destination address same as one of said source addresses 4117add, toward a direction 4212a same as direction-of-arrival 4211a associated previously with said one of said source addresses 4117add.

In one embodiment, the determination of times of arrival 4201aT1, 4201bT3 and directions-of-arrival 4211a, 4211b is done by a direction-of-arrival-detector 4119 belonging to first wireless communication system 4100, and the determination of times of decoding 4201aT2, 4201bT4 and source addresses 4117add, 4118add is done by a receiver 4105 belonging to first wireless communication system 4100, wherein receiver 4105 performs decoding of source address 4117add, 4188add from corresponding incoming wireless transmissions 4201a, 4201b respectively.

In one embodiment, first wireless communication system 4100 is a half-duplex wireless communication system, such that the transmitting of at least one outgoing wireless transmission 4202a occurs at a later time slot than arrival of incoming wireless transmissions 4201a. In one embodiment: (i) operation of direction-of-arrival-detector 4119 is not coordinated with operation of receiver 4105, (ii) direction-of-arrival-detector 4119 is incapable of determining source address 4117add, 4188add, and (iii) receiver 4105 is incapable of determining directions-of-arrival 4211a, 4211b.

One embodiment is a wireless communication system 4100 capable of associating between data from a direction-of-arrival-detector and data from a receiver operating separately, including: (i) at least a first and second antennas 4109a1, 4109a2 operative to receive a first incoming wireless transmission 4201a arriving at first and second antennas 4109a1, 4109a2, (ii) a direction-of-arrival-detector 4119, working in conjunction with the at least first and second antennas 4109a1, 4109a2, operative to determine direction-of-arrival 4211a of first incoming wireless transmission 4201a in associations with a first event 4231aT1, and (iii) a receiver 4105, operating separately from direction-of-arrival-detector 4119, operative to decode a first source address 4117add from first incoming wireless transmission 4201a in association with a second event 4231aT2. Wireless communication system 4100 is operative to detect time proximity 4231delta1 between first event 4231aT1 and second event 4231aT2, thereby associating direction-of-arrival 4211a of first incoming wireless transmission 4201a with first source address 4117add of first incoming wireless transmission 4201a.

In one embodiment, time proximity 4231delta1 is shorter than two milliseconds. In one embodiment, time proximity 4231delta1 is shorter than 200 microseconds. In one embodiment, time proximity 4231delta1 is shorter than 20 microseconds.

In one embodiment, the association of direction-of-arrival 4211a with first source address 4117add is done at least 10 milliseconds after second event 4231aT2, thereby allowing for non real-time association of direction-of-arrival 4211a with first source address 4117add.

In one embodiment, receiver 4105 is unaware of direction-of-arrival-detector 4119 and direction-of-arrival 4211a, thereby operating separately from direction-of-arrival-detector 4119.

In one embodiment: (i) wireless communication system 4100 is a wireless-local-area-network access-point, and (ii) first incoming wireless transmission 4201a is in a form of a wireless packet. In one embodiment, the wireless-local-area-network access-point and the wireless packet conform to IEEE 802.11 standards.

In one embodiment, first source address 4117add is a source Media-Access-Control (MAC) address associated with first incoming wireless transmission 4201a.

One embodiment for associating a relative direction (bearing) of a wireless communication device with its Media-Access-Control (MAC) address includes: (i) receiving, at a plurality of antennas 4109a1, 4109a2, 4109a3, 4109aN, in a first wireless communication device 4100, a first wireless communication packet 4201a sent by a second wireless communication device 4117, (ii) determining, in a direction-of-arrival detector 4119 of first wireless communication device 4100, the bearing 4211a of second wireless communication device 4117 with respect to the first wireless communication device 4100, (iii) decoding, in a receiver 4105 of first wireless communication device 4100, a portion of the first wireless communication packet 4201a so as to determine a MAC address 4117add encoded in the portion of the first wireless communication packet 4201a, and (iv) associating bearing 4211a of the second wireless communication device 4117 with MAC address 4117add of the second wireless communication device 4117.

In one embodiment, the receiving of first wireless communication packet 4201a causes respective antenna output signals in each of said plurality of antennas 4109a1, 4109a2, 4109a3, 4109aN, and determining bearing 4211a includes determining bearing 4211a based at least on the plurality of antenna output signals. In one embodiment, first wireless communication device 4100 determines a first event 4201aT1 to which the determining of bearing 4211a is associated, and determines a second event 4201aT2 to which the decoding of MAC address 4117add is associated. In one embodiment, first wireless communication device 4100 determines a difference in time 4201delta1 between the first and second events 4201aT1, 4201aT2. In one embodiment, the associating of the bearing 4211a and MAC address 4117add of the second wireless communication device 4117 employs the determining of the difference in time 4201delta1.

In one embodiment, the determining the bearing 4211a of the second wireless communication device 4117 comprising beam-forming by direction-of-arrival detector 4119 using the plurality of antenna output signals.

In one embodiment, repeating the receiving, determining, decoding and associating from time to time so as to track second wireless communication device 4117 where its bearing with respect to first wireless communication device 4100 varies in time.

In one embodiment, repeating the receiving, determining, decoding and associating for a third wireless communication device 4118 so as to associate a plurality of wireless communication device bearings 4211a, 4211b with their respective MAC addresses 4117add, 4118add.

Figure 22:
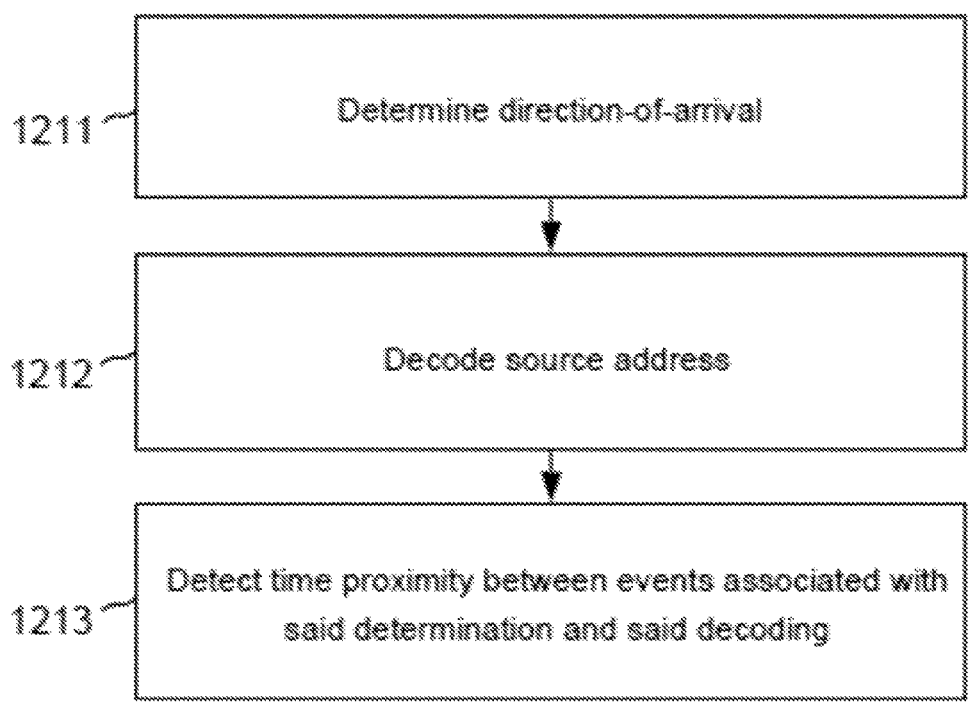
FIG. 22 illustrates one embodiment of a method for associating direction-of-arrival of a wireless transmission with an address of an originator of the wireless transmission.

FIG. 22 illustrates one embodiment of a method for associating direction-of-arrival of a wireless transmission with an address of an originator of the wireless transmission. In step 1211: determining, in conjunction with a first event 4201aT1 or 4231aT1, by a first wireless communication system 4100, direction-of-arrival 4211a of a first incoming wireless transmission 4201a arriving from a second wireless communication system 4117 at first wireless communication system 4100 via a plurality of antennas 4109a1, 4109a2, 4109a3, 4109aN belonging to first wireless communication system 4100. In step 1212: decoding, from the first incoming wireless transmission 4201a, in conjunction with a second event 4201aT2 or 4231aT2, by first wireless communication system 4100, a first source address 4117add associated with second wireless communication system 4117. In step 1213: detecting, by the first wireless communication system 4100, time proximity 4201delta1 between first event 4201aT1 and second event 4201aT2, or time proximity 4231delta1 between first event 4231aT1 and second event 4231aT2, thereby associating direction-of-arrival 4211a of first incoming wireless transmission 4201a with first source address 4117add, thereby associating direction-of-arrival 4211a of first incoming wireless transmission 4201a with second wireless communication system 4117.

Figure 23:
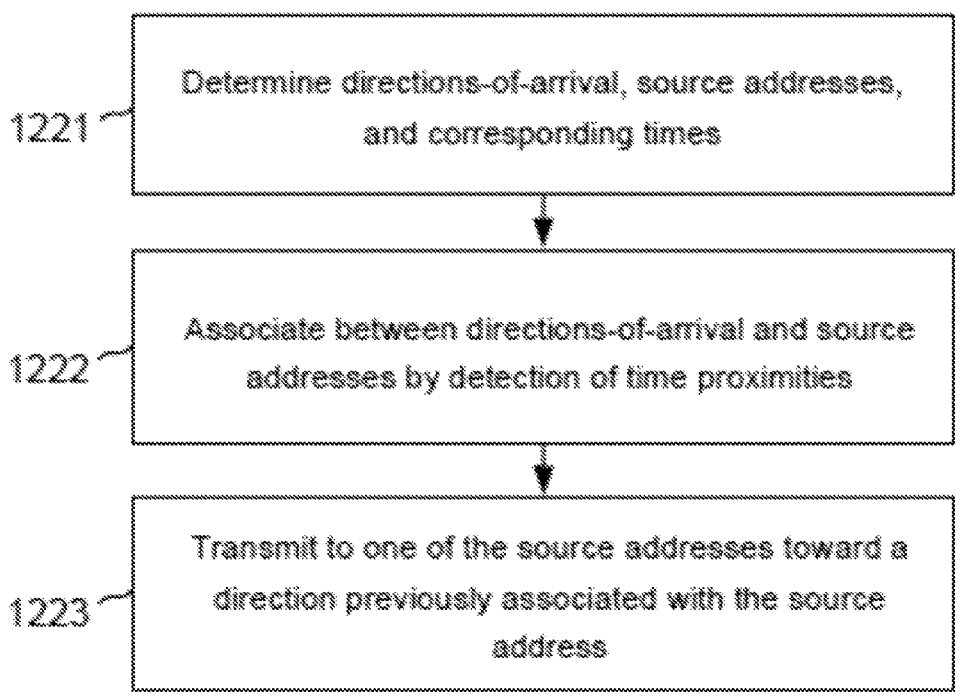
FIG. 23 illustrates one embodiment of a method for associating directions of incoming transmissions with directions of outgoing transmissions in a wireless communication network.

FIG. 23 illustrates one embodiment of a method for associating directions of incoming transmissions with directions of outgoing transmissions in a wireless communication network. In step 1221: determining, by a first wireless communication system 4100, for each of a plurality of incoming wireless transmissions 4201a, 4201b arriving at first wireless communication system 4100: (1) time of arrival 4201aT1, 4201bT3 respectively and direction-of-arrival 4211a, 4211b respectively, and (2) time of decoding 4201aT2, 4201bT4 respectively and source address 4117add, 4118add respectively. In step 1222: associating, by first wireless communication system 4100, between each of source addresses 4117add, 4118add and corresponding direction-of-arrival 4211a, 4211b respectively, by detecting time proximities between the times of arrival and times of decoding. In step 1223: transmitting, by first wireless communication system 4100, at least one outgoing wireless transmission 4202a having a destination address same as one of said source addresses 4117add, toward a direction 4212a same as direction-of-arrival 4211a associated previously with one of said source addresses 4117add.

Figure 24:
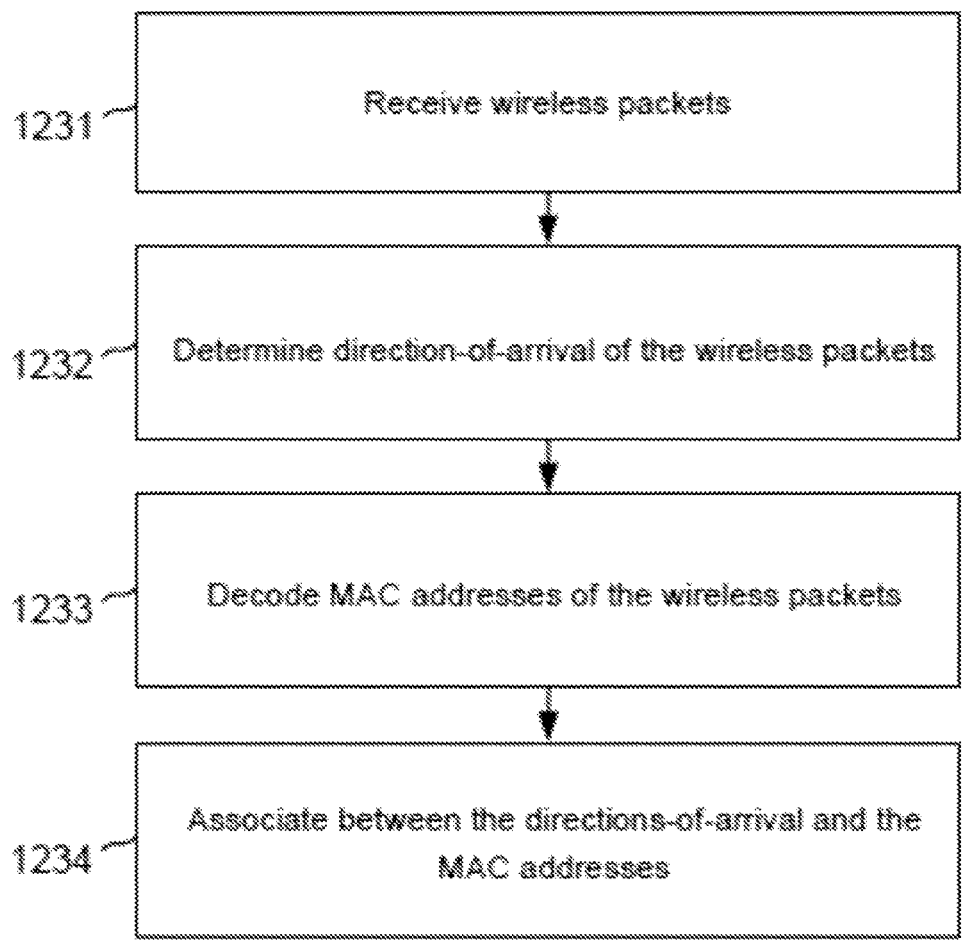
FIG. 24 illustrates one embodiment of a method for associating a relative direction (bearing) of a wireless communication device with its Media-Access-Control (MAC) address.

FIG. 24 illustrates one embodiment of a method for associating a relative direction (bearing) of a wireless communication device with its Media-Access-Control (MAC) address. In step 1231: receiving, at a plurality of antennas 4109a1, 4109a2, 4109a3, 4109aN in a first wireless communication device 4100, a first wireless communication packet 4201a sent by a second wireless communication device 4117. In step 1232: determining, in a direction-of-arrival detector 4119 of first wireless communication device 4100, the bearing 4211a of second wireless communication device 4117 with respect to the first wireless communication device 4100. In step 1233: decoding, in a receiver 4105 of first wireless communication device 4100, a portion of the first wireless communication packet 4201a so as to determine a MAC address 4117add encoded in the portion of the first wireless communication packet 4201a. In step 1234: associating bearing 4211a of the second wireless communication device 4117 with MAC address 4117add of the second wireless communication device 4117.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for associating direction-of-arrival of a wireless transmission with an address of an originator of said wireless transmission, comprising:
   determining, in conjunction with a first event, by a first wireless communication system, direction-of-arrival of a first incoming wireless transmission arriving from a second wireless communication system at said first wireless communication system via a plurality of antennas belonging to said first wireless communication system;
   decoding, from said first incoming wireless transmission, in conjunction with a second event, by said first wireless communication system, a first source address associated with said second wireless communication system;
   detecting, by said first wireless communication system, time proximity between said first event and said second event, thereby associating said direction-of-arrival of said first incoming wireless transmission with said first source address, thereby associating said direction-of-arrival of said first incoming wireless transmission with said second wireless communication system;
   determining, in conjunction with a third event, by said first wireless communication system, direction-of-arrival of a second incoming wireless transmission arriving from a third wireless communication system at said first wireless communication system via said plurality of antennas;
   decoding, from said second incoming wireless transmission, in conjunction with a fourth event, by said first wireless communication system, a second source address associated with said third wireless communication system;
   detecting, by said first wireless communication system, time proximity between said third event and said fourth event, thereby associating said direction-of-arrival of said second incoming wireless transmission with said second source address, thereby associating said direction-of-arrival of said second incoming wireless transmission with said third wireless communication system;
   recording into a first memory component, by a direction-of-arrival-detector: (i) said direction-of-arrival of said first incoming wireless transmission, together with (ii) a first time-stamp associated with said first event;
   recording into said first memory component, by said direction-of-arrival-detector: (i) said direction-of-arrival of said second incoming wireless transmission, together with (ii) a third time-stamp associated with said third event;
   recording into a second memory component, by a receiver: (i) said first source address, together with (ii) a second time-stamp associated with said second event; and
   recording into said second memory component, by said receiver: (i) said second source address, together with (ii) a fourth time-stamp associated with said fourth event,
   wherein said determination of said direction-of-arrival of said first incoming wireless transmission and said second incoming wireless transmission is done by said direction-of-arrival-detector and said decoding of said first source address and said second source address is done by said receiver.

2. The method of claim 1, further comprising:
   deciding, by said first wireless communication system, to transmit a first outgoing wireless transmission to a first destination address;
   determining, by said first wireless communication system, that said first destination address is the same as said first source address, thereby associating said outgoing wireless transmission with said direction-of-arrival associated with said first source address; and
   transmitting wirelessly, via said plurality of antennas, by said first wireless communication system, said first outgoing wireless transmission, toward a same direction as said direction-of-arrival associated with said first source address, thereby assuring arrival of said first outgoing wireless transmission at said second wireless communication system.

3. The method of claim 1, wherein said determining of said direction-of-arrival of said first incoming wireless transmission is done out of at least two possible directions-of-arrival.

4. The method of claim 1, wherein said direction-of-arrival-detector comprises a signal processor operative to derive said direction-of-arrival from said first incoming wireless transmission arriving from said plurality of antennas.

5. The method of claim 4, wherein said signal processor is a digital signal processor.

6. The method of claim 4, wherein said signal processor comprises a beam-forming network.

7. The method of claim 6, wherein said beam-forming network is selected form a group consisting of: (i) a rotman lens, (ii) a butler matrix, and (iii) a blass matrix.

8. The method of claim 6, wherein said beam-forming network comprises at least a first and a second beam-ports, said first beam-port operative to produce a first beam-port signal as a response to said first incoming wireless transmission arriving from a first direction, and said second beam-port operative to produce a second beam-port signal as a response to said first incoming wireless transmission arriving from a second direction.

9. The method of claim 1, further comprising:
deciding, by said first wireless communication system, to transmit a second outgoing wireless transmission to a second destination address;
determining, by said first wireless communication system, that said second destination address is the same as said second source address, thereby associating said second outgoing wireless transmission with said direction-of-arrival associated with said second source address; and
transmitting wirelessly, via said plurality of antennas, by said first wireless communication system, said second outgoing wireless transmission, toward a same direction as said direction-of-arrival associated with said second source address, thereby: (i) assuring arrival of said second outgoing wireless transmission at said third wireless communication system, and (ii) assuring that said second outgoing wireless transmission is not transmitted toward a same direction as said direction-of-arrival associated with said second wireless communication system.

10. The method of claim 1, further comprising:
reading, from said first and second memory components, by said first wireless communication system: said first, second, third, and fourth time stamps;
associating, by said first wireless communication system, between time stamps having close time proximity, such that: (i) said first time-stamp is associated with said second time-stamp, and (ii) said third time-stamp is associated with said fourth time stamp;
reading, from said first and second memory components, by said first wireless communication system: (i) said direction-of-arrival of said first incoming wireless transmission associated with said first time-stamp, and (ii) said first source address associated with said second time-stamp, thereby achieving said association between said direction-of-arrival of said first incoming wireless transmission and said first source address; and
reading, from said first and second memory components, by said first wireless communication system: (i) said direction-of-arrival of said second incoming wireless transmission associated with said third time-stamp, and (ii) said second source address associated with said fourth time-stamp, thereby achieving said association between said direction-of-arrival of said second incoming wireless transmission and said second source address.

11. The method of claim 1, wherein said first memory component is different from said second memory component.

12. The method of claim 1, wherein said first memory component is the same as said second memory component.

13. The method of claim 1, wherein:
said first time-stamp is obtained by reading time from a reference clock, by said direction-of-arrival-detector, in proximity to said first event;
said second time-stamp is obtained by reading time from said reference clock, by said receiver, in proximity to said second event;
said third time-stamp is obtained by reading time from said reference clock, by said direction-of-arrival detector, in proximity to said third event; and
said fourth time-stamp is obtained by reading time from said reference clock, by said receiver, in proximity to said fourth event.

14. The method of claim 1, wherein: (i) said first wireless communication system is a wireless-local-area-network access-point, (ii) said second wireless communication system is a wireless client device associated with said wireless-local-area-network access-point, and (iii) said first incoming wireless transmission is in a form of a wireless packet.

15. The method of claim 14, wherein said wireless-local-area-network access-point, said wireless client device, and said wireless packet conform to IEEE 802.11 standards.

16. The method of claim 14, wherein said wireless-local-area-network access-point, said wireless client device, and said wireless packet conform to Wi-Fi.

17. The method of claim 1, wherein said first source address is a source media-access-control-address associated with said second wireless communication system.

18. The method of claim 1, wherein said determination of said direction-of-arrival of said second incoming wireless transmission is done by said direction-of-arrival-detector and said decoding of said second source address is done by said receiver.

19. The method of claim 1, wherein said first event is a detection of a beginning of said first incoming wireless transmission by said first wireless communication system.

20. The method of claim 19, wherein said first event is said detection of said beginning of said first incoming wireless transmission by said direction-of-arrival-detector.

21. The method of claim 20, wherein said first event triggers said determination of said direction-of-arrival of said first incoming wireless transmission.

22. The method of claim 1, wherein said second event is a detection of a beginning of said first incoming wireless transmission by said first wireless communication system.

23. The method of claim 22, wherein said second event is said detection of said beginning of said first incoming wireless transmission by said receiver.

24. The method of claim 23, wherein said second event triggers said decoding of said first source address.

25. The method of claim 1, wherein said first event is any point in processing of said incoming wireless transmission by said first wireless communication system.

26. The method of claim 25, wherein said first event is any point in said processing of said first incoming wireless transmission by said direction-of-arrival-detector.

27. The method of claim 1, wherein said second event is any point in processing of said first incoming wireless transmission by said first wireless communication system.

28. The method of claim 27, wherein said second event is any point in said processing of said first incoming wireless transmission by said receiver.

* * * * *